US008463841B2

(12) United States Patent
Choi et al.

(10) Patent No.: US 8,463,841 B2
(45) Date of Patent: *Jun. 11, 2013

(54) LEGACY COOPERATION DEVICE AND PROCESSING METHOD

(75) Inventors: Byoung-Cheol Choi, Kyungki-do (KR); Jae-Sung Kim, Seoul (KR); Seog-Cheon Jeon, Kyungki-do (KR); Min Kim, Kyungki-do (KR); Yoo-Hoon Won, Seoul (KR)

(73) Assignee: KT Corporation, Gyeonggi-do (KR)

( * ) Notice: Subject to any disclaimer, the term of this patent is extended or adjusted under 35 U.S.C. 154(b) by 567 days.
This patent is subject to a terminal disclaimer.

(21) Appl. No.: 12/538,052

(22) Filed: Aug. 7, 2009

(65) Prior Publication Data

US 2009/0298465 A1    Dec. 3, 2009

Related U.S. Application Data

(60) Division of application No. 12/114,690, filed on May 2, 2008, which is a continuation of application No. PCT/KR2006/004524, filed on Nov. 2, 2006.

(30) Foreign Application Priority Data

| Nov. 3, 2005 | (KR) | 10-2005-0105076 |
|---|---|---|
| Nov. 9, 2005 | (KR) | 10-2005-0107184 |
| Nov. 9, 2005 | (KR) | 10-2005-0107242 |
| Nov. 9, 2005 | (KR) | 10-2005-0107243 |
| Nov. 9, 2005 | (KR) | 10-2005-0107244 |
| Nov. 9, 2005 | (KR) | 10-2005-0107245 |
| Nov. 9, 2005 | (KR) | 10-2005-0107246 |
| Nov. 9, 2005 | (KR) | 10-2005-0107247 |
| Nov. 9, 2005 | (KR) | 10/2005-0107248 |
| Nov. 9, 2005 | (KR) | 10-2005-0107249 |
| Nov. 14, 2005 | (KR) | 10/2005-0108611 |
| Nov. 14, 2005 | (KR) | 10-2005-0108638 |
| Nov. 14, 2005 | (KR) | 10-2005-0108643 |
| Nov. 15, 2005 | (KR) | 10-2005-0109047 |
| Nov. 15, 2005 | (KR) | 10-2005-0109308 |
| Nov. 16, 2005 | (KR) | 10-2005-0109586 |
| Nov. 21, 2005 | (KR) | 10-2005-0111368 |
| Nov. 21, 2005 | (KR) | 10-2005-0111369 |
| Nov. 21, 2005 | (KR) | 10-2005-0111373 |
| Oct. 23, 2006 | (KR) | 10-2006-0103170 |

(51) Int. Cl.
*G06F 15/16* (2006.01)

(52) U.S. Cl.
USPC ........................................................ 709/201

(58) Field of Classification Search
USPC ................ 709/217, 219, 201, 203; 705/8, 34
See application file for complete search history.

(56) References Cited

U.S. PATENT DOCUMENTS

| 6,601,234 B1 | 7/2003 | Bowman-Amuah |
| 7,246,349 B2 | 7/2007 | Moerdijk et al. |

(Continued)

FOREIGN PATENT DOCUMENTS

| EP | 1 515 571 A2 | 3/2005 |
| JP | 2004-280822 A | 10/2004 |

(Continued)

OTHER PUBLICATIONS

Linthicum, David: In: Linthicum, David S: "Enterprise application integration" Aug. 1, 2001, Addison-Wesley, Boston, XP007914348 ISBN: 0201709368, pp. 231-236.

(Continued)

*Primary Examiner* — Jason Recek
(74) *Attorney, Agent, or Firm* — IP Legal Services, LLC

(57) ABSTRACT

A legacy cooperation device and processing method for a mobile communication system to be cooperated in an open mobile business supporting system is disclosed. In one embodiment, the method includes i) setting up a plurality of biz objects that perform a determination process based on a service process and a result thereof of a legacy system of a mobile communication system, ii) providing an API (application program interface) for each of the setup biz objects, iii) receiving a result of performing a predetermined biz object from a legacy system through the provided API and iv) requesting a service process to a corresponding legacy system according to the requested biz object, receiving a result of performing the service process, and returning the received result to the legacy system that requests the service process.

6 Claims, 74 Drawing Sheets

U.S. PATENT DOCUMENTS

| | | | |
|---|---|---|---|
| 7,461,385 B2 | 12/2008 | Winter | |
| 2001/0056362 A1 | 12/2001 | Hanagan et al. | |
| 2002/0019884 A1 | 2/2002 | Gungabeesoon | |
| 2002/0101879 A1* | 8/2002 | Bouret et al. | 370/465 |
| 2003/0195997 A1 | 10/2003 | Ibert et al. | |
| 2004/0105427 A1 | 6/2004 | Friedrich et al. | |
| 2004/0133487 A1* | 7/2004 | Hanagan et al. | 705/34 |
| 2005/0055397 A1 | 3/2005 | Zhu et al. | |
| 2005/0228847 A1 | 10/2005 | Hayes, Jr. | |
| 2006/0041876 A1 | 2/2006 | Larsson et al. | |
| 2006/0136930 A1 | 6/2006 | Kaler et al. | |
| 2007/0076608 A1* | 4/2007 | Samuel et al. | 370/230 |
| 2009/0074175 A1 | 3/2009 | Wellons et al. | |
| 2009/0150518 A1 | 6/2009 | Lewin et al. | |

FOREIGN PATENT DOCUMENTS

| | | |
|---|---|---|
| KR | 10-2004-0035674 A | 4/2004 |
| KR | 10-2005-0024849 A | 3/2005 |
| KR | 10-2005-0040439 A | 5/2005 |
| KR | 10-2005-0057910 A | 6/2005 |
| WO | WO 03/021904 A2 | 3/2003 |

OTHER PUBLICATIONS

European Official Communication dated Aug. 19, 2010 for EP Application No. 08013418.2.
US Office Action dated Oct. 8, 2010 for U.S. Appl. No. 12/114,690.
US Office Action dated Oct. 29, 2010 for U.S. Appl. No. 12/537,940.
Extended European Search Report dated Jan. 20, 2011 for EP 06812363.7.
Extended European Search Report dated Jan. 5, 2011 for EP 08013417.4.
Extended European Search Report dated Jan. 5, 2011 for EP 08013420.8.
Extended European Search Report dated Jan. 4, 2011 for EP 08013419.0.
XP002456252, Statement in accordance with the Notice from the European Patent Office dated Oct. 1, 2007 concerning business methods (OJ EPO Nov. 2007, 592-593).
International search report for International application No. PCT/KR2006/004524 dated Feb. 14, 2007 by Korean Intellectual Property Office.
European Search Report for European Application No. 08013418.2-2221 dated Dec. 19, 2008 by European Patent Office.
Office Action dated Aug. 5, 2011 for U.S. Appl. No. 12/114,690, filed Aug. 2, 2008, which is related to captioned U.S. Appl. No. 12/538,052.
Notice of Allowance dated Oct. 3, 2011 for U.S. Appl. No. 12/537,940, filed Aug. 7, 2009, which is related to captioned U.S. Appl. No. 12/538,052.
Office Action dated Apr. 2, 2010 for related U.S. Appl. No. 12/114,690.
Office Action dated Feb. 18, 2011 for related U.S. Appl. No. 12/114,690.
Office Action dated Apr. 20, 2011 for related U.S. Appl. No. 12/537,940.
Office Action dated Jun. 1, 2011 for related U.S. Appl. No. 12/537,931.

* cited by examiner

FIG. 14
(a)
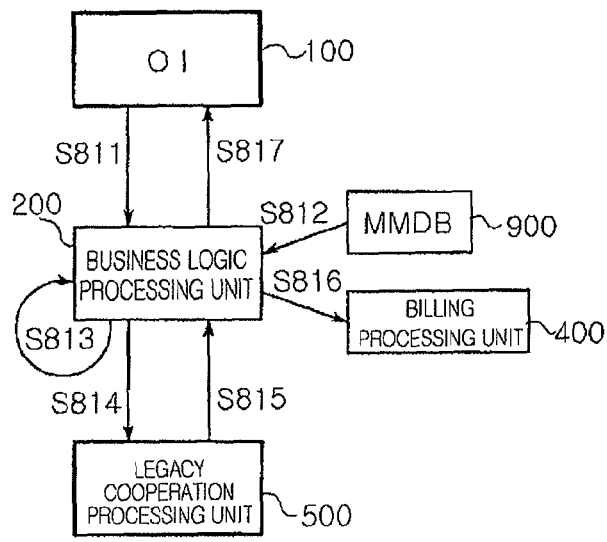
(b)
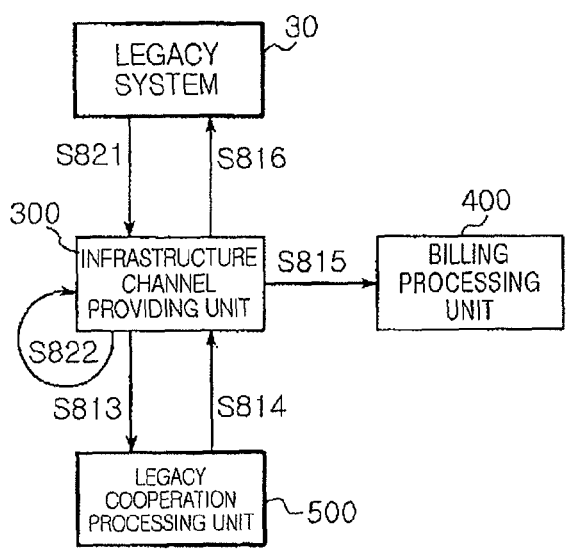

| NO | Type | FUNCTION | BIZ OBJECT NAME |
|---|---|---|---|
| 1 | I | INQUIRE USER INFORMATION | AUTHENTICATION USERINFORMATION INQUIRY |
| 2 | P | CHECK USER WHETHER SERVICE IS ALLOWED TO PROVIDE OR NOT | USER INFORMATION CHECK |
| 3 | P | CHECK TERMINAL WHETHER MMS IS SUPPORTED OR NOT | TERMINAL INFORMATION CHECK |
| 4 | I | TRANSMIT MMS | MESSAGING_ MMS TRANSMIT |

| NO | Type | FUNCTION | BIZ OBJECT NAME |
|---|---|---|---|
| 1 | I | INQUIRE INFORMATION OF USER TO REQUEST LBS | AUTHENTICATION USERINFORMATION INQUIRY |
| 2 | P | CHECK USER WHETHER SERVICE IS ALLOWED TO PROVIDE OR NOT | USER INFORMATION CHECK |
| 3 | I | INQUIRE LOCATION INFORMATION | LOCATION INFORMATION LBS LOCATION INQUIRY |

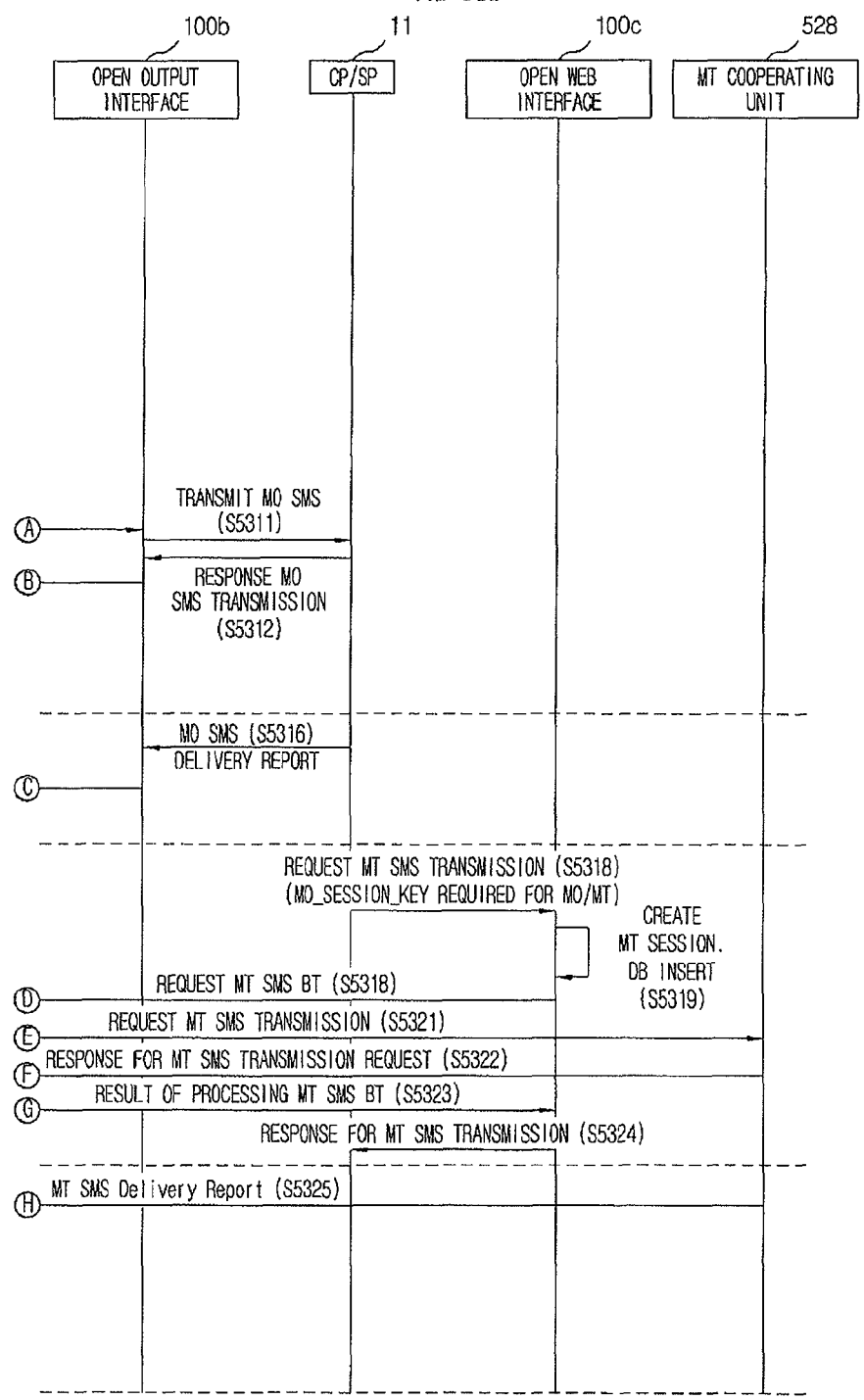

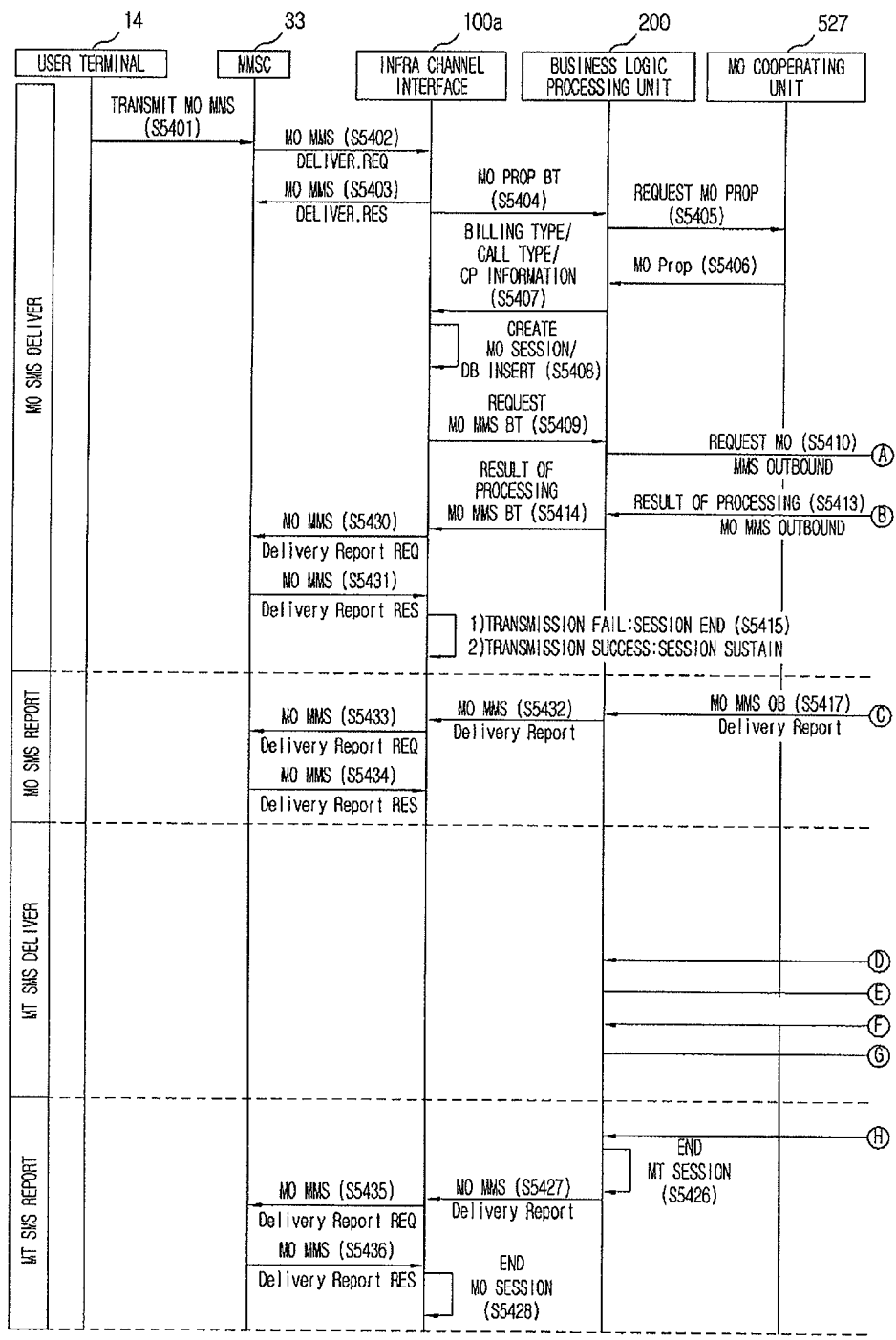

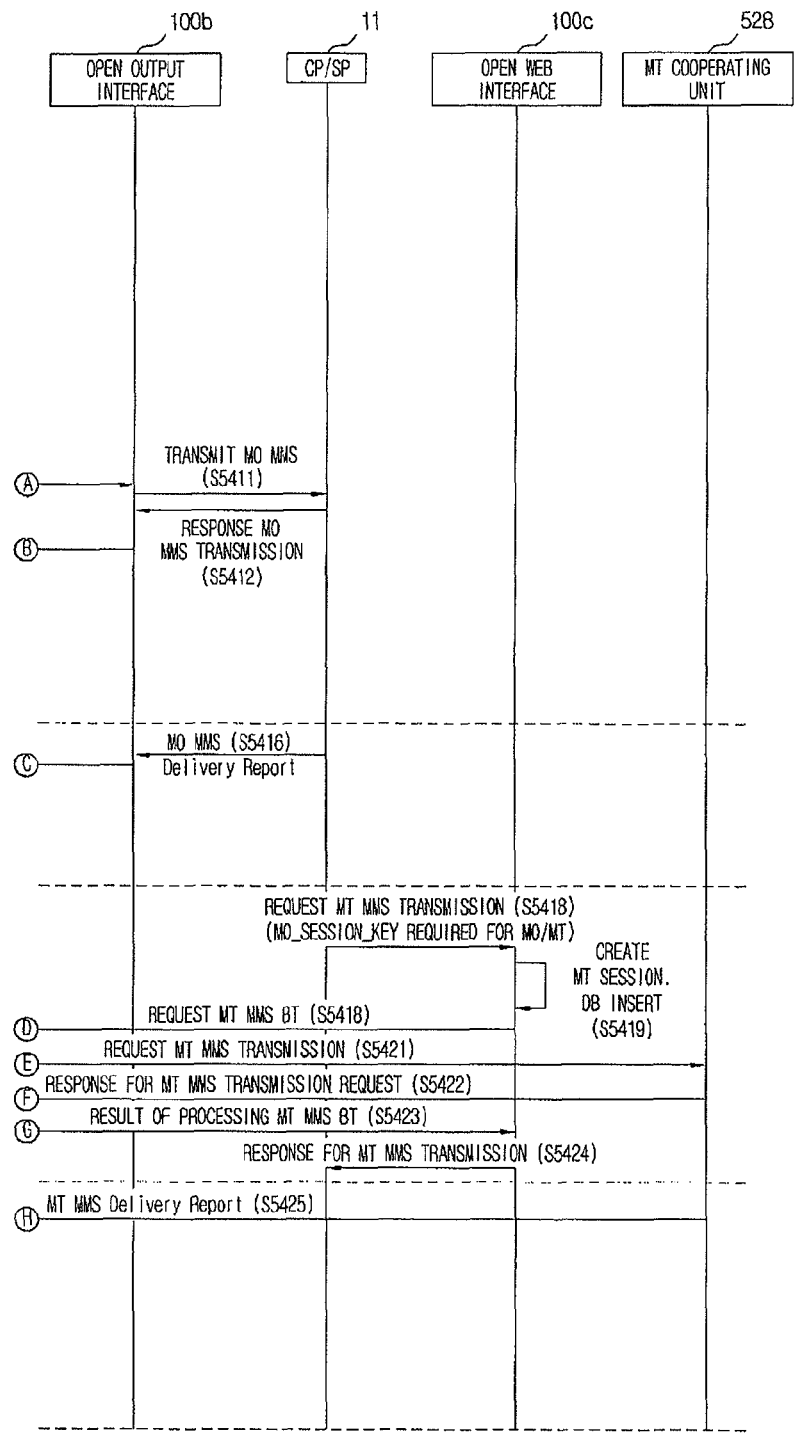

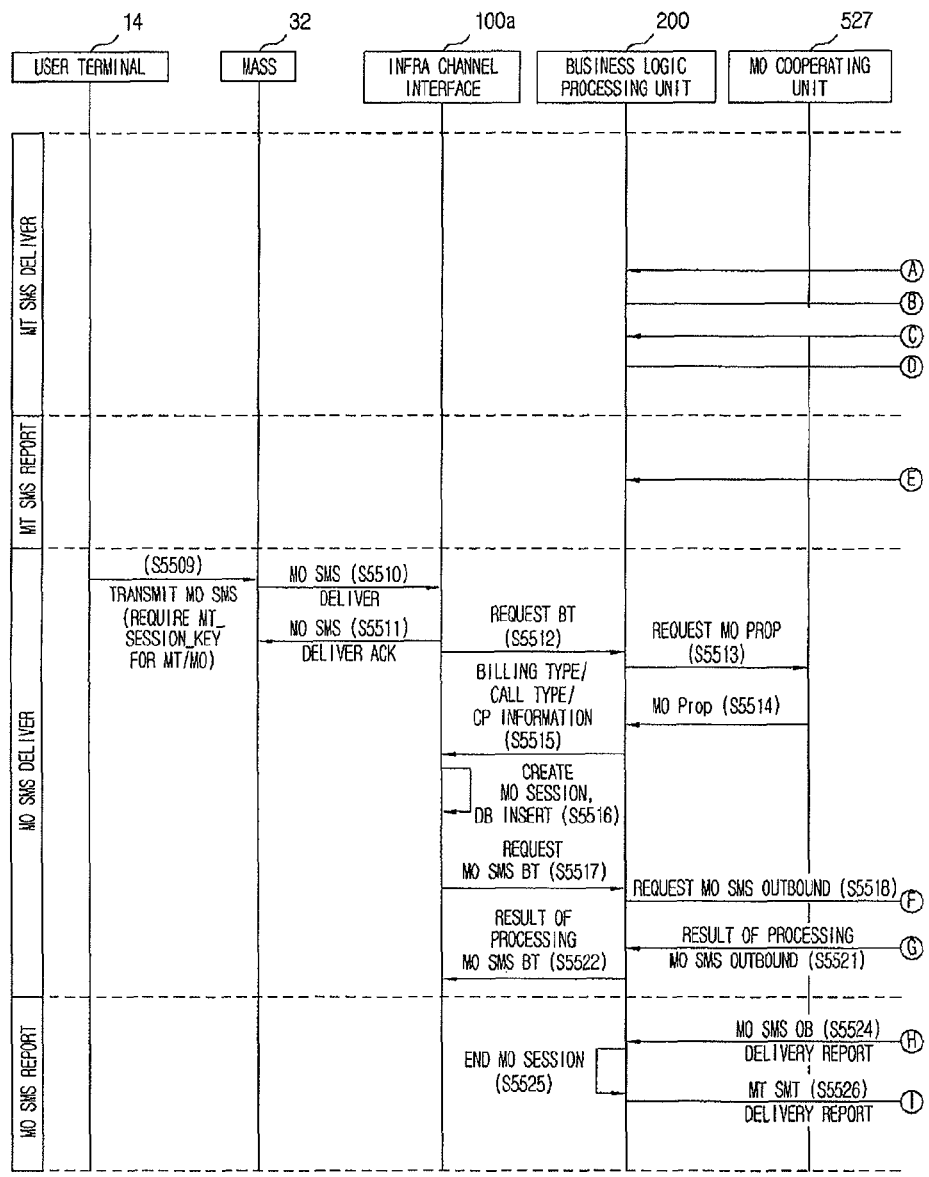

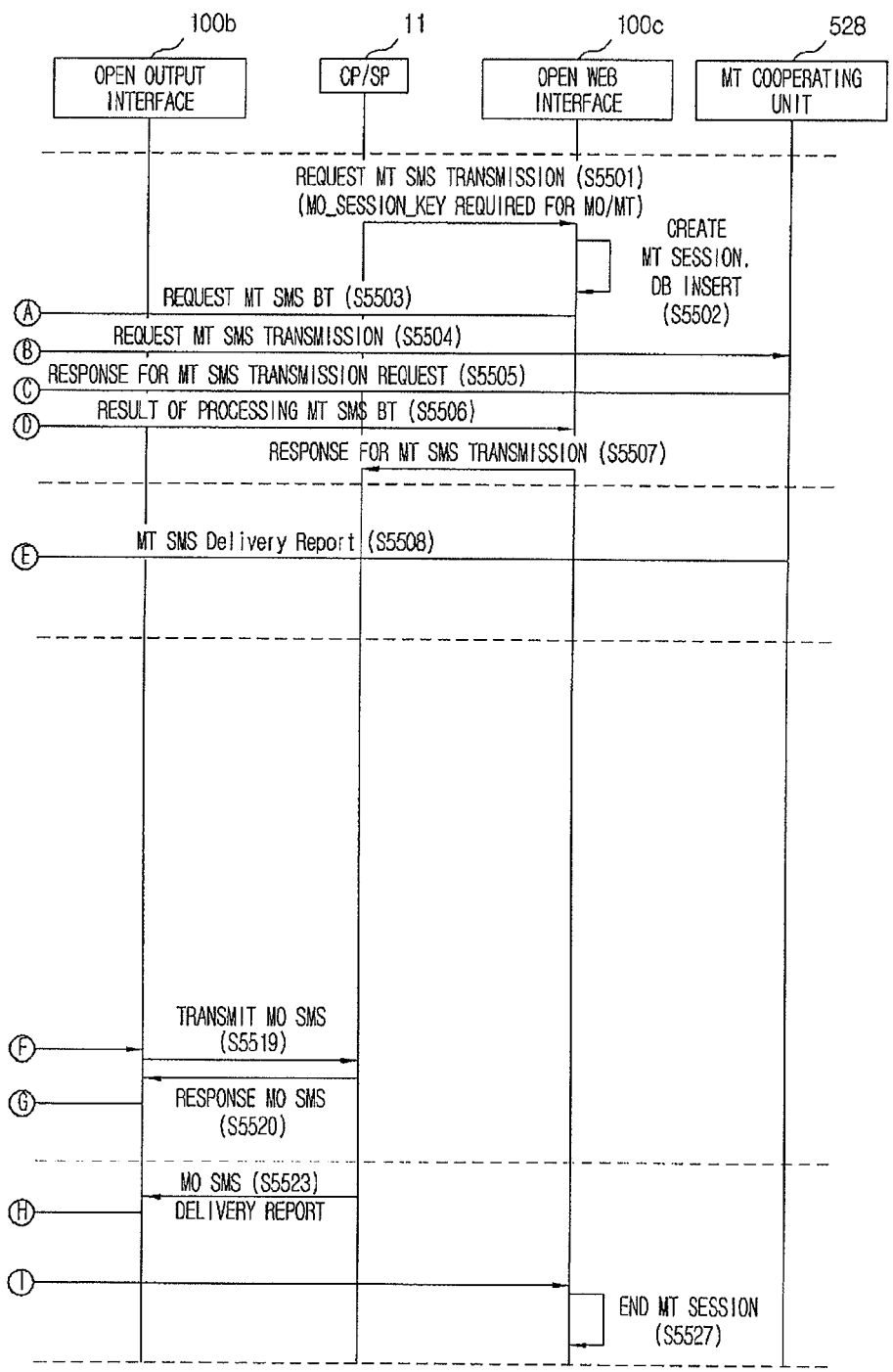

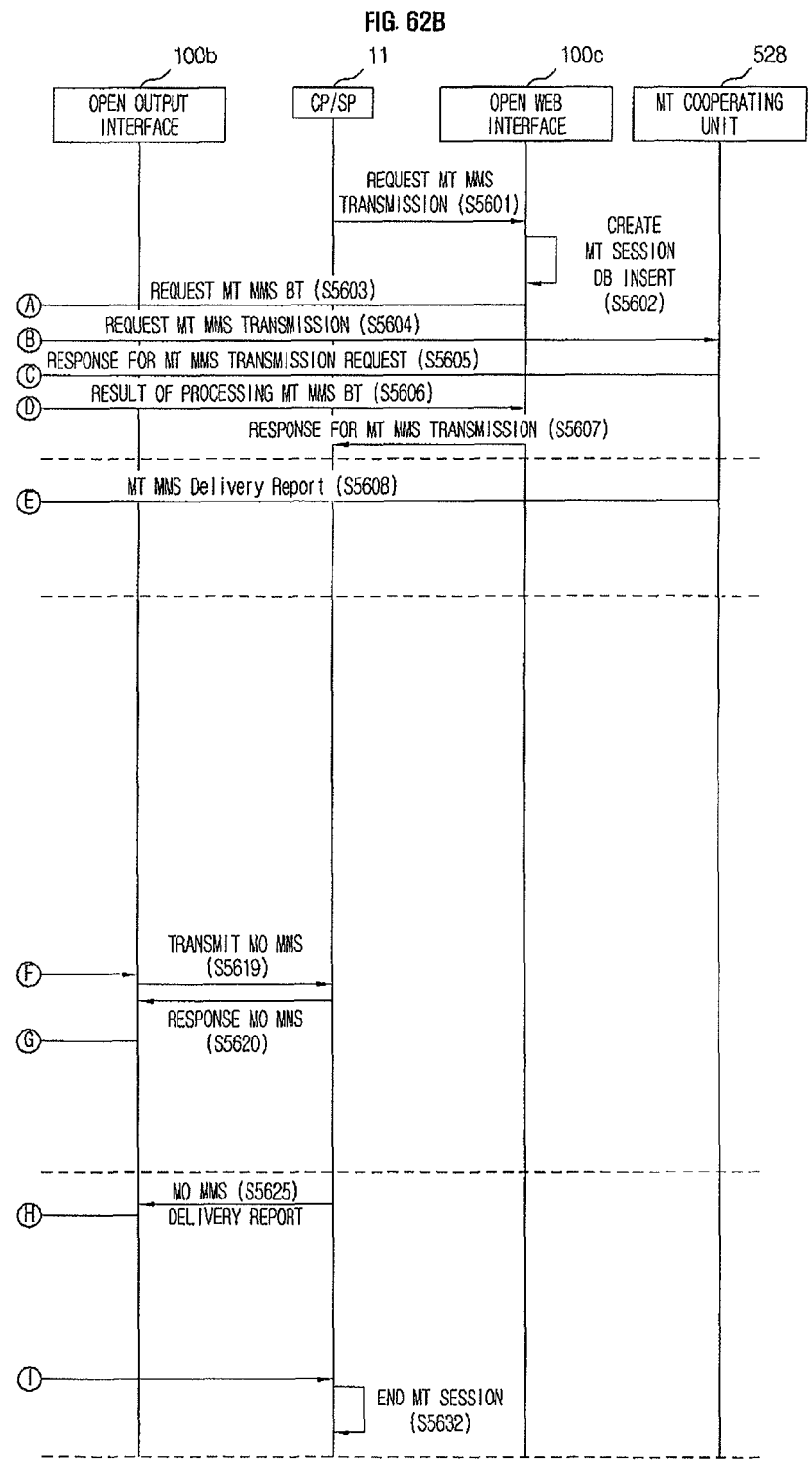

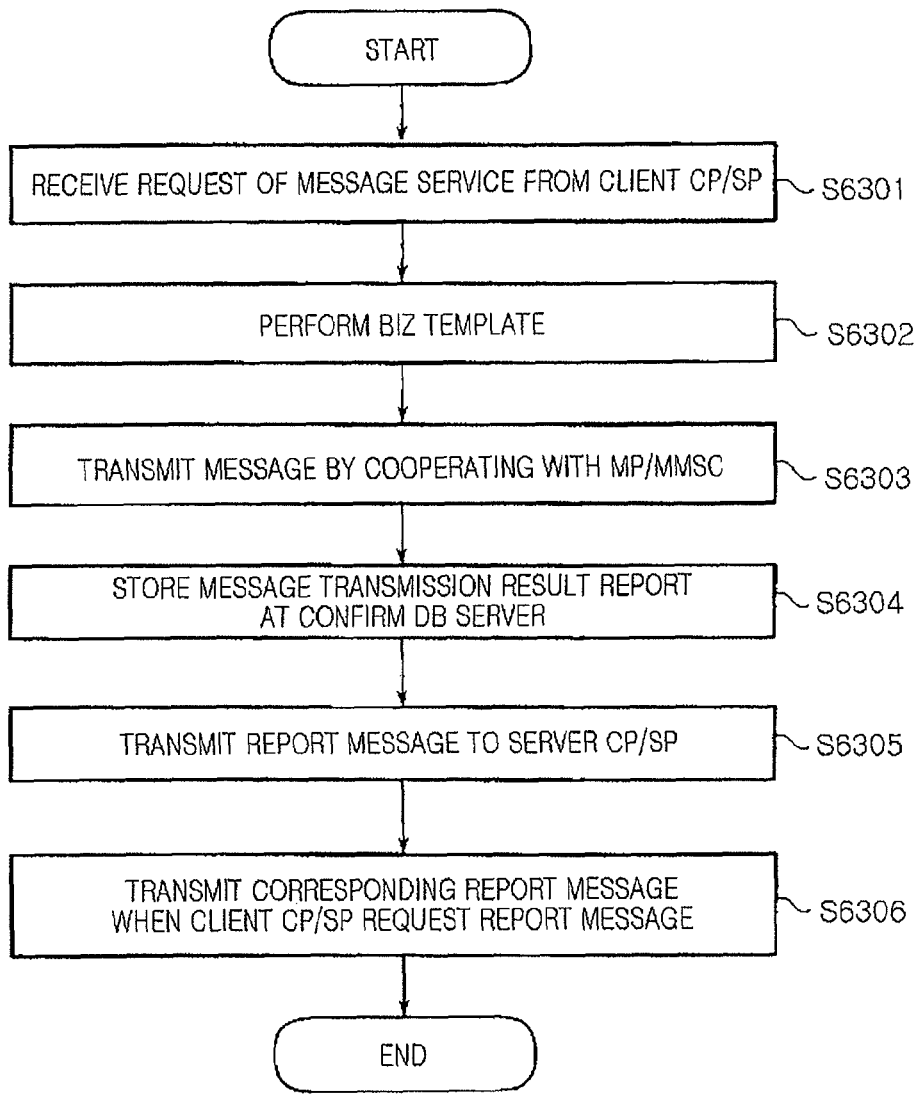

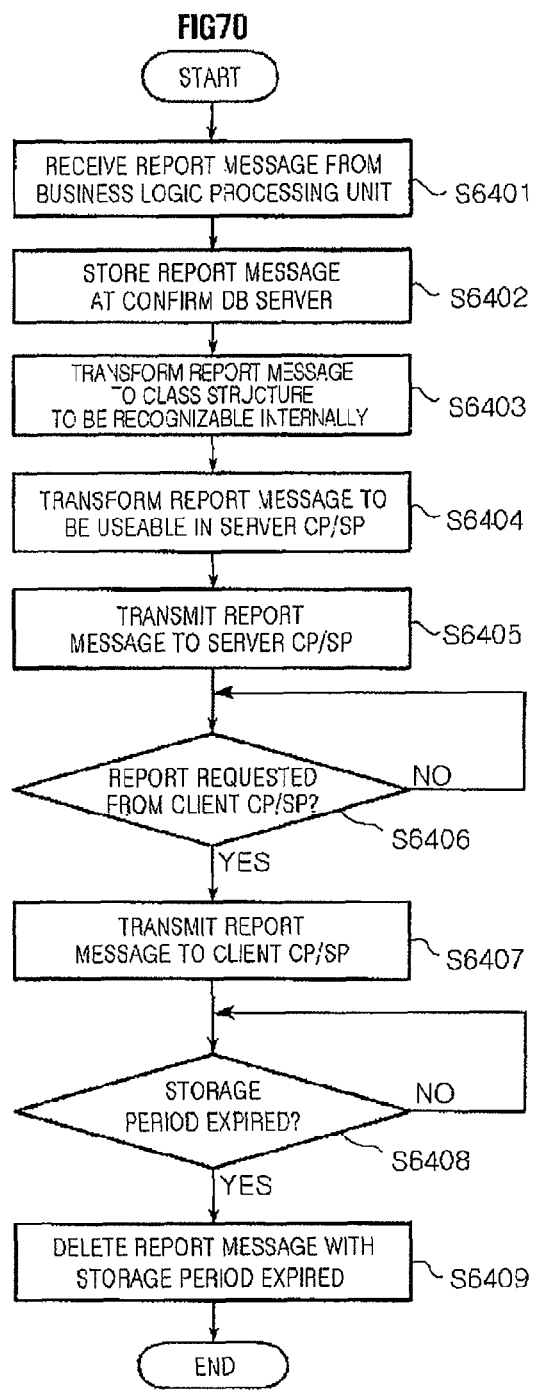

LEGACY COOPERATION DEVICE AND PROCESSING METHOD

RELATED APPLICATIONS

This application claims priority to and is a divisional of U.S. application Ser. No. 12/114,690, filed May 2, 2008 which is a continuation application, and claims the benefit under 35 U.S.C. §§120 and 365 of PCT Application No. PCT/KR2006/004524, filed on Nov. 2, 2006 and, which is hereby incorporated by reference. PCT/KR2006/004524 also claimed priority from Korean Patent Applications Nos. 10-2005-0107242 (filed on Nov. 9, 2005), 10-2005-0109047 (filed on Nov. 15, 2005), 10-2005-0109308 (filed on Nov. 15, 2005), 10-2005-0109586 (filed on Nov. 16, 2005), 10-2005-0111368 (filed on Nov. 21, 2005), 10-2005-0111369 (filed on Nov. 21, 2005), 10-2005-0111373 (filed on Nov. 21, 2005), 10-2006-0103170 (filed on Oct. 23, 2006), 10-2005-0105076 (filed on Nov. 3, 2005), 10-2005-0107184 (filed on Nov. 9, 2005), 10-2005-0107243 (filed on Nov. 9, 2005), 10-2005-0107244 (filed on Nov. 9, 2005), 10-2005-0107245 (filed on Nov. 9, 2005), 10-2005-0107246 (filed on Nov. 9, 2005), 10-2005-0107247 (filed on Nov. 9, 2005), 10-2005-0107248 (filed on Nov. 9, 2005), 10-2005-0107249 (filed on Nov. 9, 2005), 10-2005-0108611 (filed on Nov. 14, 2005), 10-2005-0108638 (filed on Nov. 14, 2005), and 10-2005-0108643 (filed on Nov. 14, 2005), all of which are hereby incorporated by reference.

This application relates to 1) U.S. patent application entitled "OPEN INTERFACE DEVICE AND METHOD" Ser. No. 12/537,931, 2) U.S. patent application entitled "BUSINESS LOGIC DEVICE AND PROCESSING METHOD" Ser. No. 12/537,940, and 3) U.S. patent application entitled "BILLING DEVICE AND PROCESSING METHOD" Ser. No. 12/538,037, all of which are concurrently filed with this application and incorporated herein by reference in their entirety.

BACKGROUND OF THE INVENTION

1. Field of the Invention

The present invention relates to an open type mobile business supporting system and method for supporting various business models from content providers or service providers (CP/SP) by providing an integrated interface for various resources of a mobile communication system.

2. Description of the Related Technology

With the development of wireless Internet technology and the popularization of mobile communication terminals, various mobile business models have been introduced to provide services to a user of a mobile communication terminal through a wireless communication system. A wireless Internet based content service provider often uses a service of a wireless communication system to authenticate a user or to perform a billing operation for a predetermined service to a corresponding user.

SUMMARY OF CERTAIN INVENTIVE ASPECTS

One aspect of the invention is an open mobile business supporting method and system for effectively supporting various business models desired by a content/service provider by providing a single interface that can integrally use various resources of a mobile communication system.

Another aspect of the invention is an open mobile business supporting method for supporting a content provider/service provider (CP/SP) mobile service using a legacy system of a mobile communication system. The open mobile business supporting method in accordance with an embodiment of the present invention can include: setting up low-level functions, which can be grouped as a unit function among service logics of a CP/SP and performed by a wireless communication system, as biz logics; receiving a request of performing a predetermined biz logic from the CP/SP; and performing the request biz logic by cooperating with a legacy system of a mobile communication system and internally performing predetermined processes, and returning the result of performing the biz logic to the CP/SP.

Another aspect of the invention is an open mobile business supporting system. The pen mobile business supporting system in accordance with an embodiment of the present invention can include: a business logic processing unit for storing, managing, and performing a biz template that groups service logics of a content provider/service provider (CP/SP) to a unit function, defined based on a biz logic which is a low-level function performed by a mobile communication system, and formed by arranging a plurality of biz objects in a predetermined order, where the biz object cooperates with each legacy system of a mobile communication system and performs a comparison and determination operation on the result of cooperating; an open interface processing unit for receiving a request of performing a predetermined biz logic from a CP/SP, requesting the business logic processing unit to perform a biz template corresponding to the requested biz logic, receiving the result of the request, and transferring the received result to the CP/SP; and a legacy cooperation processing unit for relaying a request from a predetermined legacy system and returning the result to the predetermine legacy system while performing a biz template by relaying interworking between the business logic processing unit and a legacy system of a mobile communication system.

According to certain embodiments of the present invention, an open mobile business supporting system supports various infra resources in a wireless communication system to be independently operated and integrally driven, thereby making the various infra resources conveniently and effectively cooperated together. Furthermore, the open mobile business supporting system provides an integrated interface for the infra resources in the wireless communication system. Therefore, a service and an application layer can easily use the infra resources of the wireless communication system.

Moreover, the open mobile business supporting system according to at least one embodiment of the present invention classifies biz logic management, service management, and service execution, thereby effectively supporting various business models.

BRIEF DESCRIPTION OF DRAWINGS

FIG. 14A and FIG. 14B are flowcharts illustrating an open mobile business supporting method according to an embodiment of the present invention.

FIG. 60 is a diagram illustrating a procedure of processing an MT MMS message after processing an MO MMS message using an open mobile business supporting system according to an embodiment of the present invention.

FIG. 61 is a diagram illustrating a procedure of processing an MO SMS message after processing an MT SMS message using an open mobile business supporting system according to an embodiment of the present invention.

FIG. 69 is a flowchart illustrating a procedure for confirming a message transmission result after transmitting a message in an open mobile business supporting system according to an embodiment of the present invention. and FIG. 70 is a diagram illustrating the operations of an ROI processing unit according to an embodiment of the present invention.

DETAILED DESCRIPTION OF CERTAIN INVENTIVE EMBODIMENTS

Figure 1:
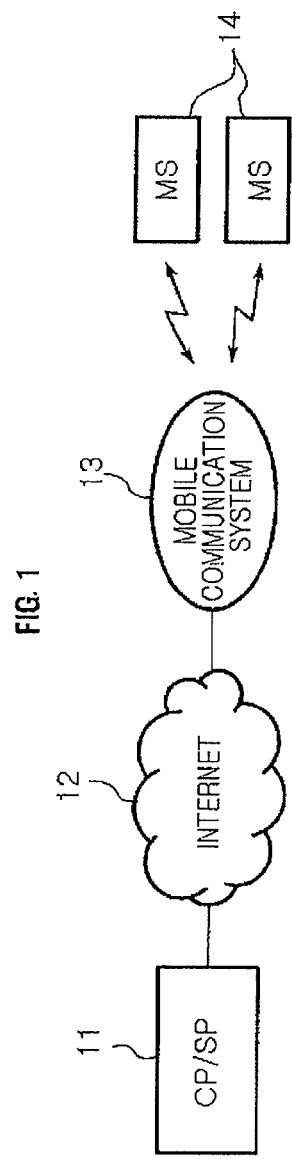
FIG. 1 is a block diagram illustrating a network for a mobile service.

FIG. 1 is a block diagram illustrating a network for a mobile service. A content provider (CP)/service provider (SP) system 11 that provides a mobile service, which accesses a mobile communication system 13 through the Internet 12. The CP/SP system 11 provides a predetermined service to a plurality of mobile stations (MS) 14 or transmits data to the plurality of mobile stations 14.

The mobile terminal 14 denotes a small and light wireless communication device so as to allow a user to carry it anywhere and anytime, such as a portable phone or a personal digital assistant. Basically, the mobile terminal 14 includes a transmitting/receiving function for transmitting and receiving a voice and data signal through a mobile communication network, a controlling function for controlling overall operations according to programmed control procedures, a user interface function for providing a user interface to a user, a display unit for displaying menus, messages, or graphics according to an operation state of the mobile terminal in response to the control of the controlling unit. The mobile terminal 14 may include applications such as a browser.

Figure 2:
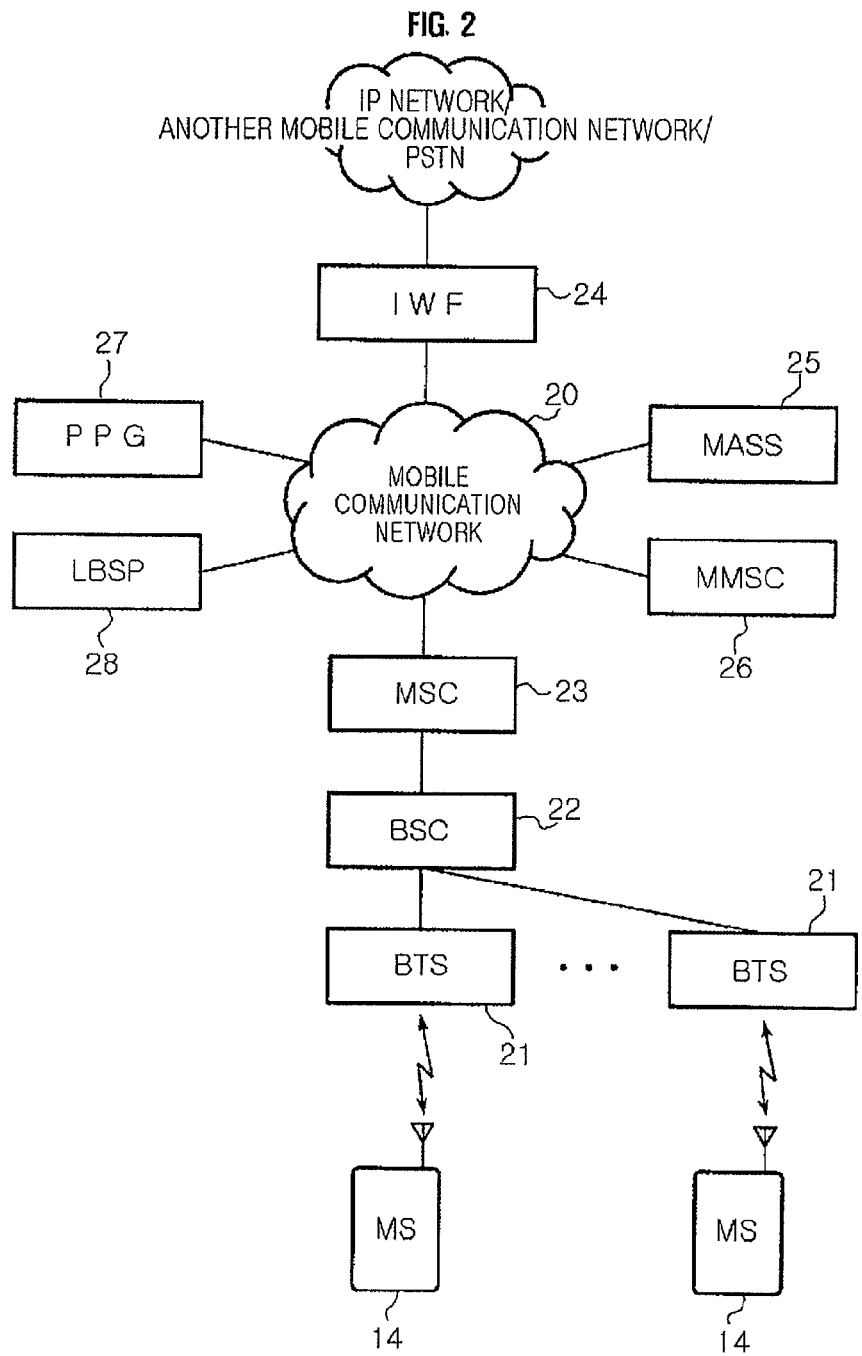
FIG. 2 is a diagram illustrating a mobile communication system.

The mobile communication system 13 denotes a system providing a wireless voice communication service or a wireless Internet service to the mobile terminal 14. As shown in FIG. 2, the mobile communication system 13 basically includes a plurality of base transceiver stations (BTS) 21 for managing a wireless communication region, a plurality of base station controllers (BSC) 22 for controlling the BTSs 21, a mobile switching center (MSC) 23 for accessing each BTS 22 and authenticating information about a mobile communication service subscriber, and an interworking function (IWF) 24 for transforming formats of voice data and packet data and connecting to an IP network or to another mobile communication network. The mobile communication system 13 further includes systems for providing various additional services such as a short message service system (MASS) 25 for providing a text message transfer service, a multimedia message service center (MMSC) 26 for providing a transceiving service of a multimedia message including video, text and voice, and a push proxy gateway (PPG) 27 for providing a message push service to a mobile terminal 14, and a location based service system (LBSP) 28 for providing a service related to location information. In addition, the mobile communication system 13 may include various other systems for managing subscribers.

The MSC 23, the JWF 24, the MASS 25, the MMSC 26, the PPG 27, and the LBSP 28 are connected through an internal network of the mobile communication system 13 or a packet network 20.

When a predetermine mobile service is provided from the CP/SP system 11 through the mobile communication system, various operations are simultaneously performed in the mobile communication system 13, such as downloading a corresponding service or content, user authentication, and charging operation for using the mobile communication system 13.

For example, in order to transmit a multimedia message, a sender and a receiver are authenticated through an authentication system (not shown) of the mobile communication system, and a user's mobile terminal is checked whether the mobile terminal has a function to receive a multimedia message through a terminal information management system (not shown). After authenticating the sender and the receiver and checking the model type of the user's terminal, message transmission is requested by accessing the MMSC 500, and a billing operation is performed after completely transmitting the corresponding multimedia message.

In order to provide one mobile service, the mobile communication system 13 needs to cooperate with various internal systems, which is referred to as legacy systems, hereinafter. Typically, the CS/SP system 11 need to directly access each of the legacy systems of the mobile communication systems 13 to request necessary processes and to receive the results thereof. In this case, the CP/SP system 11 needs interfaces for each legacy system of the mobile communication system 13. Therefore, the structure of the CP/SP system 11 becomes complicated, and the CP/SP system 11 needs to exchange messages with the mobile communication system 13 several times in order to provide one service, making it difficult to provide a quick and stable service.

Hereinafter, embodiments of the present invention will be described in detail with reference to the attached drawings.

Figure 3:
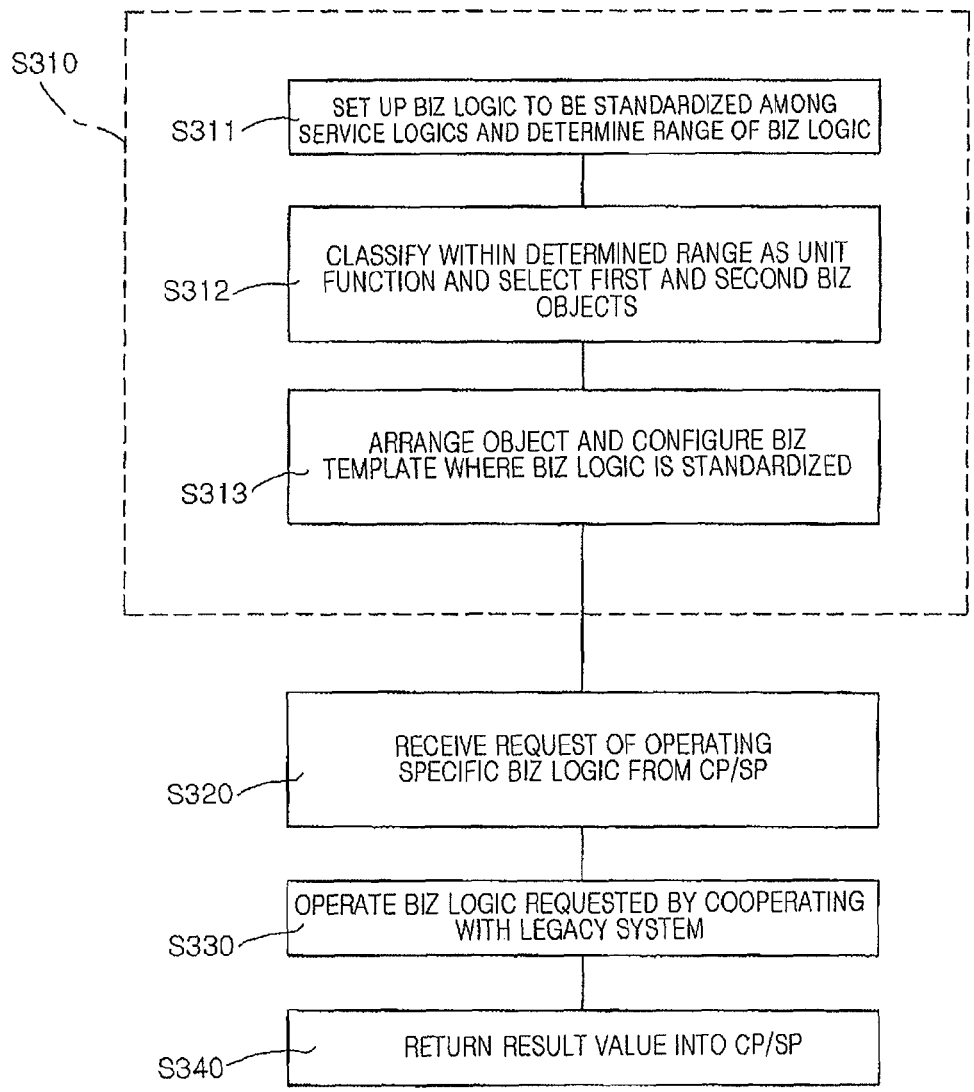
FIG. 3 is a flowchart illustrating an open mobile business supporting method according to an embodiment of the present invention.

FIG. 3 is a flowchart illustrating an open mobile business supporting method according to an embodiment of the present invention.

Referring to FIG. 3, the open mobile business supporting method according to an embodiment of the present embodiment is performed as follows.

In the open mobile business supporting method according to an embodiment of the present embodiment, it selects logics that are performed in a mobile communication system 13 and starts and ends at a content provider (CP)/service provider (SP) system 11 from logics of mobile services provided from the CP/SP system 11, and standardizes the selected logics. Then, the standardized logics are provided. Therefore, in the open mobile business supporting method according to an embodiment of the present embodiment, low-level functions, which can be grouped as a unit function and can be performed in a mobile communication system, are defined as biz logics in step S310 of FIG. 3.

Each of the biz logics is a logic that starts at the CS/SP system 11, and is performed by cooperating with legacy systems of the mobile communication system 13, comparing the cooperating results, making a decision based on the comparison results, and transfers the result thereof to the CP/SP system 11. The biz logic is a set of low-level functions, which can be grouped as a single function among the service logics provided by the CP/SP system 11. It may define the biz logic in consideration of frequency of use and reusability in diverse CP/SP systems 11. For example, in any types of mobile services, a generally required logic, such as a user authentication process or a terminal authentication process, has high reusability. Therefore, the user authentication process or the terminal authentication process may be defined as a biz logic. As another example, in case of a mobile service for downloading specific content or specific files to a mobile communication terminal 14, diverse functions, such as an authentication process, a data transform process and a billing process, are consecutively performed. The mobile service for downloading content is frequently used. Therefore, such a mobile service for downloading specific content or specific files may be defined as the biz log.

The setup procedure of the biz logic will be described in detail. In step S311, a predetermined service logic is selected through verifying the amount used, a usage trend, and a business aspect. Subsequently, a part corresponding to a range of the biz logic is selected from the service logics.

Figure 4:
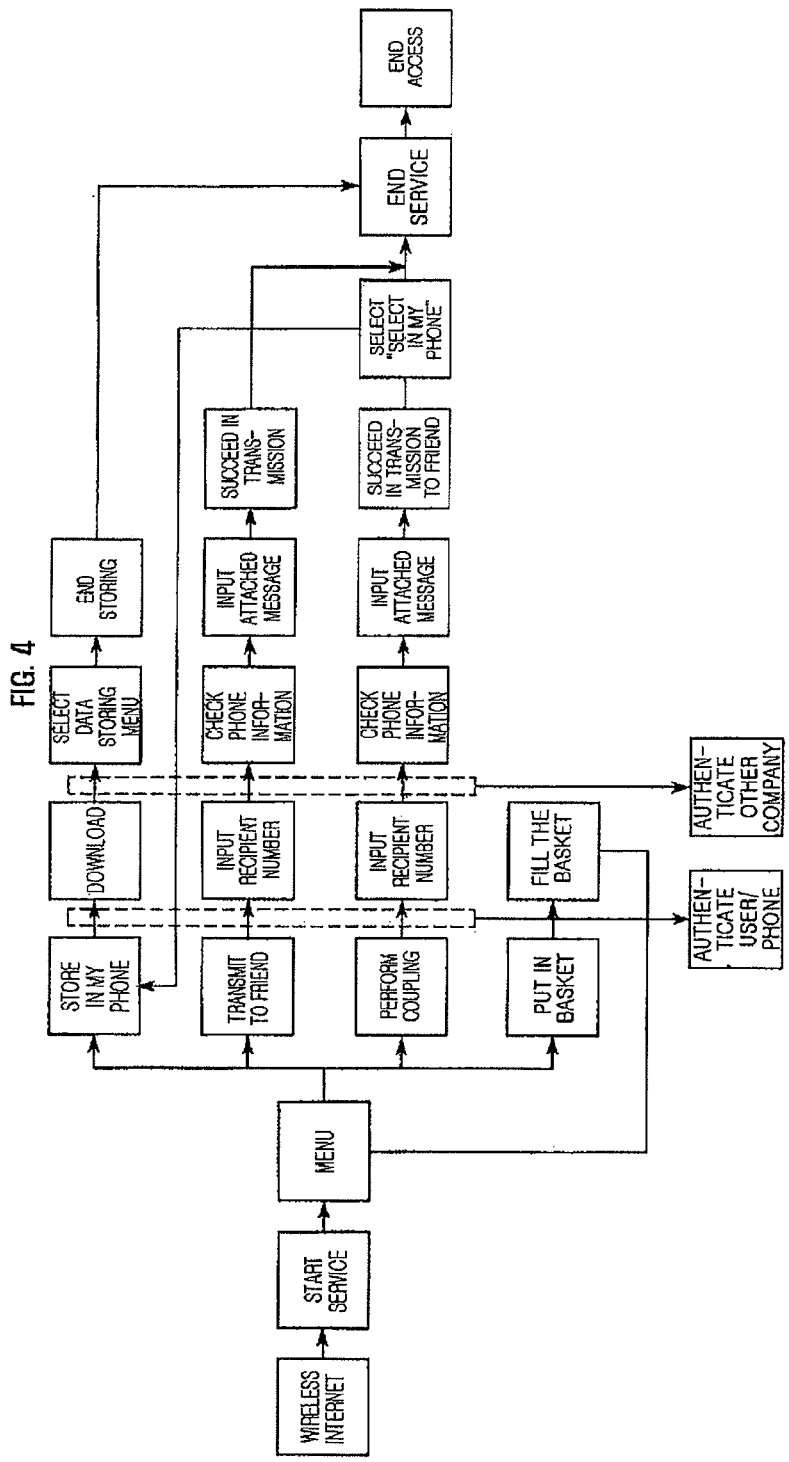
FIG. 4 to FIG. 10 are diagrams illustrating a method of embodying a biz logic and a biz template by an open mobile business supporting method according to an embodiment of the present invention.

FIG. 4 is a diagram illustrating services selected for defining a biz logic in an open mobile business supporting system according to an embodiment of the present embodiment. As shown in FIG. 4, a service of "download to my phone" is selected among menus, which are provided through a service of a wireless Internet of the mobile communication terminal 14. The menu includes services of "download to my phone", "transmit to a friend", "perform coupling" and "put in a basket." A detailed logic of the selected service will be described with reference to FIG. 5.

Figure 5:
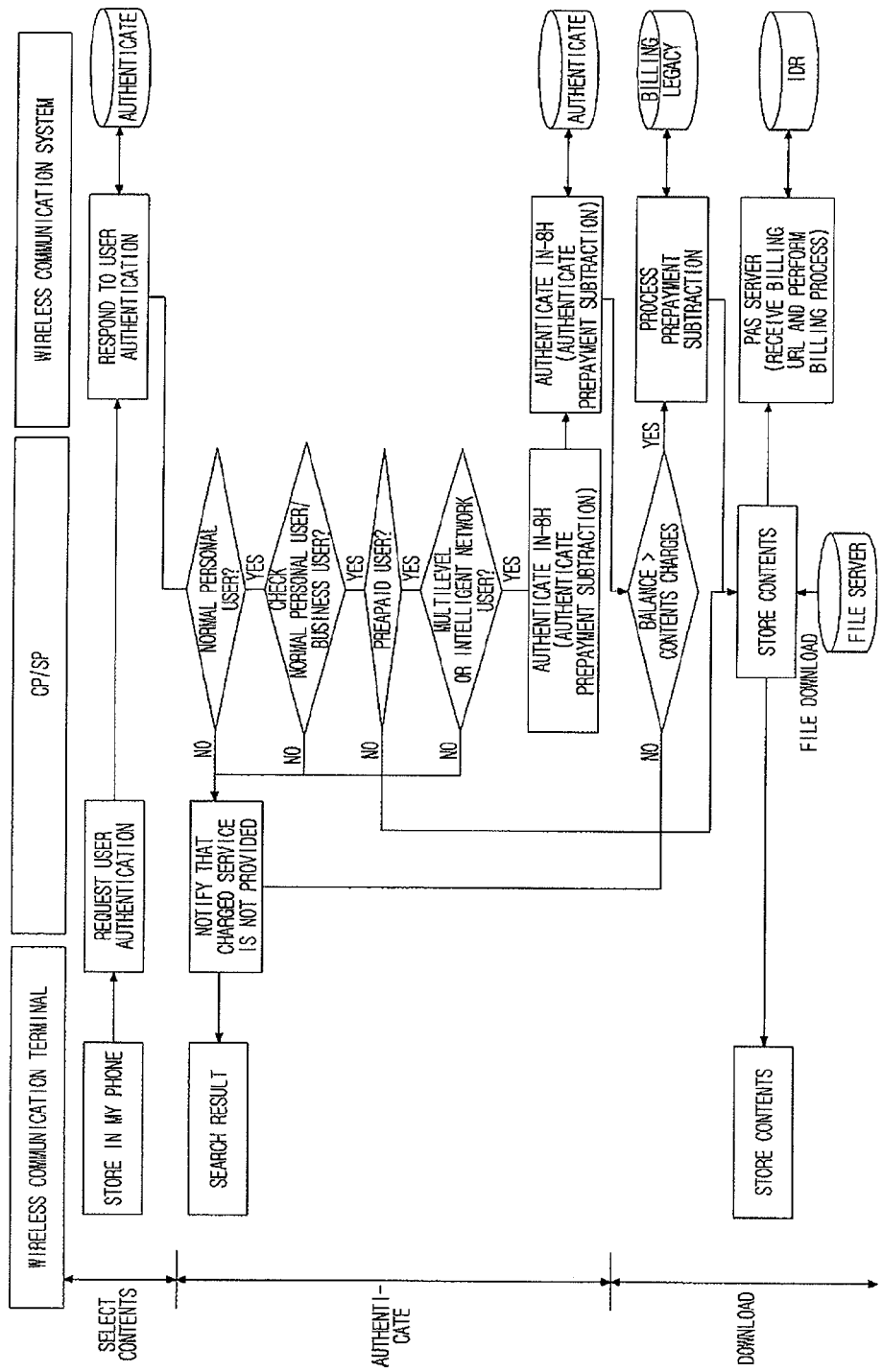

In FIG. 5, the mobile service of "download to my phone" includes the steps of selecting specific content by a user through the mobile communication terminal 14, selecting the "download to my phone" menu, requesting a user authentication process using a phone number as input data, determining whether the user is a normal personal user or a business user and whether the user is a prepaid user or an intelligent network user, notifying that requested service is not available through the mobile communication terminal 14 if the user is an abnormal personal user or a business user, performing a billing process that subtracts a related fee of the requested service from the prepaid amount if the user is determined to be a prepaid user, and transmitting related content and performing a billing operation if the user is determined as a normal personal user.

Figure 6:
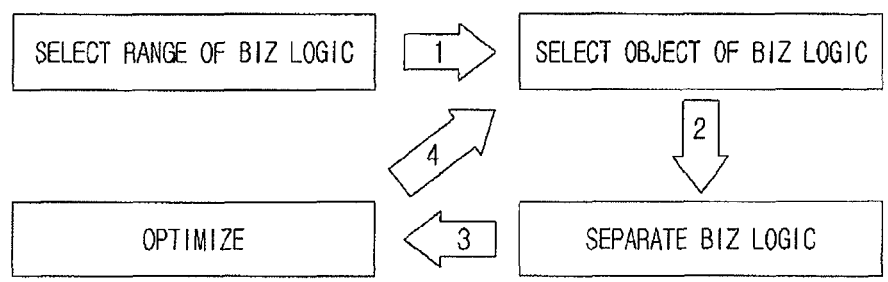

As shown in FIG. 6, a biz logic is determined among the selected service logics through range selection, objects selection, separation and optimization.

A reference for selecting a biz logic from the service logics may be how well functional units of the logic are collected, how well a format adding individual logics is derived as a standardized format, how realistically the logic is used, if the format of the logic is neutral and independent enough to be re-formed in the other case. The biz logic is separated in a case that the service logic requires a user to input, a case that input/output values of the service logic are different, and a case that the service logic is affected by external factors.

Figure 7:
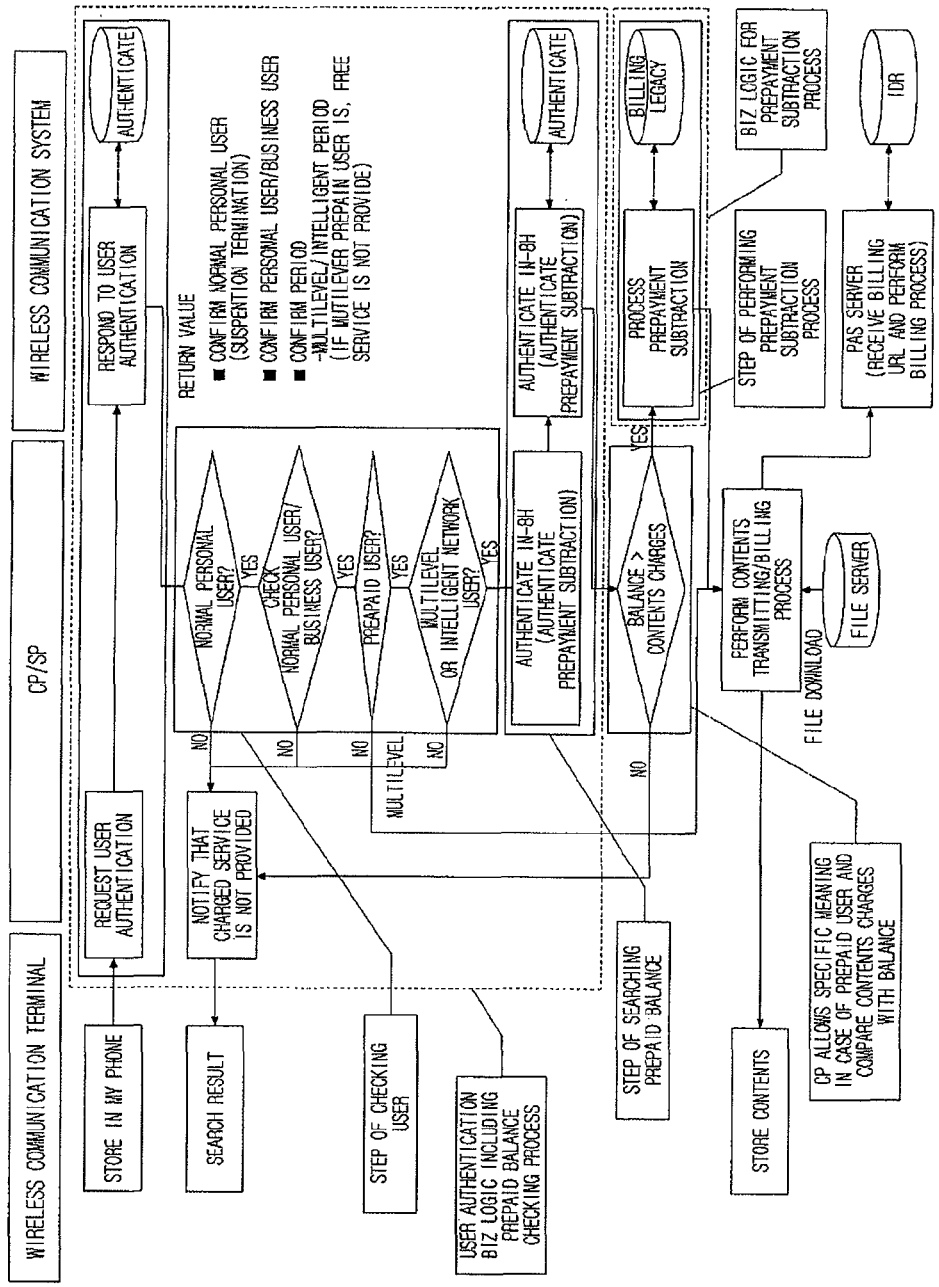

FIG. 7 is a diagram illustrating an example of the biz logic defined from the service logics of "download to my phone" through procedures of FIG. 6. That is, the biz logic is divided into a biz logic for performing a user authentication process including a prepaid balance checking process, and a biz logic for performing a billing process that subtracts the related fee from the prepaid balance.

As described above, when the range of the biz logic is determined, the determined biz logic is analyzed in step S3122. A logic, which needs to cooperate with legacy systems of a mobile communication system 12, is set up as a first Biz object, i.e., an I-type object. A logic performing a comparing or determining process based on a cooperation result with the legacy system is set up as a second Biz object, i.e., a P-type object. An input value and an output value of the first and second Biz objects are defined.

The second Biz object can be defined as a single Biz object if many comparing/determination steps can be performed as a single unit process.

Figure 8:
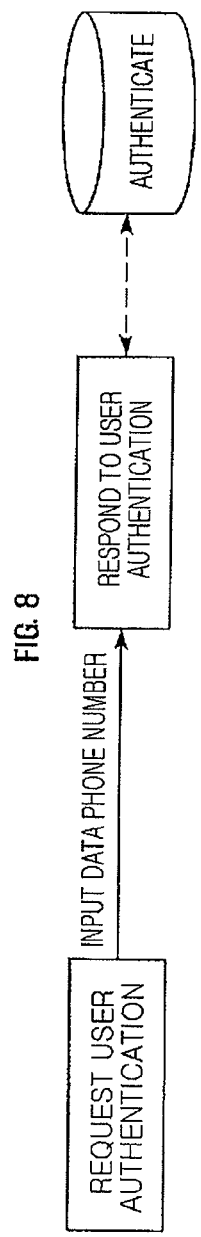

FIG. 8 is a diagram for describing how a first biz object is set up in the user authentication process including a prepaid balance checking process as shown in FIG. 7. The first biz object is an object requesting the user authentication process by cooperating with an authentication legacy system.

Figure 9:
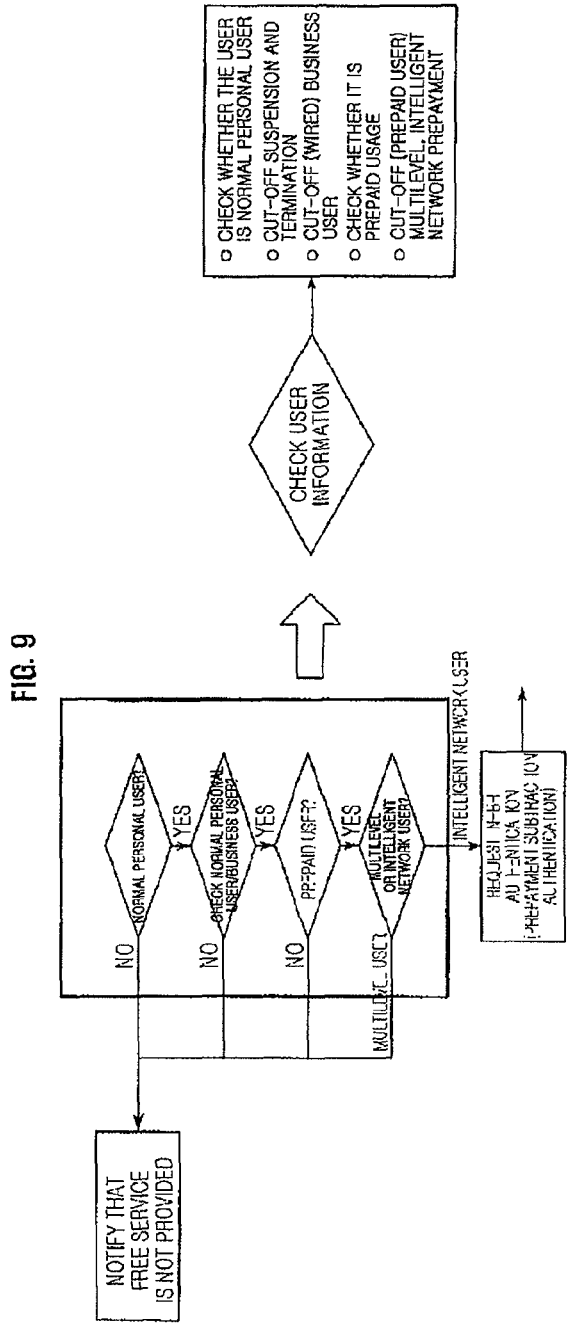

FIG. 9 is a diagram for describing how the second Biz object is set up in the biz logic for performing a user authentication process including a selected prepaid balance checking process as shown in FIG. 7. The second Biz object determines whether a service is provided according to a process result with the authentication legacy system. The second Biz object is set up by classifying procedures of checking whether a user is a normal personal user or a business user, whether the user is a prepaid user or not, and whether the prepaid user is a multilevel user or an intelligent network user.

The first and second Biz objects are respectively set up by analyzing the logic within the determined range. The first and second Biz objects are arranged according to the flow of a corresponding biz log. The input and output values are defined. Accordingly, a Biz template, which is an operation format of the corresponding biz log, is formed in step S313. The Biz template can have a format of a general flowchart. The Biz template includes a list of Biz objects, an attribute of each object, an operation order of the Biz objects, description of conditional branch, input parameter information for operating the Biz objects, a data controlling method, output parameter information derived by operating the Biz template, and operation time-out setup information.

Figure 10:
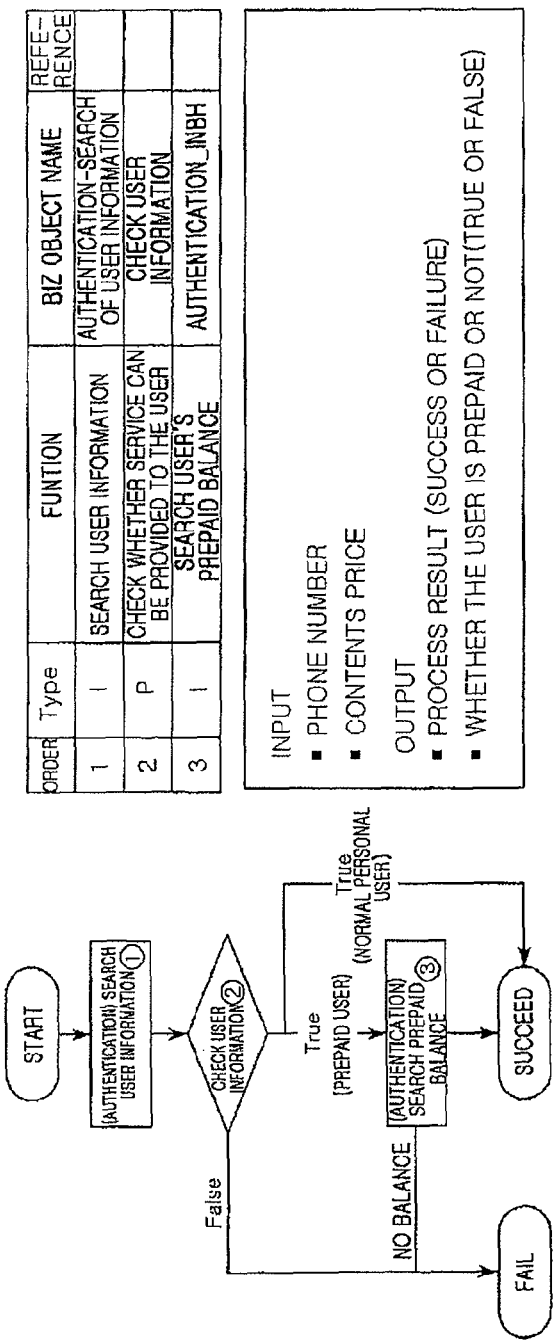

FIG. 10 is a diagram for describing the Biz template, which standardizes the biz logic for performing a user authentication process including a selected prepaid balance checking process as shown in FIG. 7. As shown in a table on the right side of FIG. 10, the Biz template includes an I-type authentication_user information checking Biz object, a P-type user information checking Biz object, and an I-type authentication repaid checking Biz object. The I-type authentication_user information checking Biz object checks user information. The P-type user information checking Biz object checks whether the service can be provided to the user. The I type authentication_prepaid checking Biz object checks a prepaid balance of the user. A flow of the Biz template is described as shown in the flowchart on the left side of FIG. 10.

When input data of the Biz template are a user telephone number and a price of content, output data are information on whether the process result is successful or not, and whether the user is a prepaid user.

As described above, the Biz template is a format that the biz logic is realized. The Biz templates including a user authentication template, a Short Message Service (SMS) transmitting template, an MMS transmitting template, a general location detecting template, and a push method platform message transmitting template based on SMS/cell broadcasting service (CBS) can be realized.

Figure 11:
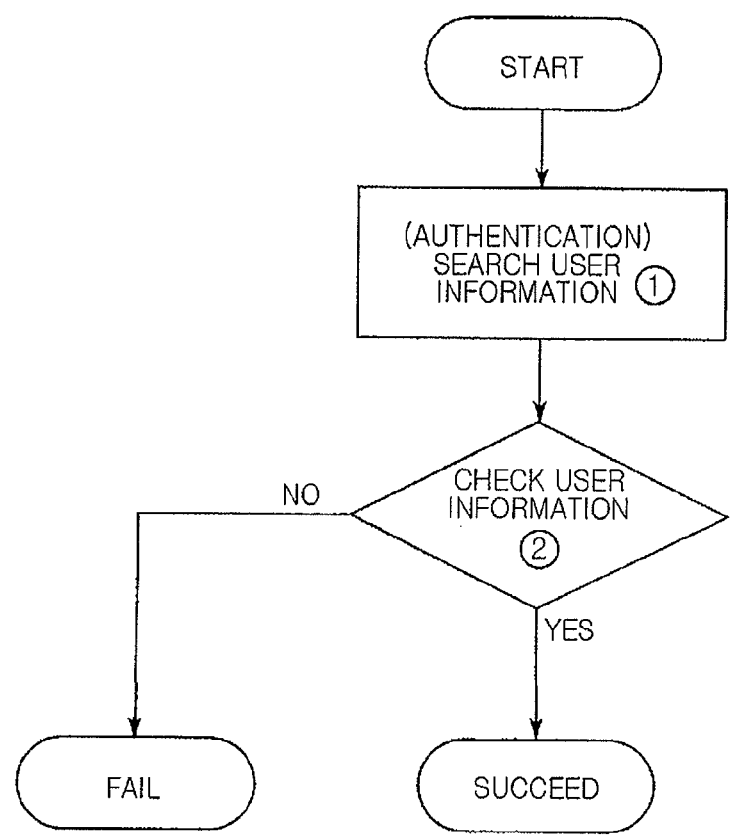
FIG. 11 and FIG. 12 show a biz template embodied by a method of embodying a biz logic and a biz template by an open mobile business supporting method according to an embodiment of the present invention.
Figure 12:
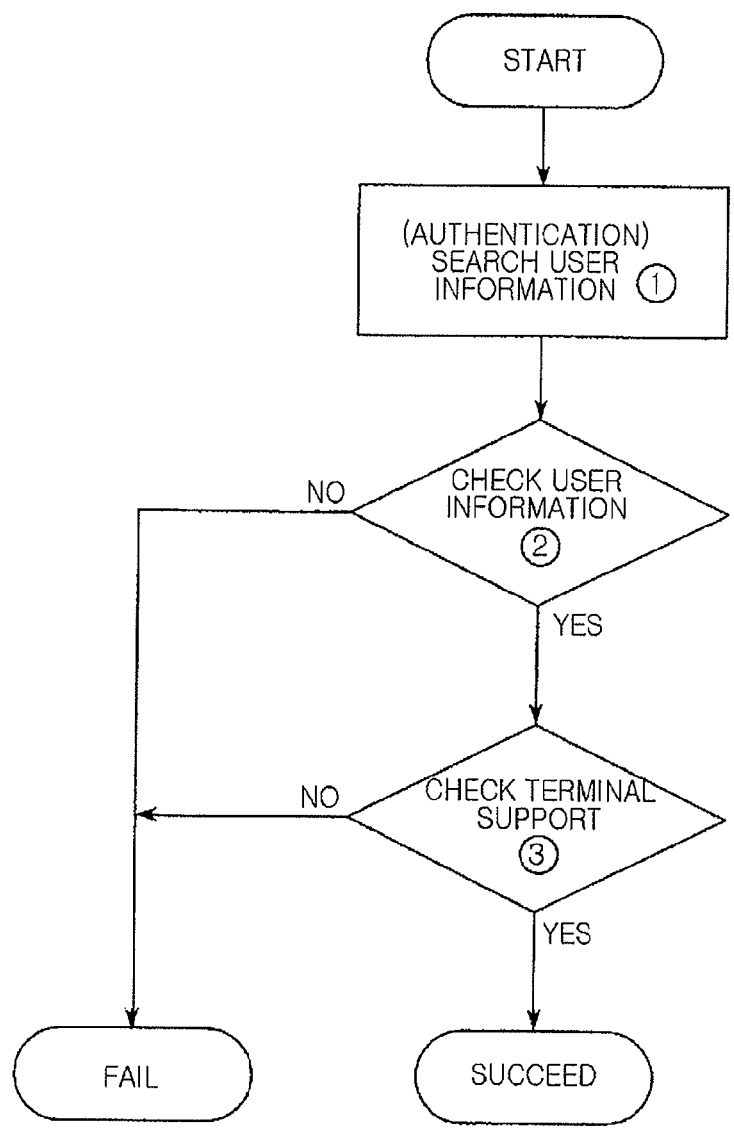

FIGS. 11 and 12 are diagrams for describing the Biz template according to another embodiment of the present invention. FIG. 11 shows a Biz template of the biz logic for performing a user authentication process. FIG. 12 shows a Biz template of the biz logic including a process of determining whether a terminal is supported in the user authentication process.

Referring to FIG. 11, the basic Biz template for performing a user authentication process includes: (1) an I-type authentication_user information checking Biz object for checking user information and (2) a P-type user information checking Biz object for checking whether a service can be provided to the user based on the user information check result. The input data are a user telephone number and, as an option, a user authentication type. The output data are information on whether the process result is a success or an error.

The Biz template of FIG. 12 includes: (1) an I-type authentication_user information checking Biz object; (2) a P-type user information checking Biz object; and (3) an I-type terminal support checking Biz object. The I-type authentication_user information checking Biz object checks user information. The P-type user information checking Biz object checks whether a service can be provided to the user based on the user information check result. The I-type terminal support checking Biz object checks whether a terminal supports a specific service to the user who can receive the service. The input data are a recipient telephone number, a user information checking option value and a terminal support service type. The output data are process results.

While the biz logic is set up and the Biz template is prepared, an interface for requesting the operation of the biz logic to the CP/SP system 11 and returning the result is provided. Subsequently, an operation request of the specific biz logic is received through the interface in step S320.

When the operation request of the specific biz logic is received, a Biz template of an operation format of corresponding biz logic is searched. The Biz template cooperates with the legacy system. An operate result value is returned to the CP/SP system 11 through the interface in steps S330 and S340.

The interface with the CP/SP system 11 forms and provides Application Program Interface (API) for each Biz template. The operation request of the specific biz logic is realized in an API calling format of the specific Biz template.

The open mobile business supporting method according to an embodiment of the present invention can support cooperation between the legacy systems by receiving the operation request of the predetermined Biz object from a specific legacy system of the mobile communication system 12, cooperating the requested Biz object with the corresponding legacy system, operating the cooperated Biz object, and providing a result value in order to transmit the result value to the specific legacy system transmitting the request. That is, the open mobile business supporting method can support fast cooperation between the legacy systems by using a typical Biz object.

Hereinafter, the configuration and operation of the open mobile business supporting system for performing the open mobile business supporting method will be described in detail.

Figure 13:
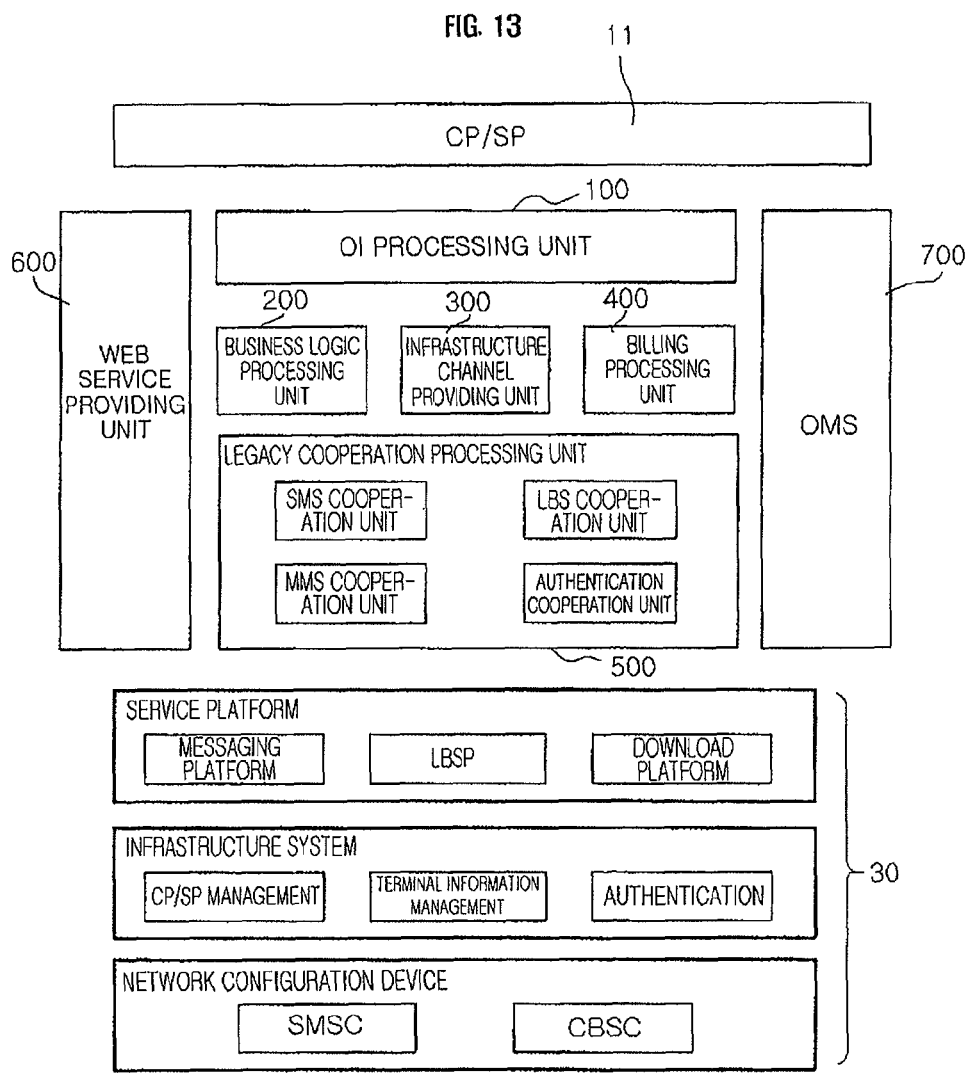
FIG. 13 is a block diagram illustrating an open mobile business supporting system according to an embodiment of the present invention.

FIG. 13 is a block diagram illustrating the structure of an open mobile business supporting system according to an embodiment of the present invention.

Referring to FIG. 13, the open mobile business supporting system according to an embodiment of the present invention includes an open interface (OI) processing unit 100, a business logic processing unit 200, an infra channel providing unit 300, a billing processing unit 400, a legacy cooperation processing unit 500, an operation and management system (OMS) 700 and a web service providing unit 600.

Reference numeral 11, which is not described above, is a CP/SP system for providing a mobile service to the mobile communication terminal 14. Reference numeral 30 is a legacy system including a service platform, an infrastructure system, and a network configuration device of the mobile communication system 13.

The service platform of the legacy system 30 includes a messaging platform, a location based service platform (LBSP) and a download platform. The messaging platform provides a multimedia messaging service (MMS). The LBSP provides a service for detecting and checking a location. The download platform downloads predetermined content to the mobile communication terminal. The infrastructure system includes a CP/SP management system, a terminal information management system and an authentication system. The CP/SP management system manages CP/SP information for providing a service. The terminal information management system manages terminal information. The authentication system manages user information. The network configuration device includes a short message service center (SMSC) and a cell broadcasting service center (CBSC).

As shown in FIG. 13, the open mobile business supporting system according to an embodiment of the present invention provides a united interface to diverse legacy systems 30, relays the CP/SP system 11 and the legacy system 30, and supports configuration and provision of the mobile service in the CP/SP system 11.

Accordingly, the OI processing unit 100 receives an operation request of specific biz logic from the external CP/SP system 11 of the mobile communication system 13. Also, the OI processing unit 100 provides an interface for returning an operation result. The interface is application program interface (API) based on web access. The specific biz logic is requested by API calling of a corresponding Biz template. The Biz template identification (ID) information and data such as content are transmitted through the calling function, and the result value is returned. The OI processing unit 100 analyzes the request transmitted from the CP/SP system 11 and extracts the Biz template ID information and the data. Subsequently, the OI processing unit 100 transmits the Biz template ID information and the data to the business logic processing unit 200. The OI processing unit 100 creates and manages a unique session key for each request of the CP/SP system 11. The created session key is used to classify the biz logics, which are processed in the open mobile business supporting system.

Also, the OI processing unit 100 encodes and decodes the data transmitted from/to the CP/SP system 11.

The business logic processing unit 200 can be classified as a unit function among service logics of the CP/SP system. The business logic processing unit 200 stores, manages and operates a plurality of Biz objects and the Biz template. Herein, the Biz objects cooperate with each legacy system or perform comparing and determining processes on each legacy system of the mobile communication system realized to operate the biz log based on cooperation with each legacy system or the cooperation result. The biz logic is a lower function to be operated by the mobile communication system. The Biz template includes a plurality of Biz objects arranged in a regular order and operates the biz log. The biz log, the Biz template and the Biz object will be understood with reference to description related to FIGS. 4 to 10 and FIGS. 11 and 12.

The business logic processing unit 200 sets up and includes the Biz template, which is a realization format of the supporting biz log, and Biz object. Also, the business logic processing unit 200 operates the Biz template requested by the OI processing unit 100 and returns an operation result to the OI processing unit 100. To be more specific, the business logic processing unit 200 operates the first or second Biz object in an arranged order of the requested Biz template. When operation of all Biz objects ends, the business logic processing unit 200 returns the result value to the OI processing unit 100. The business logic processing unit 200 requests cooperation with the legacy system 30 to the legacy cooperation processing unit 500 according to the kind of the Biz objects included in the Biz template. Subsequently, the business logic processing unit 200 receives back the result or performs an internal determining process or a comparing process based on the returned operation result.

As described above, the open mobile business supporting system according to an embodiment of the present invention can support a complicated service including diverse processes requested by the CP/SP system 11 based on the business logic processing unit 200.

The open mobile business supporting system according to an embodiment of the present invention can support a cooperating process based on performance requiring a fast process through the infrastructure channel providing unit 300.

The infrastructure channel providing unit 300 does not go through the OI processing unit 100. However, the infra channel providing unit 300 directly receives an operation request of the Biz object, which is operated in another legacy system 30, from the legacy system 30 inside the mobile communication system 13. The infra channel providing unit 300 transmits the requested Biz object to the legacy system 30 through the legacy cooperation processing unit 500 and receives back the process result from the legacy system 30. Subsequently, the infra channel providing unit 300 transmits the process result to the legacy system 30 requesting the operation of the Biz object.

FIG. 14 shows diagrams illustrating operations of the business logic processing unit 200 and the infra channel providing unit 300 according to an embodiment of the present invention.

FIG. 14(a) shows a supporting procedure of the business logic processing unit 200. When the business logic processing unit 200 receives an operation request of the Biz template from the OI processing unit 100 in step S811, the business logic processing unit 200 performs loading on data of a corresponding Biz template from Main Memory Register Database Management System (MMDB) 900 in step S812. The MMDB 900 is a database based on a memory and will be described with reference to the description of FIG. 15. The business logic processing unit 200 operates the second Biz object in the loaded Biz template in step S813. The business logic processing unit 200 transmits a request message to the legacy cooperation processing unit 500 according to the first Biz object of the Biz template in step S814. The business logic processing unit 200 repeats a procedure of receiving an acknowledge (ACK) message in step S815 and ends the operation of the Biz template. The business logic processing unit 200 transmits billing information, which is acquired by ending the operation to the billing processing unit 400 in step S816, and transmits an operation result to the OI processing unit 100 in step S817. Accordingly, the business logic processing unit 200 can support a mobile service based on a complicated function by operating the biz logic including at least one service and process.

FIG. 14(b) shows a procedure of the infra channel providing unit 300. When the specific legacy system 30 requests operation of a specific Biz object, the infra channel providing unit 300 directly receives and analyzes the request in step S821. The infra channel providing unit 300 performs an internal process according to the requested Biz object in step S812, requests the legacy cooperation processing unit 500 to cooperate in step S813 and receives an ACK of the request in step S814. The infra channel providing unit 300 transmits related billing information to the billing processing unit 400 in step S815 and transmits an operation result to the legacy system 30 requesting the service in step S816.

As described above, the mobile business supporting system according to an embodiment of the present invention directly processes cooperation between the internal systems of the mobile communication system not through the OI processing unit 100 but through the infra channel providing unit 300. Also, the mobile business supporting system processes the request of the external CP/SP system 11 through the OI processing unit 100 and the business logic processing unit 200. Accordingly, the mobile business supporting system can improve the quality of a service by separately supporting the service based on the complicated function and the service based on performance.

In FIG. 13, the legacy cooperation processing unit 500 is in charge of cooperation with the legacy system 30. The legacy cooperation processing unit 500 includes a plurality of cooperation units for processing an input/output interface function, a log of each legacy system and billing information. The input/output interface function is respectively standardized for each legacy system classified on the basis of functional unit for an efficient process. The legacy cooperation processing unit 500 includes an SMS cooperation unit, a location based service (LBS) cooperation unit, an MMS cooperation unit, and an authentication cooperation unit. The SMS cooperation unit transmits a transmission request of a short message to the SMSC and returns the result. The LBS cooperation unit cooperates with the LBSP, transmits a location checking or detecting request message and receives back the operation result. The MMS cooperation unit transmits a multimedia message transmission request message to the MMSC and receives back the operation result. The authentication cooperation unit transmits an authentication request message to the authentication legacy system related to a process for checking whether the user is a normal personal user, and a billing process inside the mobile communication system 13. Subsequently, the authentication cooperation unit receives back the result.

The billing processing unit 400 collects billing data acquired by operating the Biz template and the Biz object of the business logic processing unit 200 and the infra channel providing unit 300 and transmits the billing data to the billing legacy system. To be more specific, the billing processing unit 400 refers to a billing condition set up for each service. When the billing condition is satisfied in operation of each of the Biz template or the Biz object, the billing processing unit 400 collects billing information for a corresponding process, e.g., a quantity of data and a log time, transforms the billing information into billing data and transmits the billing data to the legacy system for processing billing. As described above, the billing processing unit 400 is formed on the same layer as the business logic processing unit 200 and the infra channel providing unit 300. Accordingly, the billing processing unit 400 can respectively collect log information for each mobile service and for each legacy system. It makes an integration process of billing possible, and detailed information is provided.

The open mobile business supporting system according to an embodiment of the present invention can further include the web service providing unit 600 for providing services of registering CP/SP or manager, checking statistics information related to performance of the open mobile business service, and monitoring. The web service providing unit 600 provides a site for the manager and a site for the CP/SP.

The open mobile business supporting system according to an embodiment of the present invention includes the OMS 700. Therefore, the open mobile business supporting system can collect log information on the open mobile business supporting service, monitor obstacle and performance information and manage information for supporting operating work. That is, the open mobile business supporting system collects log information for each CP/SP through the OI processing unit 100 and collects operation and obstacle information of the business logic processing unit 200 and the legacy cooperation processing unit 500. Subsequently, the open mobile business supporting system provides the operation and obstacle information to the CP/SP or the operator.

Figure 15:
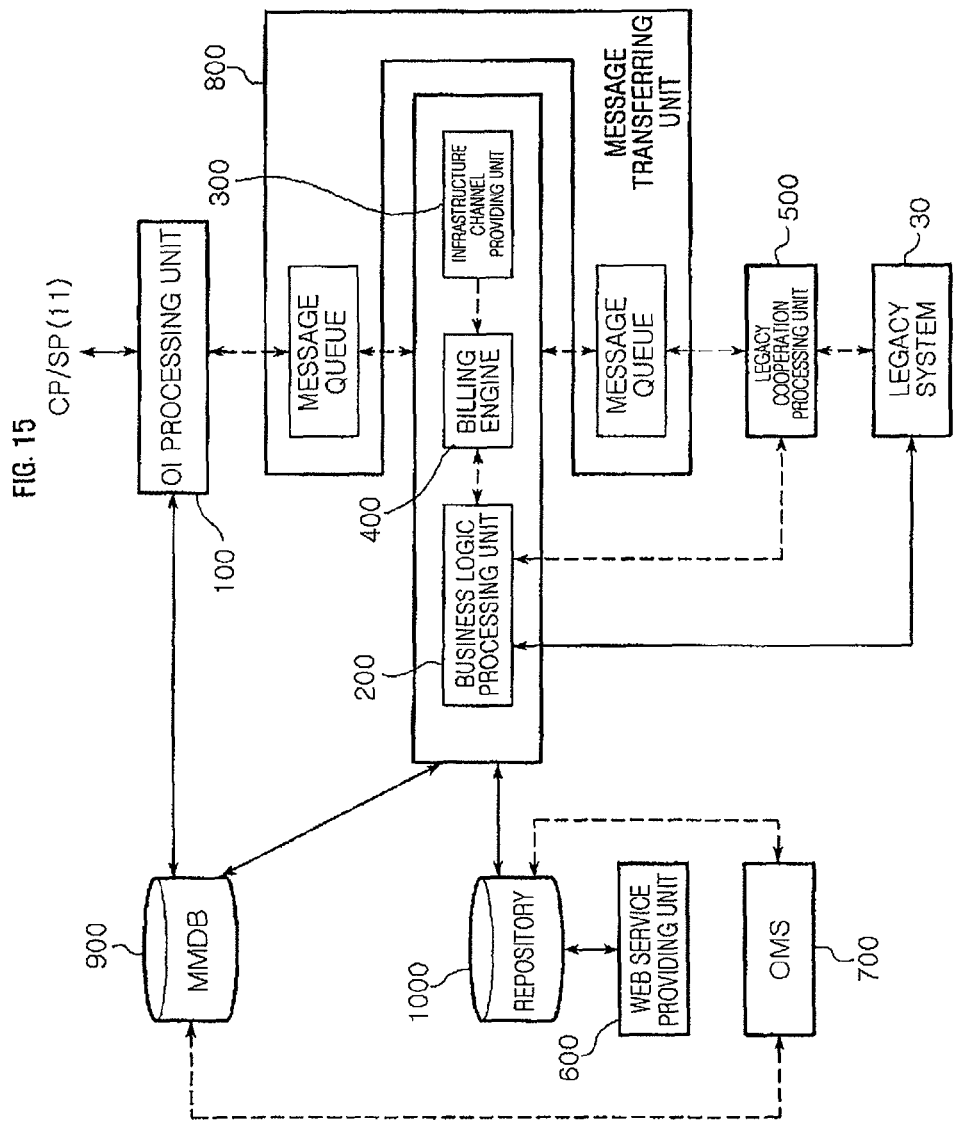
FIG. 15 is a block diagram illustrating an open mobile business supporting system according to an embodiment of the present invention.

FIG. 15 is a diagram illustrating the structure of an open mobile business supporting system according to an embodiment of the present invention.

Referring to FIG. 15, the open mobile business supporting system according to an embodiment of the present invention includes the OI processing unit 100, the business logic processing unit 200, the infra channel providing unit 300, the billing processing unit 400, the legacy cooperation processing unit 500, the web service providing unit 600, and the OMS 700. In addition, the open mobile business supporting system includes a message transferring unit 800. The message transferring unit 800 includes a plurality of message queues (MQ) for transmitting a signal between the OI processing unit 100 and the business logic processing unit 200, and a signal between the business logic processing unit 200 and the legacy cooperation processing unit 500 or a signal between the infra channel providing unit 300 and the legacy cooperation processing unit 500. In the open mobile business supporting system according to an embodiment of the present invention, the message transferring unit 800 asynchronously processes message exchange among the OI processing unit 100, the business logic processing unit 200, the infra channel providing unit 300, the billing processing unit 400, and the legacy cooperation processing unit 500 through the message queue.

Also, the open mobile business supporting system according to an embodiment of the present invention further includes the MMDB 900 to manage a request of the Biz template, an operation result and a status of Biz object/Biz template. The OI processing unit 100, the business logic processing unit 200 and the infra channel providing unit 300 can access to the MMDB 900 and perform recording and reading processes. When the OI processing unit 100 records the requested Biz template in the MMDB 900, the business logic processing unit 200 operates the Biz template with reference to a pre-database based on a memory in the MMDB 900 and uses the pre-database to record the status. The MMDB 900 stores information on the Biz template. When the OI processing unit 100 and the business logic processing unit 200 request the information on the Biz template, the MMDB 900 provides information on a corresponding Biz template.

Generally, the MMDB is a database (DB) located and operated in a main memory of a computer. Since the MMDB is located in the main memory differently from a typical DB stored and used in hard disk (HDD), the MMDB does not require a work for reading data. Also, the MMDB can use a query of the typical DB without change in a general status that an entire DB table is in the main memory. Accordingly, the speed of searching, comparing and analyzing data increases.

That is, the MMDB 900 according to an embodiment of the present invention can process the complicated biz logic at a high speed by storing the requested Biz template information and status information.

The open mobile business supporting system according to an embodiment of the present invention further includes a repository DB 1000 for storing and managing CP/SP information and service/content information.

Referring to the repository DB 1000, the web service providing unit 600 provides registration and change of the CP/SP, a monitoring service, and newly added biz logic information including the API of each Biz template. The OMS 700 manages obstacle and performance information with reference to the MMDB 900 and the repository DB 1000.

The message transferring unit 800 of FIG. 15 includes a plurality of message queues allocated to each system. The OI processing unit 100 records a request message of a predetermined Biz template in a designated message queue of the message transferring unit 800. The business logic processing unit 200 reads a Biz template request message in a designated message queue of the message transferring unit 800 and operates each Biz object included in the Biz template in an order. The first Biz object records a cooperation request message of a predetermined legacy system inside the message transferring unit 800. The first Biz object reads and processes the request message in the designated message queue of the message transferring unit 800 of the legacy cooperation processing unit 500. Subsequently, the first Biz object records the result in a predetermined message queue of the message transferring unit 800. The business logic processing unit 200 reads a process result of the first Biz object in the message queue and continues to a next process. As described above, the business logic processing unit 200 can secure independent operation of the OI processing unit 100, the business logic processing unit 200, the infra channel providing unit 300, and the legacy cooperation processing unit 500 by transmitting a message through the message transferring unit 800.

Figure 16:
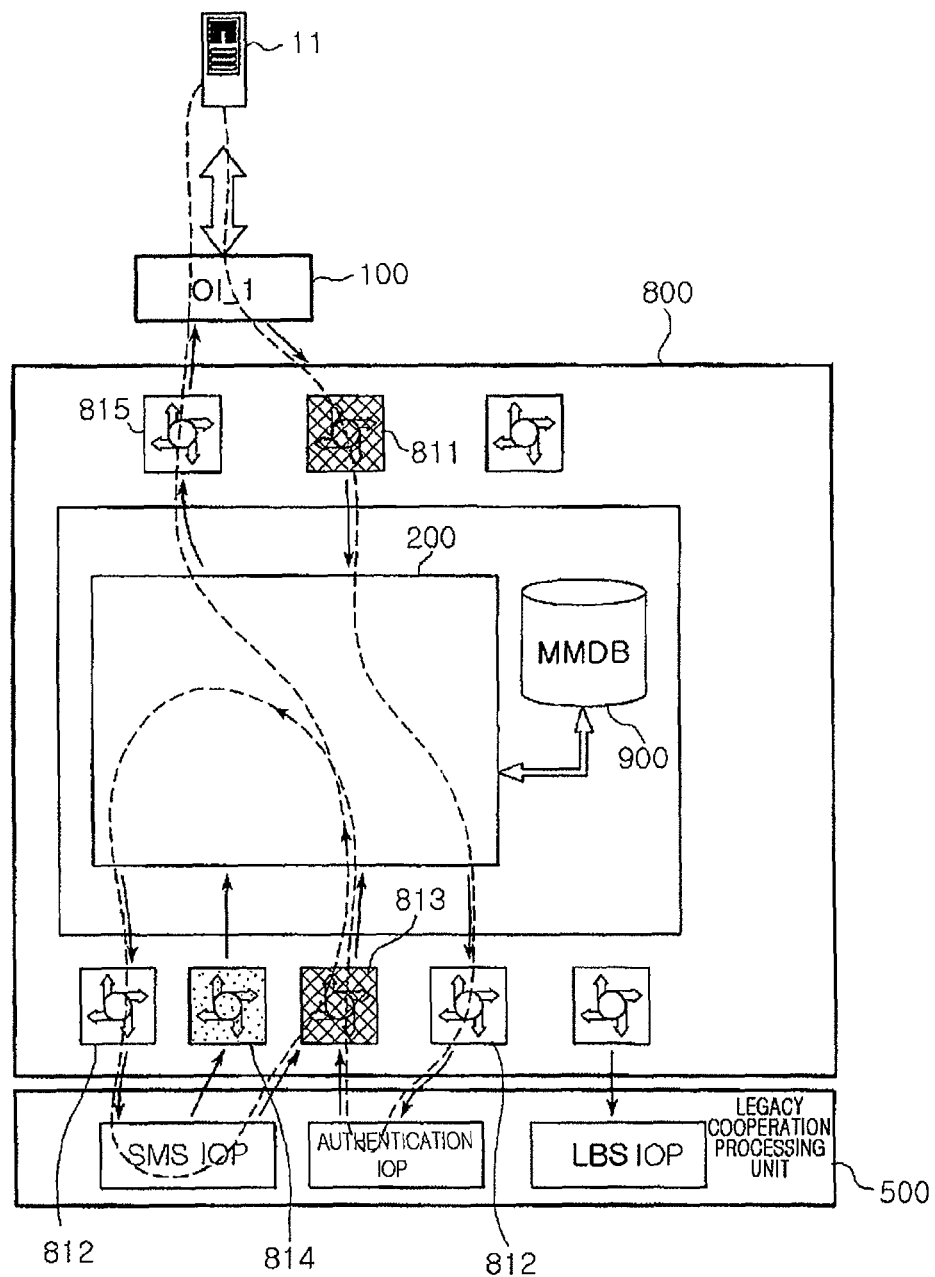
FIG. 16 is a diagram illustrating message flow in an open mobile business supporting system according to an embodiment of the present invention.

FIG. 16 is a diagram illustrating a detailed configuration and a message transmitting flow of the message transferring unit 800 according to an embodiment of the present invention.

Referring to FIG. 16, a message queue included in the message transferring unit 800 is divided into first, second, third, fourth and fifth message queues 811, 812, 813, 814 and 815. At least one first message queue 811 stores a request message of the OI processing unit 100 that the business logic processing unit 200 is to receive. At least one second message queue 812 is set up for each legacy cooperation processing unit 500 and stores a request message that the business logic processing unit 200 provides to the corresponding legacy cooperation processing unit 500. At least one third message queue 813 stores a result message of the legacy cooperation processing unit 500 that the business logic processing unit 200 is to receive. At least one fourth message queue 814 stores a report message of the legacy cooperation processing unit 500 that the business logic processing unit 200 is to receive. At least one fifth message queue 815 stores a result message to be transmitted from the business logic processing unit 200 to the OI processing unit 100.

Information showing the first to fifth message queues 811 to 815, i.e., a message queue name, includes a name of a system, which transmits a stored message, a name of a system to receive the stored message, a kind of messages showing whether the stored message is an ACK message, a request message or a report message, and a domain or an ID value set up for each input/output processor (IOP). Based on the information, each of the OI processing unit 100, the business logic processing unit 200 and the legacy cooperation processing unit 500 can identify a message queue for recording or reading its own request/ACK/report message.

Figure 17:
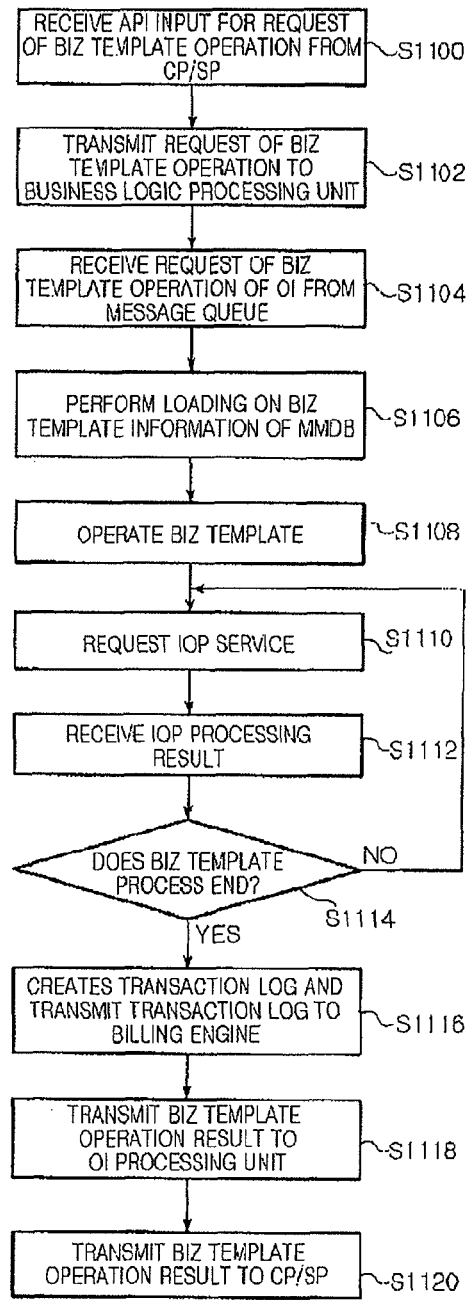
FIG. 17 is a flowchart illustrating an operation of an open mobile business supporting system according to an embodiment of the present invention.

FIG. 17 is a flowchart illustrating an operation of the open mobile business supporting system according to exemplary embodiment of the present invention. Referring to FIG. 17, the OI processing unit 100 according to an embodiment of the present invention receives standard API calling for a predetermined biz logic from the CP/SP system 11, checks a Biz template related to the called API and transmits an operation request message of a corresponding Biz template to the business logic processing unit 200 in steps S1100 and S1102. The OI processing unit 100 transmits the Biz template request message to the first message queue 811 of the message transmitting unit 800 in order to transmit the operation request message of the Biz template.

The business logic processing unit 200 checks whether the operation request message of the Biz template exists in the first message queue 811 of the message transferring unit 800. If the new operation request message of the Biz template exists, the business logic processing unit 200 reads the operation request message of the Biz template in the first message queue 811 in step S1104. Subsequently, the business logic processing unit 200 performs loading on Biz template information related to the request message from the MMDB 900 in step S1106 and operates a flow of the loaded Biz template in step S1108.

If the Biz object of the Biz template is an I-type during the operation, the business logic processing unit 200 requests the operation of the Biz template by storing a message, which requests the legacy cooperation processing unit 500 to cooperate, in a second message queue 812 in step S1110. The second message queue 812 is allocated to each system of the legacy cooperation processing unit 500. The corresponding legacy cooperation processing unit 500 reads and processes the recorded message and records an ACK message or a report message for an operation result in the third and fourth message queues 813 and 814.

Therefore, the business logic processing unit 200 can receive the ACK or report message for the request from the designated third and fourth message queues 813 and 814 in step S1112. If the process of the Biz template does not end, the procedures of the steps S1110 and S1112 are repeated.

When the process of a corresponding Biz template ends in step S1114, the business logic processing unit 200 transmits billing information related to the process to the billing processing unit 400 in step S1116.

Also, the business logic processing unit 200 stores the Biz template operation result in the fifth message queue 815 of the message transferring unit 800 and transmits the Biz template operation result to the OI processing unit 100 in step S1118.

The OI processing unit 100 retransmits the transmitted Biz template operation result to the CP/SP system 11 in step S1120.

In the open business supporting system according to an embodiment of the present invention, the OI processing unit will be described in detail with reference to FIG. 18.

Figure 18:
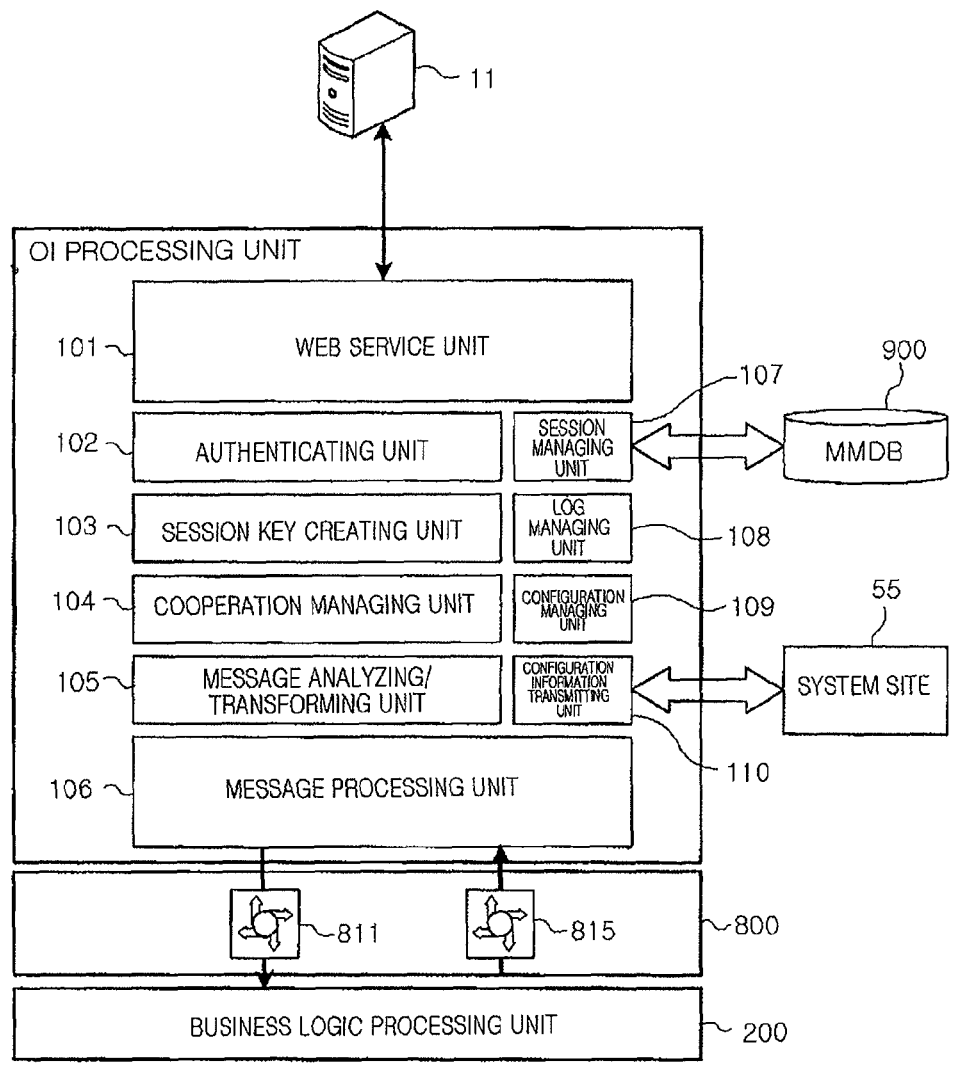
FIG. 18 is a block diagram illustrating the OI processing unit according to an embodiment according to an embodiment of the present invention.

FIG. 18 is a block diagram illustrating the OI processing unit according to an embodiment of the present invention. FIG. 18 shows a format in which the OI processing unit is realized in the open mobile business supporting system. Referring to FIG. 18, the OI processing unit 100 according to an embodiment of the present invention includes a web service unit 101, an authenticating unit 102, a session key creating unit 103, a cooperation managing unit 104, a message analyzing and transforming unit 105, and a message processing unit 106. The OI processing unit 100 according to an embodiment of the present invention can further include a session managing unit 107, a log managing unit 108, a configuration managing unit 109, and a configuration information transmitting unit 110.

In the OI processing unit 100, the web service unit 101 receives a standard API input with respect to the operation request of the Biz template from the CP/SP system 11 and transmits the Biz template operation result to the CP/SP system 11. The web service unit 101 and the CP/SP system 11 cooperate in a format of a web service based on Simple Object Access Protocol (SOAP). The CP/SP system 11 creates a stub for the SOAP based on a web service toolkit provided for each platform and can use the web service as general function calling. Also, the CP/SP system 11 requests the operation of the Biz template by the web service unit 101 through the standard API and receives the operation result.

The authenticating unit 102 performs and manages an authentication process of the Biz template requesting the operation of the CP/SP system 11. In addition, the authenticating unit 102 performs and manages an authentication process of the CP/SP system 11. The authenticating unit 102 constraints access to an ID of the specific CP/SP system 11 and a specific Internet protocol (IP).

The session key creating unit 103 creates a session key for the Biz template whose operation is requested by the CP/SP system 11. The session key is a unique key with respect to each Biz template. The session managing unit 107 manages the unique session key created in the session key creating unit 103. The unique session key is mapped with Biz template information corresponding to the MMDB 900 and stored. Therefore, the unique session key is allocated to the Biz template information whose operation is request by the CP/SP system 11. The Biz template information is stored in the MMDB 900. Subsequently, the business logic processing unit 200 receives the session key from the OI processing unit 100 and searches Biz 9 template information in the MMDB 900 based on the session key. The business logic processing unit 200 operates the searched Biz template and records the status information in the MMDB 900.

The cooperation managing unit 104 has a thread for the operation request of the Biz template of the CP/SP system 11 transmitted to the web service unit 101 stand by. When the business logic processing unit 200 transmits the Biz template operation result, the cooperation managing unit 104 activates the stand-by thread and transmits the Biz template operation result to the web service unit 101. The web service unit 101 receives standard API input for the operation request of the Biz template from the CP/SP system 11 and transmits the standard API input to the cooperation managing unit 104. The cooperation managing unit 104 transmits the standard API input to the message processing unit 106 and maintains the thread for the standard API input in a stand-by status. When the cooperation managing unit 104 receives the Biz template operation result from the message processing unit 106, the cooperation managing unit 104 activates a process thread of the web service unit 101 and transmits the operation result to the web service unit 101.

In particular, the OI processing unit 100 according to an embodiment of the present invention controls synchronous cooperation with the CP/SP system 11 and controls asynchronous cooperation with the business logic processing unit 200. That is, when the OI processing unit 100 according to an embodiment of the present invention receives the standard API input for the Biz template from the CP/SP system 11, the OI processing unit 100 maintains a session with the CP/SP system 11 until the OI processing unit 100 returns the Biz template operation result to the CP/SP system 11. Subsequently, the OI processing unit 100 performs asynchronous cooperation. However, when the Or processing unit 100 according to an embodiment of the present invention transmits the operation request message of the Biz template to the business logic processing unit 200, the OI processing unit 100 transmits the request message to the first message queue 811 of the message transferring unit 800 and searches an operation result message of the Biz template in the fifth message queue 815. If the operation result message of the Biz template exists, the OI processing unit 100 asynchronously cooperates with the business logic processing unit 200 by reading and transmitting the operation result message to the CP/SP system 11 through the web service unit 101.

The message analyzing and transforming unit 105 receives the operation result message from the CP/SP system 11 or the business logic processing unit 200 and transforms the operation result message to be transmitted to the business logic processing unit 200 or the CP/SP system 11. That is, the message analyzing and transforming unit 105 analyzes the standard API input transmitted from the CP/SP system 11 and transforms the standard API input into the operation request message of the Biz template readable by the business logic processing unit 200. Also, the message analyzing and transforming unit 105 transforms the Biz template operation result transmitted from the business logic processing unit 200 into a message to be transmitted to the CP/SP system 11.

The message processing unit 106 transmits/receives the operation request message of the Biz template or the operation result message of the Biz template to/from the business logic processing unit 200. That is, the message processing unit 106 receives the operation request message of the Biz template transformed in the message analyzing and transforming unit 105 and records the operation request message of the Biz template in the first message queue 811 of the message transferring unit 800. The message processing unit 106 reads the operation result message of the Biz template, which is recorded in the fifth message queue 815, in the business logic processing unit 200 and transmits the operation result message of the Biz template to the message analyzing and transforming unit 105. The message processing unit 106 asynchronously transmits/receives the operation request message or the operation result message of the Biz template by control of the cooperation managing unit 104.

As described above, the OI processing unit 100 according to an embodiment of the present invention provides an interface as a point of contact for the CP/SP system 11, which is a client requiring a service of the open mobile business supporting system. The OI processing unit 100 receives diverse service requests from the CP/SP system 11 through a web interface. In particular, in the mobile business supporting system, the OI processing unit 100 according to an embodiment of the present invention provides a business logic calling mechanism of a standard API format from the CP/SP system 11. The open interface, which has the CP/SP system 11 that can easily use a function of a wireless Internet infrastructure system without directly developing the wireless Internet infrastructure system differently from a typical cooperating method based on a protocol, is provided. The open interface can be used without limitation of the kind of the CP/SP system as a client.

As described above, in FIG. 17, the OI processing unit 100 according to an embodiment of the present invention can further include the session managing unit 107, the log managing unit 108, the configuration managing unit 109, and the configuration information transmitting unit 110.

The session managing unit 107 manages session information in the MMDB 900. The MMDB 900 stores authentication information of the CP/SP system 11, the operation result of the Biz template and status information. The Biz template information whose operation is requested by the CP/SP system 11 and the unique session key allocated to the Biz template are mapped and stored in the MMDB 90. An important function of cooperation of the MMDB 900 is storing a session status, a Biz object status, session parameter information, and Biz object parameter information. To be more specific, the session status is stored in case of operation of the session for processing a service requested from outside, change of the session status or end of the service process. When the session starts, the session parameter is stored. Also, when an object is operated to process the service after start of the session, the object status and an object parameter value are stored.

The log managing unit 108 manages operation of the Biz template transmitted from the business logic processing unit 200, log information on an error, statistics data, and session information on an ended transaction. The log managing unit 108 creates a system log related to the log and transmits the created log information and statistics data to the OMS 700.

The configuration managing unit 109 manages configuration information on the OI processing unit 100 by providing a function for accessing the environment setup file of the OI processing unit 100 according to an embodiment of the present invention. The configuration managing unit 109 reflects change of the configuration information of the OI processing unit 100 according to an embodiment of the present invention in real time. Accordingly, a module requiring corresponding configuration information can check a changed configuration information value.

The configuration information transmitting unit 110 receives a configuration information checking request of the OI processing unit 100 through an external system web site 55. The configuration information transmitting unit 110 extracts and transmits the configuration information to the web site. When the configuration information transmitting unit 110 receives the configuration information checking request of the OI processing unit 100 according to an embodiment of the present invention through the web site 55 realized by the web service providing unit 600, a configuration information on-line checking module extracts a configuration information value, and the configuration information transmitting unit 110 transmits the configuration information value extracted by the web service through the web site 55. A developer of the web site 55 can check the configuration information transmitted through the web service on a configuration information checking screen of the OI processing unit 100.

The open mobile business supporting system 100 according to an embodiment of the present invention can have more than two OI processing units 100 to support more users. Herein, since the business logic processing unit 200 reads and processes the request message of the OI processing unit 100 in an order, the OI processing unit 100 can generally use the first message queue 811. However, since destinations of messages of each session are different, the fifth message queue 815 sets up a message queue for each OI processing unit 100. When the request message is recorded, the fifth message queue 815 includes information on a message queue to return a result value. Accordingly, it is possible to figure out in which part of the business logic processing unit 200 the result value of the Biz template is recorded.

Figure 19:
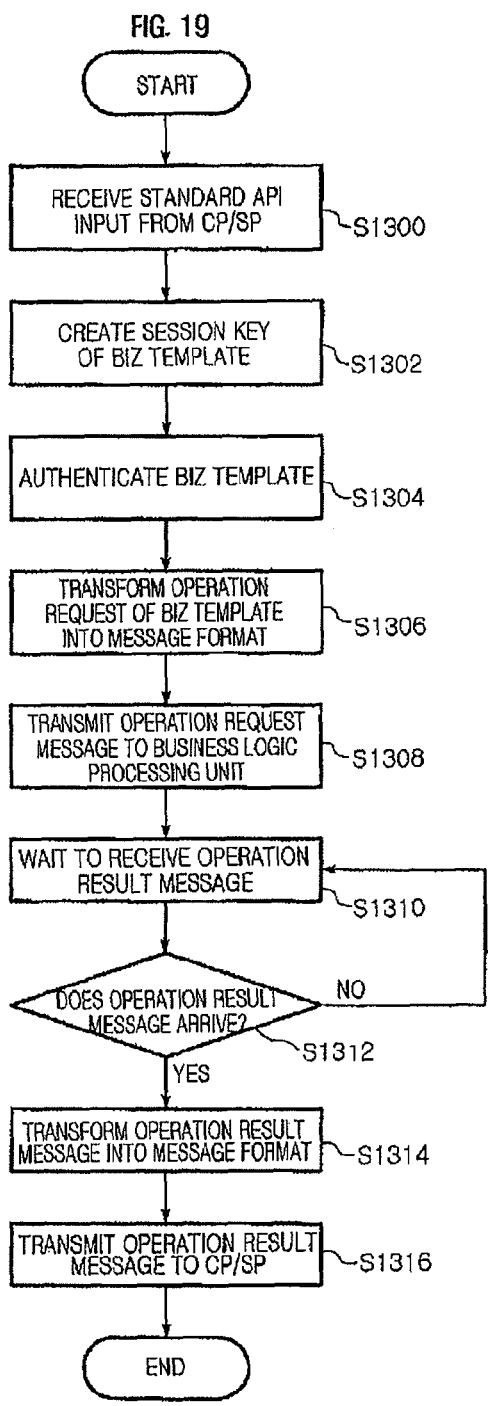
FIG. 19 is a flowchart illustrating a detailed operation of the OI processing unit in the open mobile business supporting system according to an embodiment of the present invention.

FIG. 19 is a flowchart illustrating a detailed operation of the OI processing unit 100 in the open mobile business supporting system according to an embodiment of the present invention.

Referring to FIG. 19, the web service unit 101 receives a standard API input for a specific operation request of the Biz template from the CP/SP system 11 in step S1300. A thread for the operation request of the Biz template of the CP/SP system 11, which the web service unit 101 receives, remains in a standby status. When the operation result of the Biz template is received, the thread is activated and the Biz template operation result is transmitted to the web service unit 101.

The session key creating unit 103 creates a unique session key with respect to the Biz template, whose operation is requested, in step S1302. The created session key is mapped with a corresponding Biz template and stored in the MMDB 900. The authenticating unit 102 authenticates the Biz template in step S1304. The authenticating unit 102 also authenticates the CP/SP system 11 providing the operation request of the Biz template.

In step S1306, the message analyzing and transforming unit 105 transforms the operation request of the Biz template into a message format, which is readable by the business logic processing unit 200, to transmit the operation request of the Biz template to the business logic processing unit 200. The message processing unit 106 transmits the transformed operation request message of the Biz template to the business logic processing unit 200 in step S1308 and waits to receive the operation result message of the Biz template in step S1310. The message processing unit 106 records the operation request message of the Biz template in the first message queue 811 of the message transferring unit 800 to transmit the operation request message of the Biz template to the business logic processing unit 200. Subsequently, the message processing unit 106 waits until the operation result message of the Biz template arrives at the fifth message queue 815 of the message transferring unit 800.

When the operation result message of the Biz template arrives at the first message queue 811 in step S1312, the operation result message of the Biz template is transformed into a message format to be transmitted to the CP/SP system 11 in step S1314. Subsequently, the transformed operation result message of the Biz template is transmitted to the CP/SP system 11 through the web service 101 in step S1316.

Hereinafter, the standard API provided to the CP/SP system 11 through the OI processing unit 100 will be described in detail.

The OI processing unit 100 according to an embodiment of the present invention provides a service for using the open mobile business supporting system based on an invoke API function.

The API is provided according to each Biz template provided in the open mobile business supporting system. For example, the API is set up according to each request by a user authentication process including a prepaid balance checking process and a terminal supporting checking process, a phone model information checking process, a number change checking process, a phone model information checking process, an SMS transmitting process, an MMS transmitting process, a general location searching process, a pushing method, a platform message transmitting process, a transmitting process to another company, and a transmitting process to my phone.

The provided API is basically using the invoke API function. The API requests operation of a specific Biz template by using TEMPLATE_ID, which is a Biz template ID showing the Biz template to be operated, AUTH_KEY, which is an authentication key given to use the Biz template, inParamSet, which is an input parameter for transmitting information required for operation of the Biz template, and outParamSet, which is an output parameter showing result information returned after the operation of the Biz template, as a parameter. Accordingly, the API can acquire result information. The output parameter basically includes a result code showing whether the service request succeeds or fails, and a reason of failure in case that the service request fails and a result message showing the operation result value. The result code returns a "0" value in case that the service request succeeds. When the service request fails, i.e., there is an error in the service request thereof, a code set up according to the kind of each error is returned. A list and content of the provided error code are provided in advance to the CP/SP.

In the input parameter and the output parameter, content of information transmitted from the parameter are changed according to the kind of corresponding API.

To be more specific, the open mobile business supporting system according to an embodiment of the present invention provides the API for a basic user authentication process such as a process for checking whether the user is a normal personal user, cutting off suspension/termination, cutting off a business user, cutting off a prepaid user, and cutting off intelligent network prepayment. As an input parameter, the API includes a user phone number and a user authentication type showing the basic user authentication process such as a process for checking whether the user is a normal personal user, cutting off suspension/termination, cutting off a business user, cutting off a prepaid user, and cutting off intelligent network prepayment. As an output parameter, the API includes the result code and the result message. The result code shows the success or failure and the kind of error in case that the user authentication request fails.

In addition, the open mobile business supporting system according to an embodiment of the present invention can set up the API further including a prepaid balance checking process as well as the basic user authentication process. As the input parameter, the API further includes price information on the content/service provided with the user phone number and the user authentication type. As a return value, the API as the output parameter includes information on whether the user is a prepaid user, and balance information of the user when the user is not the prepaid user in addition to the request result code and the result message. When the user is the normal personal user, but not the prepaid user, the API has the CP/SP system 11 take proper measures by transmitting a corresponding error code value through the result code among the output parameters.

Also, the open mobile business supporting system according to an embodiment of the present invention provides the API for authenticating the user and checking whether the terminal is supported according to the kind of the service. The API can acquire information on whether the terminal is supported according to the kind of the service in case that basic user authentication process is performed by request according to the authentication types and the authentication is successful. The input parameter includes the user phone number, the user authentication type and service information on whether the service to be supported by the terminal corresponds to the MMS, flash or MP3. The output parameter includes the result code showing whether the request thereof is successful and the result message.

Also, the open mobile business supporting system according to an embodiment of the present invention provides the API for checking information on a phone model of a mobile communication subscriber to acquire model information on the corresponding mobile communication terminal. As the input parameter, the API includes only the user phone number. The output parameter includes the result code, the result message, and many values showing phone information, e.g., a phone model name, a bell type code, poly information, color information, information on whether Code Division Multiple Access (CDMA) or karaoke is supported. The result code shows whether the phone model checking request result succeeds.

Also, the open mobile business supporting system according to an embodiment of the present invention can include the API for checking whether the user is a subscriber receiving a specific service at a monthly fixed-rate. As the input parameter, the API includes a service ID value set up for each service, a user phone number, a user authentication type, an ID value of the CP/SP providing the service, a price of corresponding content. As the output parameter, the API includes a result code showing a success code and an error code of a monthly fixed-rate authentication process and the prepaid balance checking request, and a result message for transmitting a request result value.

The open mobile business supporting system according to an embodiment of the present invention can include the API for checking only on whether the user is a subscriber receiving a specific service at a monthly fixed-rate. As the input parameter, the API includes a service ID value set up for each service, a user phone number, a user authentication type, and an ID value of the CP/SP providing the service. As the output parameter, the API includes an authentication process of a monthly fixed-rate, a result code showing a success code and an error code of a monthly fixed-rate authentication process, and a result message for describing an operation result value for the request.

The open mobile business supporting system according to an embodiment of the present invention provides the API for respectively performing a subscription or termination process on a specific service provided at a monthly fixed-rate. As the input parameter, the API includes a service ID value set up for each service, a service code value, ID information of a content provider, and a phone number for performing the subscription or termination process. As the output parameter, the API includes a result code providing information on success or error of the request thereof and a result message for transmitting a request value thereof.

Also, the open mobile business supporting system according to an embodiment of the present invention can provide the API for checking information on a wireless Internet user of a specific ID. As the input parameter, the API includes wireless Internet user ID and an encoded password of the user. As the output parameter, the API includes a result code showing information on success or error of the request thereof, a result message showing an operation result value of the request, and basic information of a corresponding wireless Internet user, e.g., a phone number, a name, and a resident registration number.

The open mobile business supporting system according to an embodiment of the present invention can provide the API for checking a phone number of a wireless Internet user of a specific ID. As the input parameter, the API has a wireless Internet ID. As the output parameter, the API has a result code, a result message, a phone number and/or a name of an authentication object.

The open mobile business supporting system according to an embodiment of the present invention provides the API for checking whether the user is authenticated through a resident registration number. As the input parameter, the API includes a user authentication type described in the API for a basic user authentication process, a phone number of an authentication object, a resident registration number or a business registration number of an encoded authentication object, an authentication type showing to which authentication object corresponds among a nominee, a businessman, and an actual user. As the output parameter, the API includes only a result code and a result message.

Also, the open mobile business supporting system according to an embodiment of the present invention provides the API for checking color information provided according to each phone. As the input parameter, the API includes information on a phone to be checked, such as a model name or a phone number. As the output parameter, the API includes a result code, a result message and color information of a corresponding phone, e.g., a single color, 4 gray scales and 256 colors.

The open mobile business supporting system according to an embodiment of the present invention includes the API for checking number portability information on a carrier switching subscriber. As the input parameter, the API inputs a user phone number. As the output parameter, the API outputs a result code showing success or error information of a request thereof, a result message recording an operation result value of the request, and final routing information of number portability.

Also, the open mobile business supporting system according to an embodiment of the present invention includes the API, which provides age information for determining whether the user is an adult. As the input parameter, the API inputs a user phone number. As the output parameter, the API returns a result code showing success or error information of a request thereof, a result message showing an operation result value and an age code showing a user's age.

The open mobile business supporting system according to an embodiment of the present invention provides the API for checking phone model information. As the input parameter, the API inputs a user phone number or a phone model name. As the output parameter, the API provides success or error information of a request thereof, a result message and phone performance information including a phone model name, a bell type, poly information, color information, information on whether CDMA or karaoke is supported.

The open mobile business supporting system according to an embodiment of the present invention provides the API performing prepayment and pre-subtraction processes for a billing process that subtracts the related fee from the prepaid balance in advance. As the input parameter, the API inputs an object phone number, a prepaid subscription product code, a subtraction request cost, and a billing pattern. As the output parameter, the API acquires a prepaid subtraction result.

The open mobile business supporting system according to an embodiment of the present invention provides the API used in transmission of the SMS. As the input parameter, the API includes information required for SMS transmission such as an SMS type showing to which message corresponds among a short message, a call back message and a platform message, a telephone number for reply or a call back telephone number in case that a uniform resource locator (URL) is designated, a URL, a transmission message, a phone number of a caller, a phone number of a recipient and billing pattern information. As the output parameter, the API includes a result code showing whether the SMS transmission request thereof is a success, a result message and a session key allocated in the open mobile business supporting system for checking a transmission result.

The open mobile business supporting system according to an embodiment of the present invention provides the API for transmitting an SMS monotone bell sound. As the input parameter, the API includes a call back telephone number, a transmission message, a phone number of a caller, a phone number of a recipient, platform ID information, and billing information. As the output parameter, the API includes a result code showing whether the request thereof is a success or an error, a result message and a session key given to the request to check a transmission status.

In addition, the open mobile business supporting system according to an embodiment of the present invention provides the API for checking the SMS transmission result. When a corresponding API is requested, the open mobile business supporting system checks an SMS transmission result of the session key inputted as a parameter and returns a result. As the input parameter, the API includes the session key returned after an SMS transmission request. As the output parameter, the API includes a result code showing whether the check result is a success and a result message describing the check result.

The open mobile business supporting system according to an embodiment of the present invention provides the API for transmitting a multimedia message to a phone of a recipient requested by a caller. When the API internally includes a basic authentication process for the caller and the recipient, it is not required to call the API for a special user authentication process. When the API is requested, the open mobile business supporting system determines the kind of terminal to receive a multimedia message. In case of a terminal loading a browser, the open mobile business supporting system transmits an SMS of a call back URL method. When the terminal user presses a button, the open mobile business supporting system downloads and displays MMS content of the call back URL to the terminal. In case of a terminal not supporting the MMS, but supporting the SMS only, the open mobile business supporting system reports that transmission is not possible. As the input parameter, the API includes a transaction ID of the MMSC, a VAS ID, a call back mobile phone number, a message transmitting method, information on whether there is a content transform request, a title and content of a message, platform ID information, a caller phone number, a recipient phone number, billing information, and a billing pattern. As the output parameter, the API includes a result code showing success or error information of the request thereof, a result message and a session key allocated to the request. Accordingly, the CP/SP can check a transmission result of the requested multimedia message. The content of the multimedia message provided as the input parameter are described as an HTTP message including an HTTP header and a content area. The header and the content region are classified into CRCF. The content region includes a parameter entity and a series of media entities. The parameter entity has a parameter required for a multimedia message service. The series of media entities are included in the multimedia message. The sequence of the entity is not important. However, if the parameter entity having the multimedia message service parameter exists, the entity should be located in a first place. A Hypertext Markup Language (HTML) document configuring a flame of all media entities inside the multimedia message should be included as a first entity among the media entities. Each entity can include its own header field.

In addition, the open mobile business supporting system according to an embodiment of the present invention further provides the API for checking a transmission result of the transmitted multimedia message. As the input parameter, the API includes a session key returned through the API for transmitting the multimedia.

The open mobile business supporting system according to an embodiment of the present invention provides the API detecting a location of a specific phone to support the LBS. As the input parameter, the API includes a user authentication type in case that authentication is included, a positioning method, ACK time setup information, a returning method such as whether to receive location information, or to receive the location information with a map, a format of the map in case that the map is received, color and screen information, a caller phone number, a recipient phone number, billing information, service platform (SP) registered in the LBSP, a code and a service code. As the output parameter, the API includes a result code displaying a success or an error of the request thereof, a result message, a location value such as X and Y coordinates, an error range, encoded address information, an error range, a positioning result time, a positioning method, a provided map name, information on whether a map viewer is loaded, a map scale, and an encoded image file. As the output parameter, the API also transmits checked location information. If a time for detecting a location by a Global Positioning system (GPS) takes long, a reservation number can be returned and the location should be rechecked through the reservation number.

Accordingly, a rechecking API is further provided. As the input parameter, the API includes a request type such as binary runtime environment for wireless (BREW), a cable, KUN, ME, Wireless Internet Platform for Interoperability (WIPI), a reservation number returned by the location checking process, a platform division information, a caller/recipient phone number, billing information, a billing pattern, a service platform (SP) registered in the LBSP, and a service code. The output parameter is formed in the same manner as the API for a location checking process is formed.

The open mobile business supporting system according to an embodiment of the present invention provides the API for adding or deleting mutual authentication of location detection. In case of addition of mutual authentication as the input parameter, the API includes user authentication information, information on a request type such as BREW, KUN, ME and WIPI, a caller phone number, a version of a caller browser, a mobile phone number of a receiver, a service platform registered in the LBSP, and a service code. In case of deletion of mutual authentication, the API includes a request type, a caller phone number, a recipient phone number, a service platform registered in the LBSP, a service code, a requesting subject of a tracer or a traced as the input parameter. As the output parameter, the API includes a result code showing success or error information of a request thereof and a result message returning a result value.

Also, the open mobile business supporting system according to an embodiment of the present invention provides the API for checking the mutual authentication list in a positioning service. As the input parameter, the API includes a user authentication type, a request type such as BREW, a cable, KUN, ME and WIPI, a caller phone number, a version of a recipient browser, information on whether the requestor is the tracer or the traced, a service platform registered in the LBSP, and a service code. As the output parameter, the API includes a result code recording a success or error code of a request thereof, a result message describing a result value, and a check list.

The open mobile business supporting system according to an embodiment of the present invention provides the API for requesting setup of a trigger through a parameter among LBSs. The API includes a user authentication type, a request type such as BREW, a cable, KUN, ME and WIPI, a caller phone number, a caller browser version, the traced telephone number, a start or end time, a trigger interval, a positioning method, and URL for putting a result after performing the trigger. As the output parameter, the API includes a result code describing a success or error code of the request thereof, a result message describing a result value, and a trigger ID set up for each trigger. The trigger ID is used to delete or minutely check a corresponding list.

The open mobile business supporting system according to an embodiment of the present invention provides the API requesting cancel of the set up trigger. As the input parameter, the API includes a request type such as BREW, a cable, KUN, ME and WIPI, a caller phone number, a caller browser version, a trigger ID acquired by checking the trigger, a service platform registered in the LBSP, and a service code. As the output parameter, the API receives back a result code describing a success or error code of a request thereof, a result message describing a result value, and a traced telephone number.

The configuration of the API described above is only an embodiment of the present invention. According to the described method, the API is formed for each Biz template provided in the open mobile business supporting system and provided to the CP/SP system 11. The CP/SP system 11 can easily acquire performance of a desired service and a result value by requesting the provided API regardless of adding or changing of a new infrastructure inside the mobile communication system.

As described above, since the open mobile business supporting system provides the API, the CP/SP is supported to use an internal infrastructure of the mobile communication system based on a standardized and verified method. Accordingly, a fast and stable mobile service can be provided.

The API may be properly changed and managed according to the reception of a new mobile service, change/addition of the infrastructure of the mobile communication system, change/addition/deletion of the Biz template. When a new API is created, commonness, readability and independence of the API may be secured. The commonness means that the API can be commonly used in diverse services. The readability means that mobile service developers can form a new business model by easily understanding the API. The independence means that the API is independent from a pre-distributed API.

Figure 20:
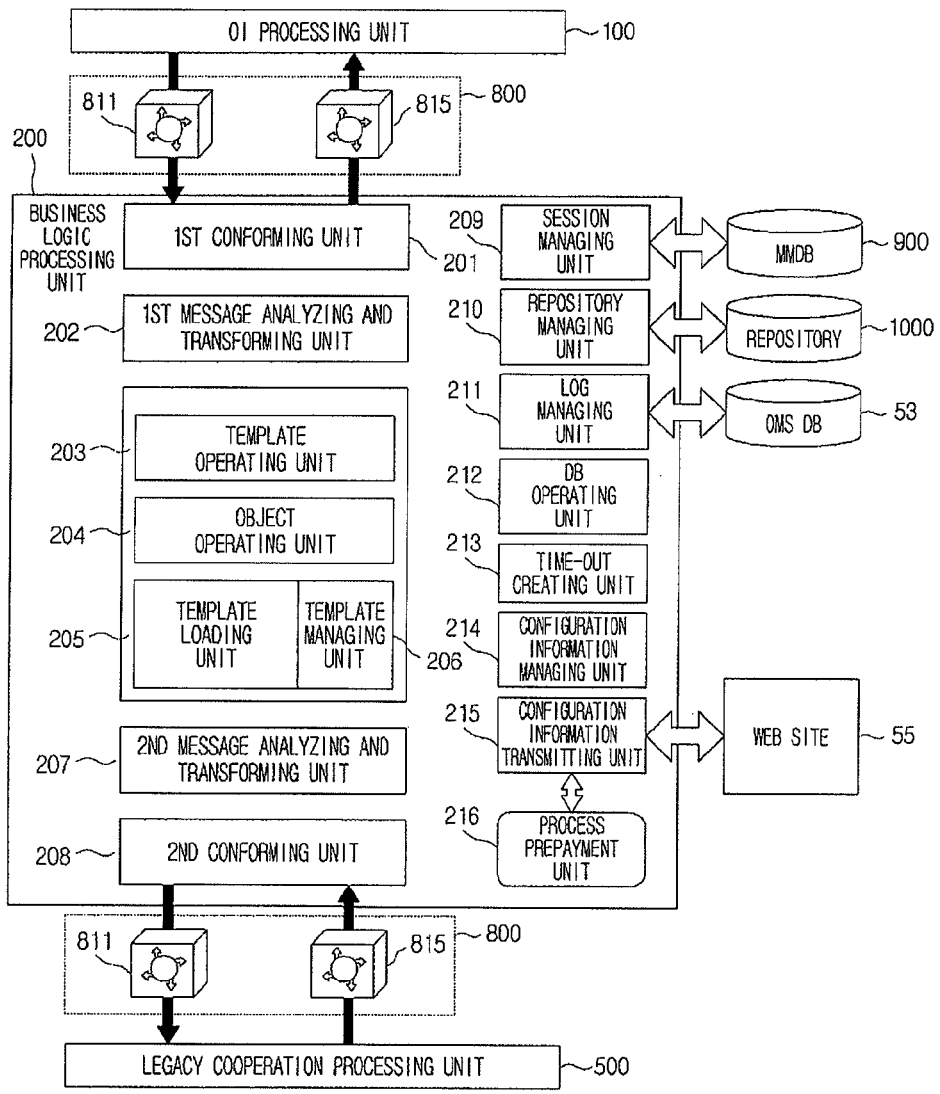
FIG. 20 is a block diagram illustrating a business logic processing unit.

Referring to FIG. 20, the business logic processing unit in the mobile business supporting system according to an embodiment of the present invention will be described in detail.

FIG. 20 is a block diagram illustrating a detailed configuration of the business logic processing unit 200. The business logic processing unit 200 according to an embodiment of the present invention includes a first conforming unit 201, a first message analyzing and transforming unit 202, a template operating unit 203, an object operating unit 204, a template loading unit 205, a template managing unit 206, a second message analyzing and transforming unit 207, and a second conforming unit 208.

The business logic processing unit 200 according to an embodiment of the present invention can further include at least one of a session managing unit 209, a repository managing unit 210, a log managing unit 211, a DB cooperating unit 212, a time-out creating unit 213, a configuration information managing unit 214, a configuration information transmitting unit 215, and an end processing unit 216.

The first conforming unit 201 is in charge of interfacing between the OI processing unit 100 and the business logic processing unit 200. The first conforming unit 201 receives an operation request message of a Biz template from the OI processing unit 100 and transmits the operation result message of the Biz template to the OI processing unit 100. In particular, the first conforming unit 201 checks whether the operation request message of the Biz template recorded in the first message queue 811 exists in the OI processing unit 100 and reads the operation request message. Also, the first conforming unit 201 records the operation result message of the Biz template in the fifth message queue 815 to read the operation result message of the Biz template in the OI processing unit 100. Accordingly, the first conforming unit 201 can transmit the operation result message of the Biz template.

The first message analyzing and transforming unit 202 transforms the operation request message of the Biz template transmitted through the first conforming unit 201 into a message format corresponding to a destination. The first message analyzing and transforming unit 202 transmits the operation result message of the Biz template to the first conforming unit 201. In particular, the first message analyzing and transforming unit 202 receives and analyzes the operation request message of the Biz template transmitted from the OI processing unit 100. Subsequently, the first message analyzing and transforming unit 202 processes the operation request message of the Biz template into an object format, which can be analyzed in the business logic processing unit 200 according to an embodiment of the present invention. When the Biz template is operated, the object is sequentially operated.

The template operating unit 203 operates the Biz template by operating the Biz object according to the biz logic of the Biz template. The biz logic to be operated in the mobile communication system 13 is the logic in which a plurality of Biz objects are arranged in an order. The biz logic is realized in a predetermined Biz template. That is, the Biz template is an object format in which the biz logic is realized. Therefore, the Biz template can be operated by sequentially operating a plurality of Biz objects. To be more specific, the template operating unit 203 analyzes the received operation request message of the Biz template, extracts Biz objects inside the Biz template, and sequentially operates each of the extracted Biz objects. The Biz template information is loaded in a specific database. When the template operating unit 203 operates the Biz template, the template operating unit 203 requests and operates the loaded Biz template. The template operating unit 203 creates cooperation with the MMDB 900 based on the session managing unit 209, acquires session information of the Biz template to be operated, and operates the Biz template.

The object operating unit 204 requests a realized object of a corresponding Biz object according to the operation request of the Biz object by the template operating unit and operates the Biz object. The Biz object can be operated internally or by the legacy system 30 through cooperation with the legacy cooperation processing unit 500. That is, the Biz object includes the first Biz object cooperating with the legacy system 30 and the second Biz object performing comparing/determining processes based on the operation result of the first Biz object.

The template loading unit 205 loads the Biz template and the Biz object in a specific memory. When the template operating unit 203 requests the Biz template to be operated, the template loading unit 205 returns a corresponding Biz template from the memory. The template loading unit 205 updates and deletes the Biz template loaded in the memory upon the updating or deleting request of the Biz template loaded in the memory.

The template managing unit 206 manages the Biz template loaded in a specific memory by the template loading unit 205 in the memory.

The second conforming unit 208 transmits the operation request message of the Biz object to the legacy cooperation processing unit 500. Subsequently, the second conforming unit 208 receives an operation result message of the Biz object transmitted from the legacy cooperation processing unit 500. The second conforming unit 208 is in charge of interfacing between the legacy cooperation processing unit 500 and the business logic processing unit 200 according to an embodiment of the present invention. In particular, the second conforming unit 208 records the operation request message of the Biz object in the second message queue 812 to read the operation request message of the Biz object in the legacy cooperation processing unit 500. Accordingly, the second conforming unit 208 can transmit the operation request message of the Biz object to the legacy cooperation processing unit 500. Also, the second conforming unit 208 checks whether the operation request message of the Biz object recorded in the third message queue 813 exists in the legacy cooperation processing unit 500. If the operation request message of the Biz object exists, the second conforming unit 208 reads the result message.

The second message analyzing and transforming unit 207 transmits the operation request message of the Biz object to the second conforming unit 208 according to the biz logic of the Biz template upon operation request of the Biz template. Subsequently, the second message analyzing and transforming unit 207 transforms the operation request of the Biz object transmitted through the second conforming unit 208 into a message format corresponding to a destination. In particular, the second message analyzing and transforming unit 207 receives and analyzes the operation request message of the Biz object transmitted from the legacy cooperation processing unit 500. Subsequently, the second message analyzing and transforming unit 207 processes the operation request message of the Biz object into a message, which can be analyzed in the business logic processing unit 200 according to an embodiment of the present invention.

The business logic processing unit 200 according to an embodiment of the present invention provides a mechanism for processing the biz logic of the CP/SP system 11 at a high speed, which is a client requiring a service of the open mobile business supporting system.

Accordingly, the open mobile business supporting system according to an embodiment of the present invention does not repeatedly process the service logic by individually cooperating with each of the typical legacy systems 30. The open mobile business supporting system according to an embodiment of the present invention can process a normal and stable service logic by managing and operating the biz logic standardized in advance through the business logic processing unit 200.

As described above, the business logic processing unit 200 according to an embodiment of the present invention can further include the session managing unit 209, the repository managing unit 210, the log manager 211, the DB cooperating unit 212, the time-out creating unit 213, the configuration information managing unit 2143 the configuration information transmitting unit 215, and the end processing unit 216.

The session managing unit 209 manages session status information of the Biz template stored in the MMDB 900. In particular, the session managing unit 209 manages session information on the request of the Biz template and session information on the operation result of the Biz template and the Biz object. The MMDB 900 stores authentication information of the CP/SP system 11, and operation result and status information of the Biz template. In particular, Biz template information whose operation is requested by the CP/SP system 11 and a unique session key allocated to the Biz template are mapped and stored in the MMDB 900. An important function of cooperating with the MMDB 900 is storing a session status, a Biz object status, session parameter information, and Biz object parameter information. To be more specific, when a session is operated to process a service requested from the outside or when a session status is changed, and when a service process ends, the session status is stored. When the session starts, a session parameter is stored. Also, when an object is operated to process a service after the session starts, the object status and the object parameter value are stored.

The repository managing unit 210 registers, corrects or deletes the Biz template information and the CP/SP information in a repository 52. When the Biz template information and the CP/SP information are requested, the repository managing unit 210 reads the Biz template information and the CP/SP information in the repository and responds to the request. In particular, when the business logic processing unit 200 is operated or when a specific Biz template is requested, the repository managing unit 210 returns the Biz template information from the repository DB 1000 and returns CP/SP authentication information from the repository DB 1000.

The log managing unit 211 manages log information on the operation and the error of the Biz template, statistics data, and session information on ended transaction. In particular, the log managing unit 211 creates log on the Biz template and the error outputted from the business logic processing unit 200. Subsequently, the log managing unit 211 stores the created log in an operation and management system (OMS) DB 53. In addition, the log managing unit 211 stores row data for statistics data in the OMS DB 53 and initializes session information on the ended transaction.

The DB cooperating unit 212 executes a cooperating function with a pre-setup database. That is, the DB cooperating unit 212 cooperates with the pre-setup database, provides a pool function for cooperating with the database, and executes a database update function for supporting a transaction process.

When certain conditions are met in comparison with a pre-setup time in operation of the Biz template, the time-out creating unit 213 generates time-out.

The configuration information managing unit 214 manages configuration information on the business logic processing unit 200 by providing an access function to an environment setup file of the business logic processing unit 200. In particular, when the business logic processing unit 200 according to an embodiment of the present invention changes configuration information, the configuration information managing unit 214 reflects the change of the configuration information in real time. Accordingly, a module requiring corresponding configuration information can check a changed configuration information value.

The configuration information transmitting unit 215 provides an interface with an external system. The configuration information transmitting unit 215 receives a configuration information checking request of the business logic processing unit 200 according to an embodiment of the present invention through an external system web site 54, extracts configuration information and transmits the configuration information to the web site. In particular, when the configuration information transmitting unit 215 receives the configuration information checking request of the business logic processing unit 200 according to an embodiment of the present invention through the external system web site 54, the configuration information on-line checking module extracts a configuration information value and transmits the extracted configuration information value through the web site 55 realized through the web service providing unit 600. The developer can check the configuration information transmitted through the web service on a configuration information checking screen of the business logic processing unit 200. Also, the configuration information transmitting unit 215 can control a thread of the business logic processing unit 200.

The end processing unit 216 provides a function for safely ending the business logic processing unit 200 according to an embodiment of the present invention. In particular, the end processing unit 216 creates a request message for requesting end of the business logic processing unit 200 and transmits the request message to the configuration information transmitting unit 215 through a specific message queue. The configuration information transmitting unit 215 responds to the end request and ends a thread of the business logic processing unit 200.

Figure 21:
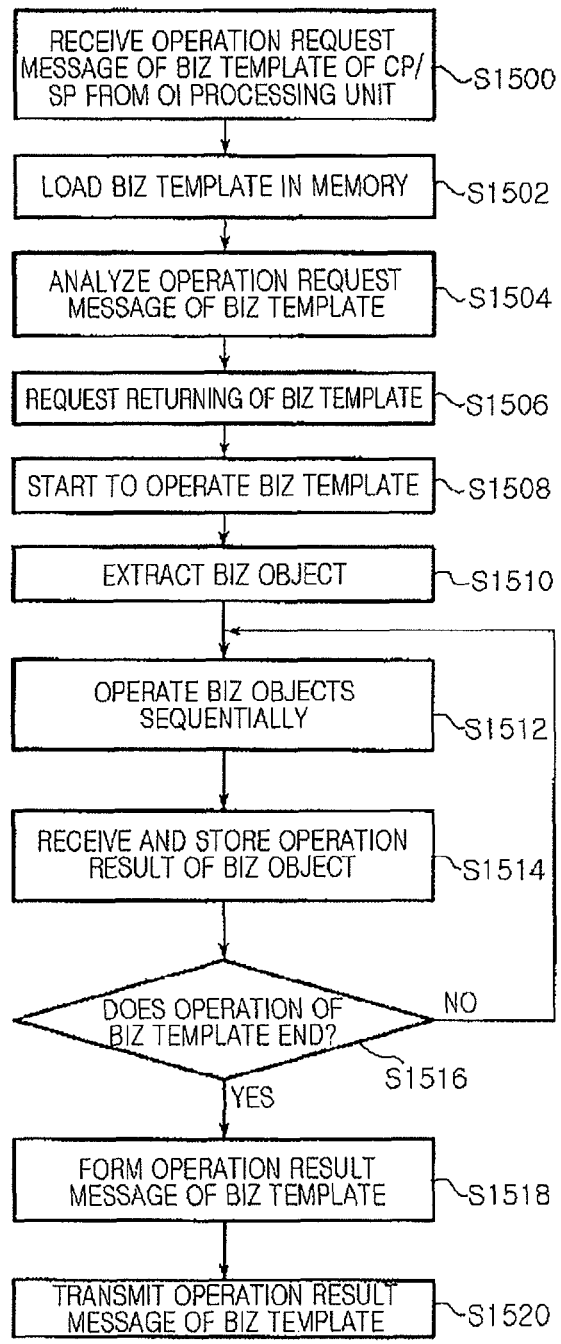
FIG. 21 is a flowchart illustrating a business logic processing method in the open mobile business supporting system according to an embodiment of the present invention.

FIG. 21 is a flowchart illustrating a business logic processing method in the open mobile business supporting system according to an embodiment of the present invention.

Referring to FIGS. 20 and 21, the first conforming unit 201 receives the operation request message of the Biz template transmitted of the CP/SP system 11 from the OI processing unit 100 in step S1500. The first conforming unit 201 checks whether the operation request message of the Biz template recorded by the OI processing unit 100 exists in the first message queue 811. When the operation request message exists, the first conforming unit 201 reads the operation request message. Subsequently, the first conforming unit 201 loads the Biz template of the operation request message of the Biz template in a specific memory and analyzes the operation request message of the Biz template in steps S1502 and S1504.

It is requested to return a corresponding Biz template loaded in the memory to operate the Biz template in S1506. The operation of the returned Biz template starts in step S1508.

A Biz object is extracted in step S1510 according to the biz logic of the Biz template to operate the Biz template. The Biz template is an object that the biz logic to be operated in the mobile communication system 13 is realized. The biz logic is logic in which a plurality of Biz objects are arranged in an order. Therefore, the operation of the Biz template is realized in step S1512 by sequentially operating Biz objects according to the biz logic inside the Biz template whose operation is requested. An operation result of the sequentially operated Biz object is received and stored in step S1514. When the operation of the Biz object ends, the operation of the Biz template ends. When the operation of the Biz template finally ends in step S1516, an operation result message of the Biz template is formed in step S1518.

As described above, the operation of the Biz template is realized by sequentially operating the internal Biz object. If the Biz object to be operated is an I-Type, a corresponding object operation request message is transmitted to the legacy cooperation processing unit 500 through the second conforming unit 208. When the operation request message of the Biz object is transmitted from the legacy cooperation processing unit 500, a next Biz object is continuously operated. When a result that the Biz object is sequentially operated is stored in the MMDB 900 based on the session managing unit 209 and the operation of the Biz template ends, an operation result message of the Biz template is formed.

The formed operation result message of the Biz template is transmitted to the OI processing unit 100 through the first conforming unit 201 in step S1520.

FIGS. 22 to 25 are flowcharts illustrating a Biz template operating procedure in the business logic processing unit according to an embodiment of the present invention.

Figure 22:
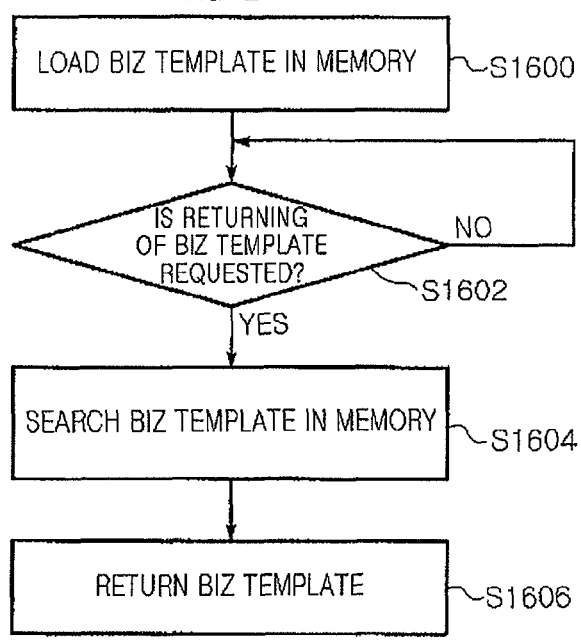
FIG. 22 to FIG. 25 are flowcharts illustrating a method of performing a biz template according to an embodiment of the present invention.

FIG. 22 is a flowchart illustrating a Biz template loading and returning procedure. Referring to FIG. 22, the template loading unit 205 of the business logic processing unit 200 according to an embodiment of the present invention receives the operation request message of the Biz template from the OI processing unit 100. Otherwise, the template loading unit 205 loads the Biz template including the Biz object in a pre-setup specific memory in step S1600 when the business logic processing unit 200 is operated. When the template operating unit 203 requests returning of the loaded Biz template to operate the Biz template in step S1602, the template loading unit 205 searches a corresponding Biz template in the memory in step S1604 and returns the searched Biz template to the template operating unit 203 in step S1606. Accordingly, the template operating unit 203 operates the Biz template.

Figure 23:
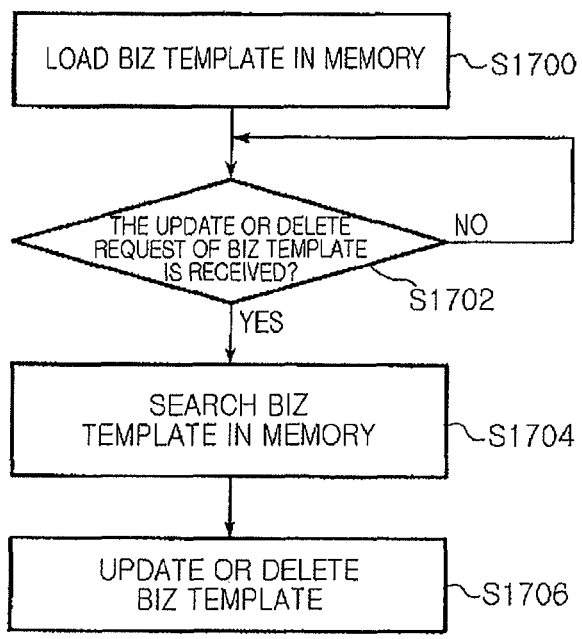

FIG. 23 is a flowchart illustrating a Biz template updating/deleting procedure. Referring to FIG. 23, the template loading unit 205 of the business logic processing unit 200 according to an embodiment of the present invention receives an operation request message of the Biz template from the OI processing unit 100. Otherwise, the template loading unit 205 loads the Biz template in the pre-setup specific memory in step S1700 when the business logic processing unit 200 is operated. Subsequently, when the template loading unit 205 receives the update or delete request of the Biz template in step S1702, the template loading unit 205 searches a corresponding Biz template in the memory and updates or deletes the searched Biz template in steps S1704 and S1706.

Figure 24:
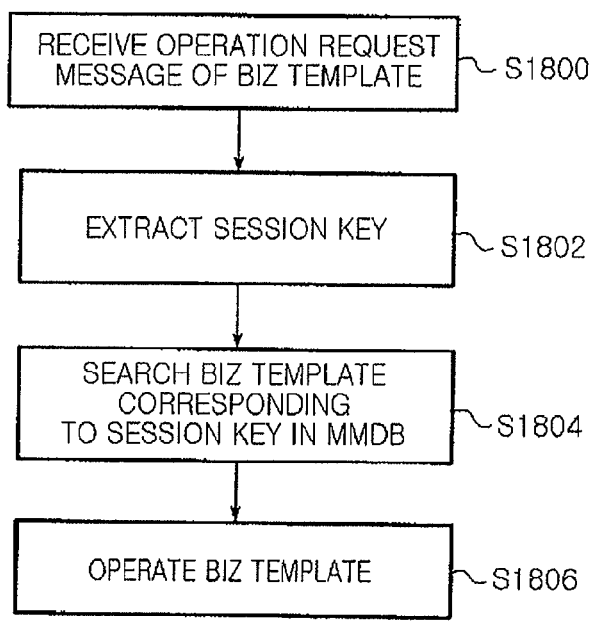

FIG. 24 is a flowchart illustrating a session key extracting procedure of the Biz template in the business logic processing unit 200. Referring to FIG. 24, when the business logic processing unit 200 according to an embodiment of the present invention receives an operation request message of a specific Biz template from the OI processing unit 100 in step S1800, the business logic processing unit 200 extracts a session key allocated to the Biz template from the operation request message of the Biz template in step S1802. The OI processing unit 100 receives standard API input for the operation request of the Biz template from the CP/SP system 11, creates a session key corresponding to the Biz template and stores the session key with the Biz template information in the MMDB 900. Subsequently, the business logic processing unit 200 receives the session key.

As described above, the business logic processing unit 200 searches a Biz template corresponding to the transmitted session key in the MMDB 900 in step S1804 and operates the searched Biz template in step S1806.

Figure 25:
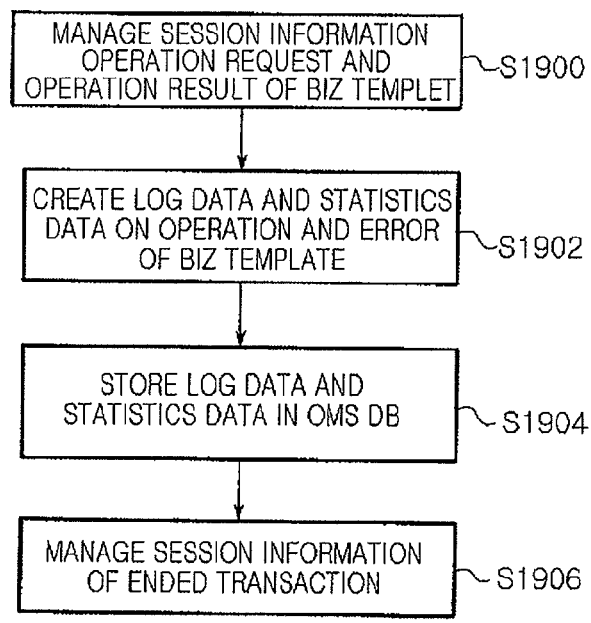

FIG. 25 is a flowchart illustrating a data processing/managing procedure in the business logic processing unit according to an embodiment of the present invention. Referring to FIG. 25, the business logic processing unit 200 according to an embodiment of the present invention performs a managing process of registering, correcting, and deleting the session information on the operation request of the Biz template transmitted from the OI processing unit 100 and an operation result in step S1900. Subsequently, the business logic processing unit 200 creates log data and statistics data on the operation and error of the Biz template and stores the log data and the statistics data in the OMS DB 53 in steps S1902 and S1904. In addition, the business logic processing unit 200 performs a managing process such as of registering, correcting, and deleting the session information of the ended transaction with respect to the operating of the Biz template in step S1906.

The operations in FIGS. 22 to 25 described above can be individually performed if necessary. In particular, the steps S1900 to S1906 of FIG. 25 can be individually performed if necessary.

Figure 26:
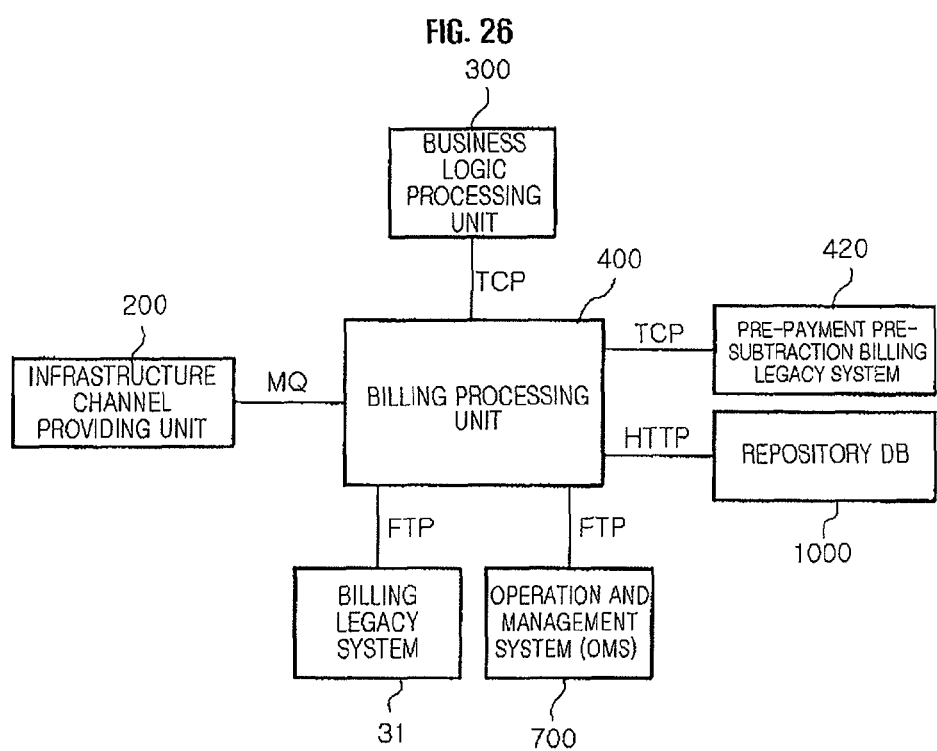
FIG. 26 is a block diagram illustrating a billing processing unit and a network structure according to an embodiment of the present invention.

FIG. 26 is a block diagram illustrating a billing processing unit and a network structure of other devices to describe a billing process according to the operation of the Biz template in the open mobile business supporting system according to an embodiment of the present invention. Referring to FIG. 26, the billing processing unit (Billing Engine or BE) 400 according to an embodiment of the present invention cooperates with the business logic processing unit 200 through a message queue. The billing processing unit 400 cooperates with the infra channel providing unit 300 and a pre-payment pre-subtraction billing legacy system 420 through Transmission Control Protocol (TCP). The billing processing unit 400 cooperates with the billing legacy system 11 and the OMS 700 through File Transfer Protocol (FTP). The billing processing unit 400 cooperates with the repository DB 1000 through Hypertext Transfer Protocol (HTTP).

Through the cooperation structure, the billing processing unit 400 collects a billing log from the business logic processing unit 200 or the infra channel providing unit 300, processes billing and transmits the billing log to the billing legacy system 11. Also, the billing processing unit 400 cooperates with the repository DB 1000 and manages a billing policy. The billing processing unit 400 cooperates with the OMS 700 and transmits/receives operation and management data. In addition, the billing processing unit 400 processes a pre-payment pre-subtraction billing process request by cooperating with the pre-payment pre-subtraction billing legacy system 420.

Figure 27:
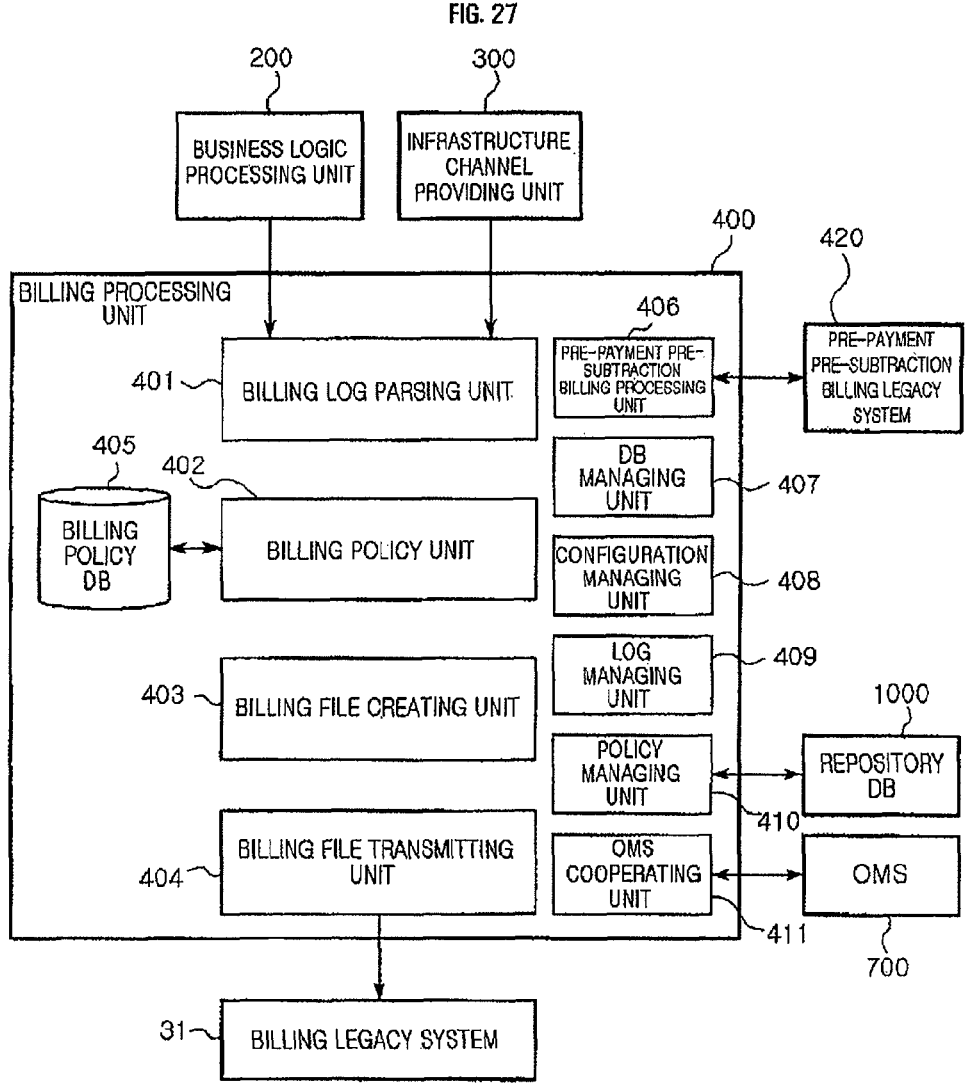
FIG. 27 is a block diagram illustrating a billing processing unit in the open mobile business supporting system according to an embodiment of the present invention.

FIG. 27 is a block diagram illustrating the billing processing unit. Referring to FIG. 27, the billing processing unit 400 includes a billing log parsing unit 401, a billing policy unit 402, a billing file creating unit 403, a billing file transmitting unit 404, and a billing policy DB 405. The billing processing unit 400 according to an embodiment of the present invention can further include a pre-payment pre-subtraction billing processing unit 406, a DB managing unit 407, a configuration managing unit 408, a log managing unit 409, a policy managing unit 410, and an OMS cooperating unit 411.

The billing log parsing unit 401 collects a billing log according to the operation of the Biz template in the business logic processing unit 200, verifies the collected billing log, and operates a process for standardizing the verified billing log. The billing log parsing unit 401 is in charge of interfacing for billing log transmission between the business logic processing unit 200 and the billing processing unit 400 according to an embodiment of the present invention. In particular, the billing log parsing unit 401 checks whether the billing log data by the operation of the Biz template recorded in a specific message queue exists in the business logic processing unit 200. When the billing log data exists, the billing log parsing unit 401 collects the billing log. In addition, the billing log parsing unit 401 can further include a collecting unit for collecting the content provided in the CP/SP system 11 or the billing log for the user. The billing log parsing unit 401 reads the billing log collected according to the Biz template, the content or each user on the basis of line unit. The billing log parsing unit 401 divides the billing log, verifies each billing log, transforms the billing logs into a standardized log format and records the transformed billing logs in the billing policy DB 405.

The billing policy DB 405 stores a plurality of billing policies and billing data whose billing is processed. In addition, the billing policy DB 405 stores data for the billing process by the open mobile business supporting system according to an embodiment of the present invention. Also, the billing policy includes billing policies on a billing process for each case, a prepayment billing process, an event billing process, and a Biz template billing process.

The billing policy unit 402 checks a billing policy to be applied to the standardized billing log in the billing policy DB 405. Subsequently, the billing policy unit 402 applies the checked billing policy to the billing log and creates billing data whose billing is processed. The billing policy unit 402 includes an interface with the infra channel providing unit 300, which cooperates with the legacy system 30 inside the mobile communication system 13. Also, the billing policy unit 402 can further include an authenticating unit (not shown) for performing a user authentication process corresponding to the billing log.

Figure 28:
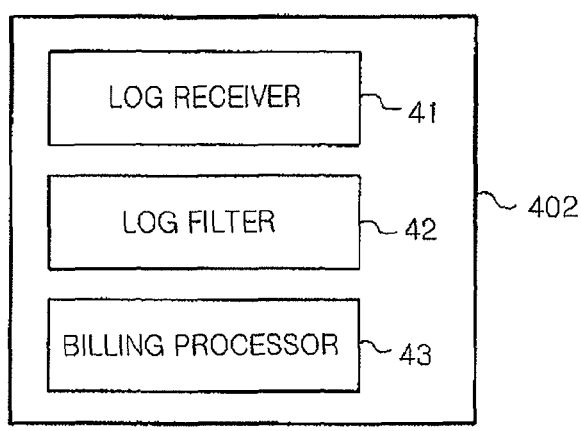
FIG. 28 is a block diagram illustrating a billing policy unit of the billing processing unit according to an embodiment of the present invention.

As shown in FIG. 28, the billing policy unit 402 includes a log receiver 41, a log filter 42 and a billing processor 43.

The log receiver 41 receives the billing log standardized in the billing log parsing unit 401 and performs a billing pre-process on a non-processed billing log. The log filter 42 filters a duplicated billing log of the collected billing log and transmits each of the filtered billing log to a billing process table for the billing process. The billing processor 43 applies each billing policy to each billing log transmitted to the billing process table, operates a billing process and creates billing data.

The billing file creating unit 403 creates a billing file MDR to be transmitted to the billing legacy system 11 of the mobile communication system 13 based on the billing data whose billing is processed. The billing file MDR is a file format, which is a readable file for the billing process in the billing legacy system 1. In particular, the billing file creating unit 403 collects the billing data whose billing is processed and creates the billing file MDR in conformity to an FTP communications protocol.

The billing file transmitting unit 404 transmits the created billing file MDR to the billing legacy system 11. The billing file transmitting unit 404 may transmit the billing file MDR to the billing legacy system 11 based on the FTP.

The billing processing unit 400 according to an embodiment of the present invention can realize real-time billing process, exact billing process and transmission according to the operation of the biz logic of the CP/SP system 11, which is a client requiring a service of the open mobile business supporting system. Accordingly, it is not required to process billing by cooperating with each module to support diverse kinds of billing patterns in a typical method. Since the billing processing unit 400 collects a billing log and applies a corresponding billing policy, it is possible to minimize cooperation of each module in the billing process.

As described above, the billing processing unit 400 of FIG. 27 can further include the pre-payment pre-subtraction billing processing unit 406, the DB managing unit 407, the configuration managing unit 408, the log managing unit 409, the policy managing unit 410, and the OMS cooperating unit 411.

The pre-payment pre-subtraction billing processing unit 406 receives a pre-payment pre-subtraction billing process request of a specific billing log from the business logic processing unit 100. Subsequently, the pre-payment pre-subtraction billing processing unit 406 requests a pre-payment pre-subtraction billing process to the pre-payment pre-subtraction billing legacy system 420 for performing the pre-payment pre-subtraction billing process. The pre-payment pre-subtraction billing processing unit 406 receives and returns a result. The billing log parsing unit 401 verifies a specific billing log to which the pre-payment pre-subtraction billing process is requested. Also, the billing log parsing unit 401 performs a standardization process on the billing log transmitted from the pre-payment pre-subtraction billing processing unit 406. The pre-payment pre-subtraction billing processing unit 406 includes an interface for cooperating with the business logic processing unit 200 and the pre-payment pre-subtraction billing legacy system 420. In particular, the pre-payment pre-subtraction billing processing unit 406 cooperates with the pre-payment pre-subtraction billing legacy system 420 based on the TCP.

The DB managing unit 407 cooperates with a pre-setup database and performs an access process from the billing process device to the database, and access management and release processes.

The configuration managing unit 408 provides an access function to an environment setup file of the billing processing unit 400 and manages configuration information on the billing processing unit 400. In particular, the configuration managing unit 408 checks and manages a setup file commonly used in the billing processing unit 400 and a unique setup file.

The log managing unit 409 manages a common log format of the billing processing unit 400. Also, the log managing unit 409 manages creation and record of a system log, and a processed log file.

The policy managing unit 410 registers, corrects, or deletes a billing policy including a billing information synchronization process on the Biz template and the content, an event management process, a billing verification process, a billing policy synchronization process, backup of a billing policy in a pre-set up repository 52. When the billing policy is requested, the policy managing unit 410 reads the billing policy in the repository 52 and responds to the request.

The OMS cooperating unit 411 collects, transmits and manages data for operating and managing the billing processing unit 400 managed in the OMS 700 by cooperating with the OMS 700.

Figure 29:
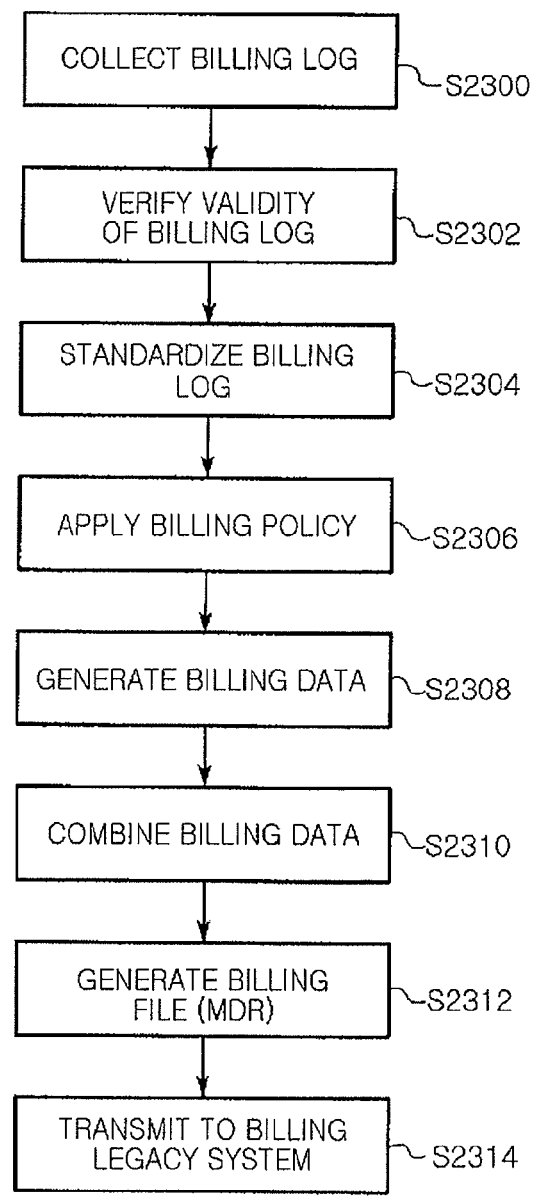
FIG. 29 is a flowchart illustrating a method of billing process according to an embodiment of the present invention.

FIG. 29 is a flowchart illustrating a method of billing process according to an embodiment of the present invention. Hereinafter, a billing process of a billing processing unit 400 will be described with reference the FIG. 29.

The billing log parsing unit 401 collects billing log according to the biz template perform at the business logic processing unit 200 in step S2300. The billing log parsing unit 401 collects billing log through cooperating with the business logic processing unit 200 and a message queue. That is, the billing log parsing unit 401 determines whether the billing log data is recorded in a predetermined message queue by the business logic processing unit 200. If the billing log data is present in the message queue, the billing log data is read. In the step S2300, billing log for content provided from the CP/SP system 11 or a user can be collected.

Figure 30:
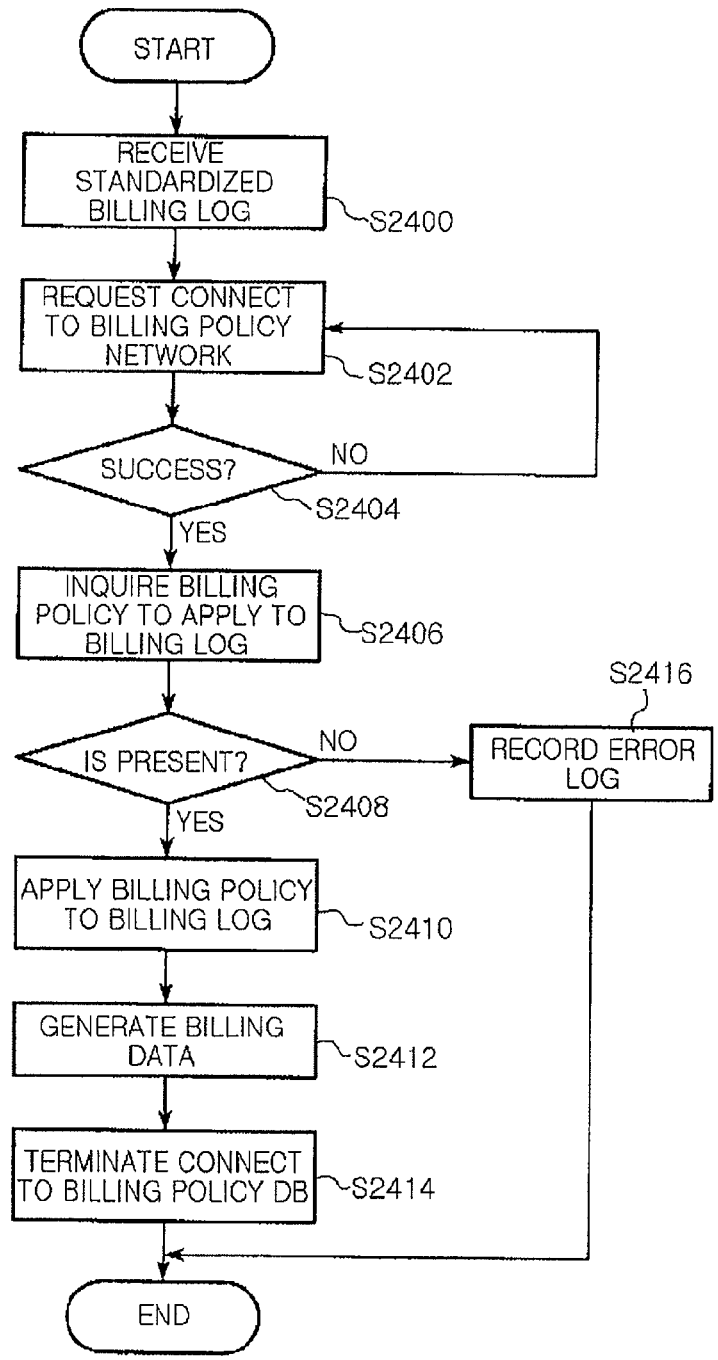
FIG. 30 is a flowchart illustrating a procedure of applying the billing policy according to an embodiment of the present invention.

Then, it verifies the validity of the collected billing log in step S2302. In order to verify the validity, the billing log is classified by a type thereof and the verification is performed. Then, the valid billing log is standardized in step S2304. Billing data is created by applying a predetermined billing policy to the standardized billing log in step S2306 and S2308. FIG. 30 shows a procedure of applying the billing policy.

Referring to FIG. 30, when the standardized billing log is received in step S2400, a connection to a billing policy DB 405 is requested in step S2402. If the billing policy DB 405 is successfully connected in step S2404, a billing policy to apply to the collected billing log is inquired from the billing policy DB 405 in step S2406. No billing policy is present in the billing policy DB in step S2408, an error log is recorded in step S2416. If the proper billing policy is resent, billing data is created by applying the billing policy to the collected billing log in steps S2410 and S2412. Then, the connected to the billing policy DB 405 is terminated in step S2414.

Afterward, a billing file MDR is created by collecting the billing data to transmit the billing file MDR to the billing legacy system 30 of the mobile communication system 13 in steps S2310 and S2312. The billing file MDR has a format that can be recognized by the billing legacy system. The billing file is created to be suitable to FTP. Then, the created billing file (MDR) is transmitted to the billing legacy system 11 using FTP in step S2314.

The billing processing unit 400 according to an embodiment of the present invention performs a prepay and pre-subtracting billing process corresponding to the request by cooperating with the pre-payment pre-subtraction billing legacy system 420.

Figure 31:
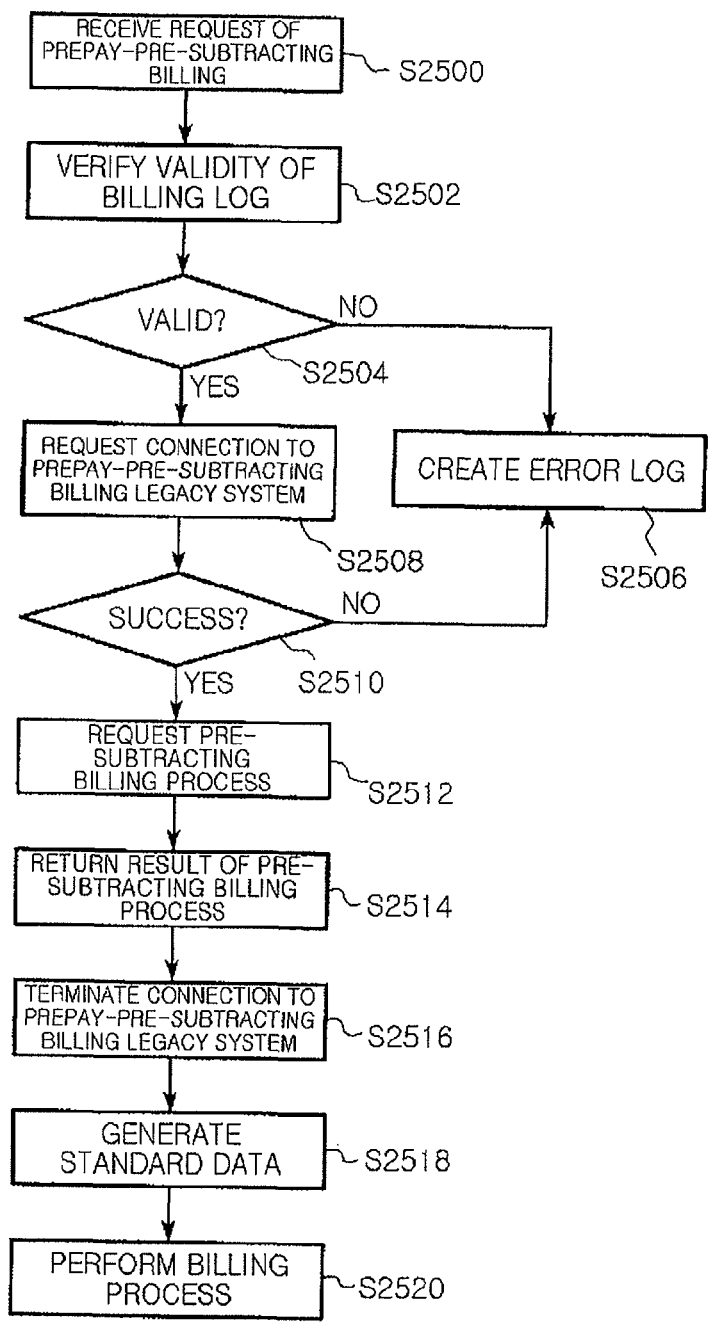
FIG. 31 is a flowchart illustrating a prepay and pre-subtracting process performed in a billing processing unit according to an embodiment of the present invention.

FIG. 31 is a flowchart illustrating a prepay and pre-subtracting process performed in the billing processing unit 400. Referring to FIG. 31, after step S2300, the billing processing unit 400 receives a request of performing a prepay and pre-subtracting billing process from the business logic processing unit 200 in step S2500. Then, the validity of billing log is verified in step S2502. If the billing log is not valid in step S2504, an error log is recorded in step S2506. If the billing log is valid in step S2504, it requests to connect to the pre-payment pre-subtraction billing legacy system 420 in step S2508.

If the connection is failed in step S2510, an error log is created and recorded in step S2506. If the connection is successfully established in step S2510, the prepay and pre-subtracting process is requested and the result thereof is returned in steps S2512 and S2514. The connection to the pre-payment pre-subtraction billing legacy system 11 is terminated in step S2516, the prepay and pre-subtracting processed billing log is standardized, and a billing process is performed in steps S2518 and S2520.

Figure 32:
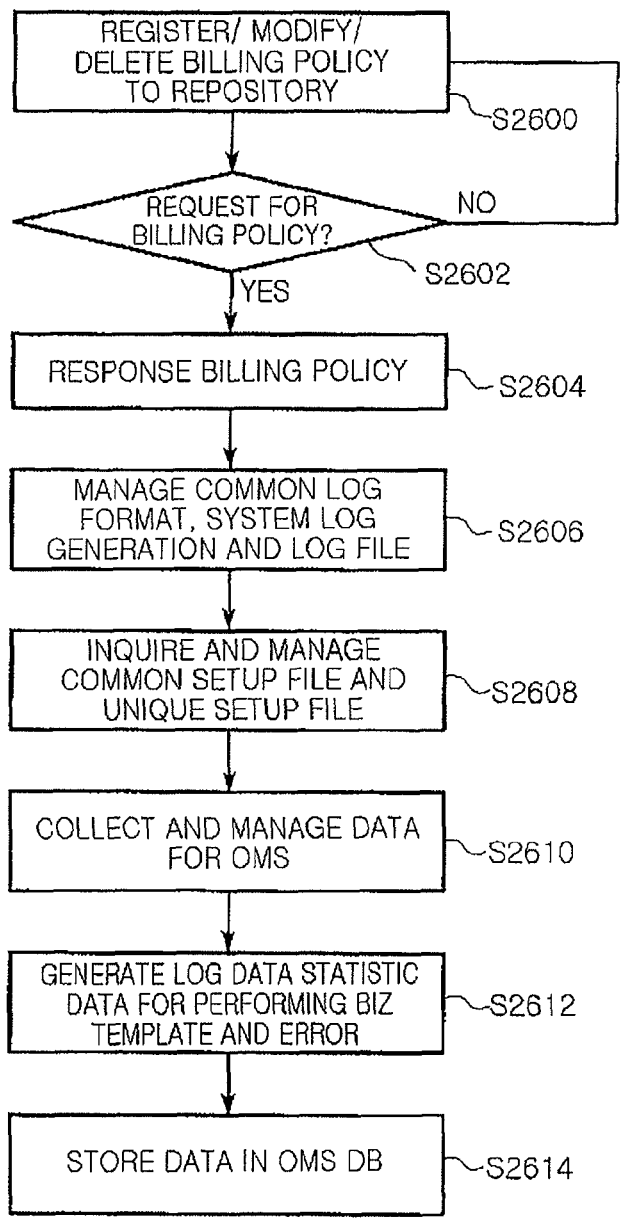
FIG. 32 is a flowchart illustrating a procedure of processing and managing billing data in a billing processing unit according to an embodiment of the present invention.

FIG. 32 is a flowchart illustrating a procedure of processing and managing billing data in a billing processing unit 32 according to an exemplary embodiment of the present invention. Referring to FIG. 32, a billing policy is registered, modified, and deleted to/from a predetermined repository DB 1000 in step S2600. When the billing policy is required for the billing process in step S2602, the billing policy is returned in step S2604. Also, common log format, system log creation, and record, and processed log file management are performed in step S2606. Also, common setup file and a unique setup file inquiry are performed in step S2608. Then, data is collected and managed for operating and managing in step S2610. Moreover, log data and statistic data for performing biz template and error thereof are generated and stored in the OMS 700 in steps S2612 and S2614). Each process in FIG. 32 can be performed independently according to needs.

Figure 33:
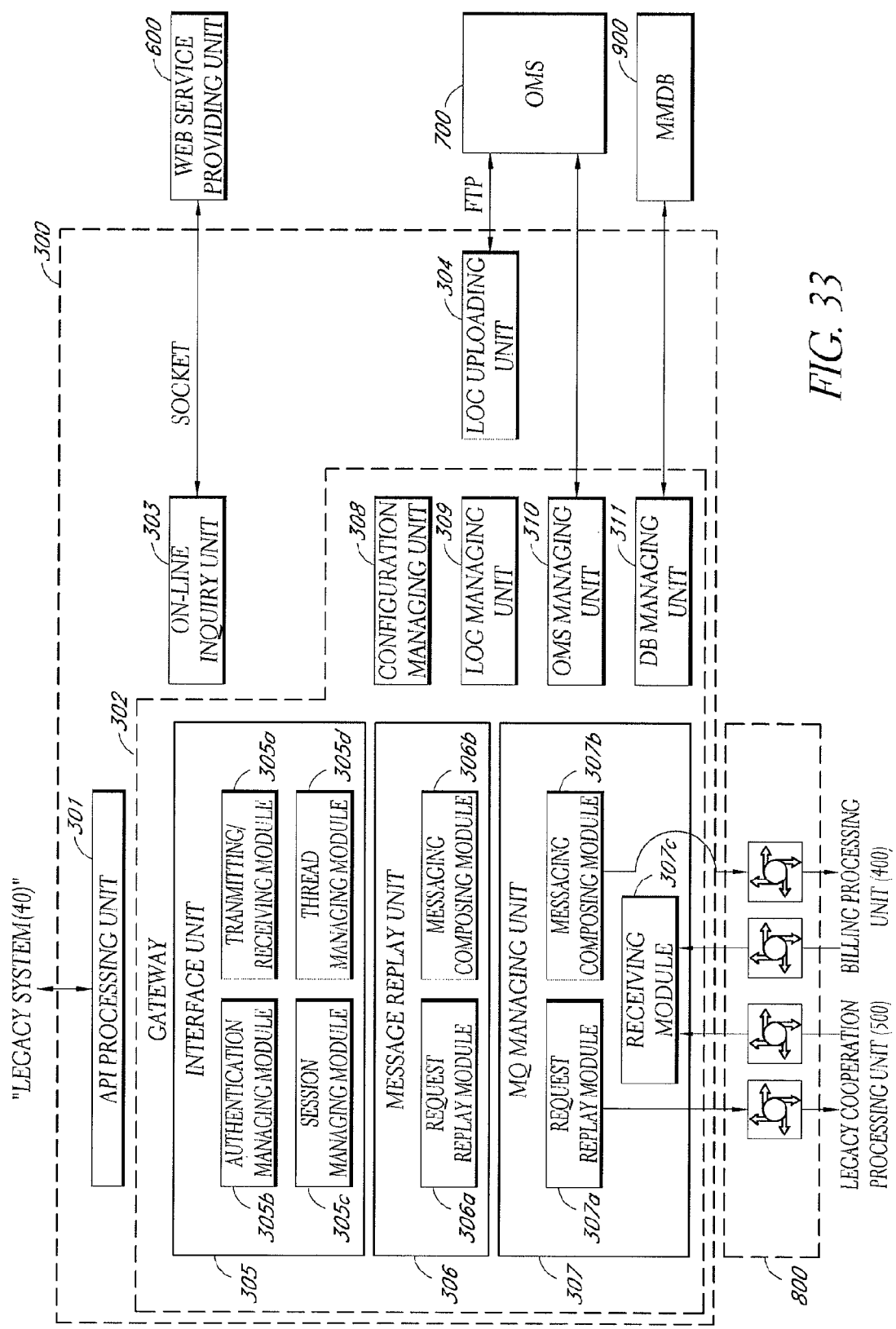
FIG. 33 is a block diagram illustrating a infra channel providing unit according to an embodiment of the present invention.

FIG. 33 is a block diagram illustrating the infra channel providing unit 300. Referring to FIG. 33, the infra channel providing unit 300 includes an API processing unit 301, a gateway unit 302, an on-line inquiry unit 303, and a log uploading unit 304. The API processing unit 301 provides an execution parameter of a biz object for a legacy system 30, processing input and output parameters for executing a biz object, transfers the input parameter to the gateway unit 302, and transfers the results, the output parameter, to the legacy system 30 that performs the request of the biz object. The gateway unit 302 performs the requested biz object using the input parameter transferred from the API processing unit 301, thereby transferring a cooperation request to a legacy cooperation processing unit 500. The gateway unit 302 also request a cooperation request to the legacy cooperation processing unit 500, receives the result thereof, and transfers the received result to the API processing unit 301. Furthermore, the on-line inquiry unit 303 provides the environmental setup value of the gateway unit 302 to a web service providing unit 600. The log uploading unit 304 provides the log of the infra channel providing unit 300 to an OMS 700, regularly.

The gateway unit 302 includes an interface unit 305, a message relay unit 306, a MQ managing unit 307, a configuration managing unit 308, a log managing unit 309, an OMS managing unit 310, and a DB managing unit 311. The interface unit 305 provides an input/output interface to the API processing unit 301. The interface unit 305 includes a transmitting/receiving module 305a for receiving a biz object request from the API processing unit 301 and transferring a processing result to the API processing unit 301, an authentication managing module 305b for processing a user right authentication of a legacy system 30 accessing the API processing unit 301, a session managing module 305c for creating and managing a unique session key for an authenticated request from the authentication managing module 305b, a thread managing module 305d for supporting a multi-thread process to process the authenticated request from the authentication managing module 305b. The message relay unit 306 relays a message for requesting. The message relay unit 306 includes a request relay module 306a for analyzing an API requested from the interface unit 305 and relaying a message from a message transferring unit 800, and a message composing module 306b for parsing a parameter transferred from the API processing unit 301 to a format to transfer to the message transferring unit 800. The MQ managing unit 307 supports a MQ cooperation protocol. The first transmission module 307a transmits a message to the legacy system 30 by cooperating with the legacy cooperation processing unit 500 through the message transferring unit 800. The second transmission module 307b transfers a message to the billing processing unit through the message transferring unit 800 for billing log. The receiving module 307c receives a message from the legacy cooperation processing unit 500 and the billing processing unit 400 through the message transferring unit 800. The configuration managing unit 308 manages environmental setting such as a log generation period and a system environment of the infra channel providing unit 300. The log managing unit 309 creates a log file of the infra channel providing unit 300, and creates a monitoring data log to be transmitted to the OMS 700. The OMS managing unit 310 transmits monitoring data stored as a file format by the log managing unit 309 to the OMS 700 at a regular period. The DB managing unit 311 records or reads data by performing access and transaction to the MMDB 900.

The log managing unit 309 does not directly access the OMS 700 for system performance.

Figure 34:
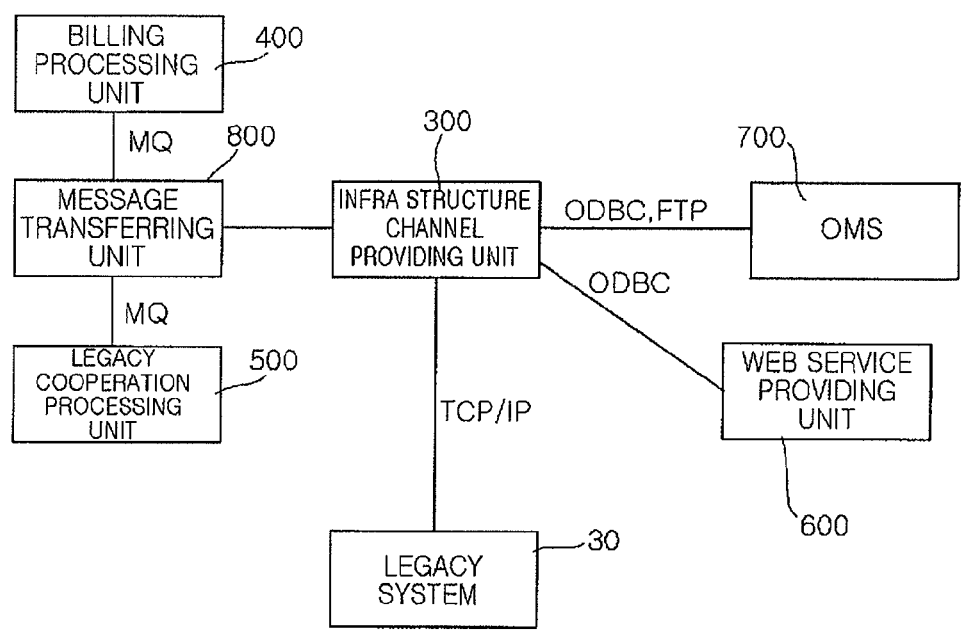
FIG. 34 is a block diagram illustrating a cooperating structure of the infra channel providing unit according to an embodiment of the present invention.

FIG. 34 is a block diagram illustrating a cooperating structure of the infra channel providing unit 300. Referring to FIG. 34, the API processing unit 301 is connected to the legacy system 30 through a TCP/IP protocol. The infra channel providing unit 300 exchanges a message with a legacy cooperating unit 43 and the billing processing unit 400 through the message transferring unit 800 using the MQ cooperating protocol. The infra channel providing unit 300 and the OMS 70 are connected through an ODBC and a FTP. The infra channel providing unit 300 is connected to the web service unit 48 and the ODBC.

In order to improve a processing speed, a TCP/IP socket protocol is used between the API processing unit 301 and the gateway unit 302. A message queue is used to transfer a message between the gateway unit 302 and the other constitutional elements of the open mobile business supporting system such as the legacy cooperation processing unit 500 and the billing processing unit 400. Furthermore, it does not require additional cooperation interface with the legacy system 30.

The API processing unit 301 supports various platforms such as NT, SUN, IBM, AIX, and HP-UX, and can be embodied by development languages such as C/C++ and Java, and provides an API mapped to a biz object in a 1:1 manner.

According to the described configuration, the infra channel providing unit 300 builds an infra integrated structure of a standardized communication channel to the legacy system 30, supports various platforms and development languages to allow related services to be used on Web, guarantees the connection reliability between a synchronous TCP/IP socket scheme and an asynchronous MQ communication scheme, and perform quick function of a biz object unit.

The operations of the infra channel providing unit 300 will be described with reference to FIG. 35 and FIG. 36, hereinafter.

Figure 35:
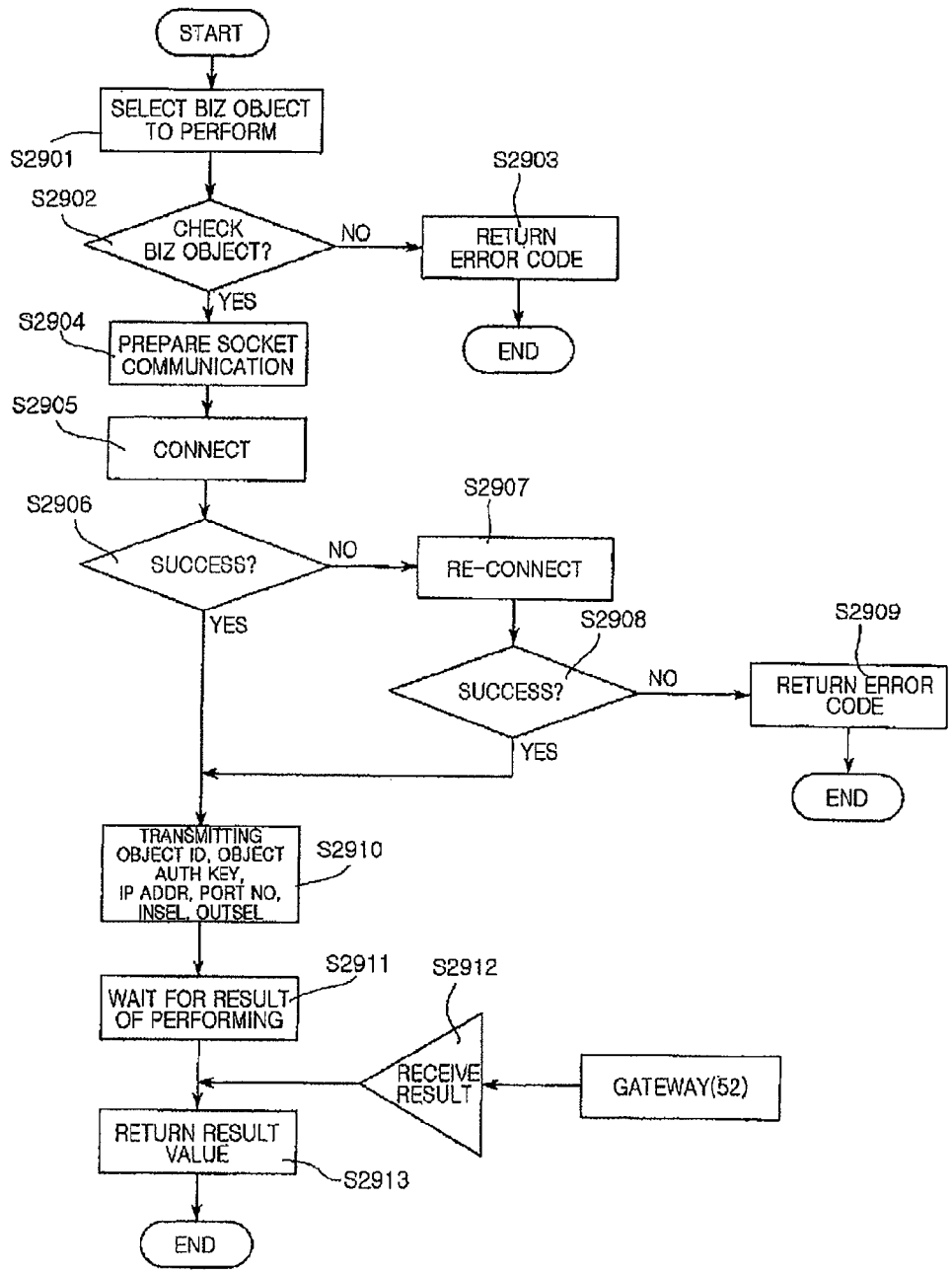
FIG. 35 is a flowchart of API in an infra channel providing unit according to an embodiment of the present invention.
Figure 36:
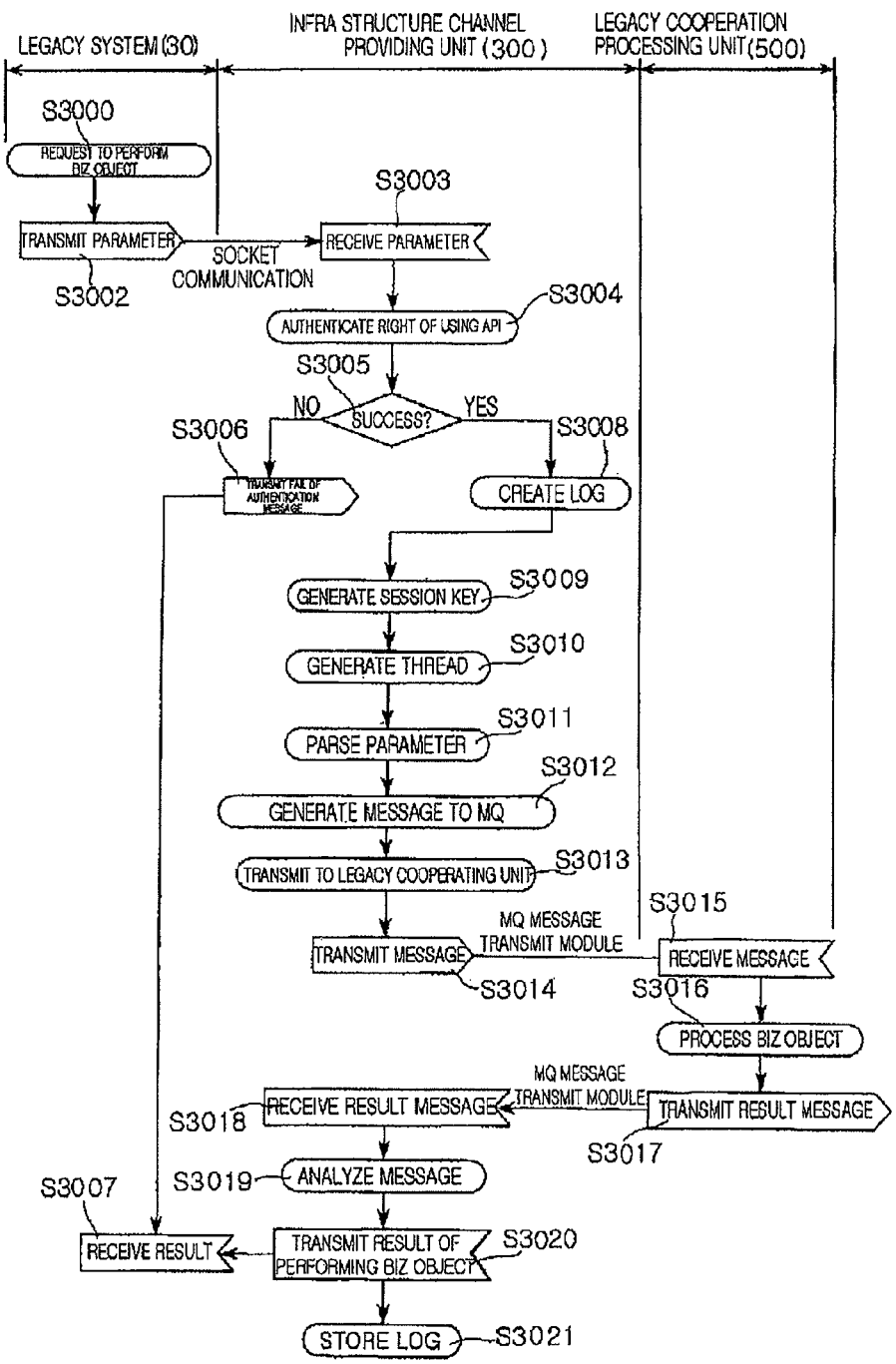
FIG. 36 is a flowchart illustrating a procedure of performing a biz object in an infra channel providing unit according to an embodiment of the present invention.

Referring to FIG. 35, the API processing unit 301 provides a common library type API to the legacy system 30. That is, the API processing unit 310 takes a charge of a client part in socket communication. When a predetermined biz object is selected from a predetermined legacy system 30 in step S2901, it determines whether the biz object is present or not in step S2902. If not, an error code is transmitted to the corresponding legacy system 30 in step S2903. If the biz object is present, the socket communication with the gateway unit 302 is prepared in step S2904.

If an access is not successful after accessing the gateway unit 2092 through the socket communication in step S702, re-access is performed and it determines whether the re-access is successful or not. If not, an error code is transmitted to a legacy system 30 that request a biz object at S2909.

On the contrary, if the access to the gateway unit 302 through the socket communication is successful, it transmits an objectID, an API authentication key objectAuthKey, an IP address of infra channel providing unit, a port number (portNo), an input parameter set (in Set), and an output parameter set of a result of executing a biz object in S2910.

It waits to receive the execution result from for the gateway unit 302 in step S2911.

If the result is received from the gateway unit 302, the received result value is returned to the legacy system 30 that request the corresponding biz object to execute in step S2913.

Hereinafter, a procedure of executing a biz object will be described with referring to FIG. 36. if the legacy system 30 request a biz object to execute in step S 3001, parameters for executing the biz object are transmitted to the infra channel providing unit 300 in step S3002.

As described above with reference to FIG. 35, the API processing unit 301 of the infra channel providing unit 300 receives the parameters such as an objectID, an objectAuthKey, an ipAddr, a portNo, an in Set, and an outset to the gateway unit 302 through socket communication in step S3003.

The authentication managing module 305b of the gateway unit 302 authenticates whether a corresponding legacy system 30 has an API usage right or not based on the objectAuthKey among the parameters in step S3004. If the legacy system does not have the API usage right in step S3005, it transmits a message of authentication failure to the legacy system 30 and the legacy system 30 receives the message in steps S3006 and S3007.

On the contrary, if the legacy system has the API usage right, a log is created in step S3008, the session managing module 305c creates a unique session key for the request in step S3009, and the thread managing module 305d creates threads for performing the request in step S3010.

When the message composing module 306b receives the parameters through the created thread, the message composing module 306b composes a request message to transmit to the message transferring unit 800 by parsing the received parameters in step S3012. The first transmission module 307a of the MQ managing unit 307 recodes the created request message in an assigned message queue for the legacy cooperation processing unit to receive the generated request message in steps S3013 and S3014.

A corresponding legacy cooperation processing unit 500 reads the message recorded in the message transferring unit 800, processes a biz object according to the request message, and records the result thereof into a message queen of the message transferring unit 800 so that the infra channel providing unit 300 receives the result thereof in steps S3015 to S3017.

The receiving module 307c of the infra channel providing unit 300 receives the result message in step S818. Afterward, the message relay unit 306 analyzes the received messages, detects the execution result of the biz object and transmits the result thereof to the legacy system 30 that requests the execution of the biz object through the API processing unit 301 in step S3020. At the ending time of executing the biz object, a log is stored in step S3021.

As described above, the infra channel providing unit according to an embodiment of the present invention provides a unified cooperation rule between the legacy systems 30 by relaying the use of the legacy system 30 for a biz object that embodies a unit function per a legacy system 30.

As the billing process for a related biz object in the infra channel providing unit 300, the session managing module 305c analyzes the session information of the currently executing biz object, determines whether the biz object is successfully processed or not, creates billing data if it is successfully processed, composes a billing message through the message relay unit 306b, and transmits the billing message to the message transferring unit 800 through the second transmission module 307b of the MQ managing unit 307 so that the billing processing unit 400 receives the transmitted billing message. Then, the session managing module 305c receives a result message of processing the billing data from the billing processing unit 400 using the receiving module 307c and stores the received result message in a billing data log. Therefore, in the present embodiment, proper billing data is collected and processed whenever a biz object is executed.

Furthermore, the log managing unit 309 of the infra channel providing unit 300 creates a log file for the infra channel providing unit 300 and a monitoring data log to be transmitted to the OMS 700. That is, the log managing unit 309 selects files to send from the created log files or a report log DB. Then, the log uploading unit 304 transmits the selected log files to the OMS 700 through a FTP by regularly requesting to the OMS 700 for FTP access. When the log uploading unit 304 receives a response for receiving a log file from the OMS 700, the log uploading unit 304 determines that the corresponding log file is successfully transmitted, releases the FTP access, and deletes the transmitted log files. The infra channel providing unit 300 helps the OMS 700 to manage the log information of the infra channel providing unit by regularly transmitting the log file and the report log file of the system to the OMS 700.

Moreover, the log managing unit 309 creates debugging information, malfunctioning information, system operation information generated from each module of the infra channel providing unit 300 as logs and stores the created logs in a system log file. The log managing unit 309 loads a log environment file, reflects modified setup values to the environment file if the environmental setup values are modified, or sustains the environment file as it is if the environmental setup values are not modified. Then, the log managing unit 309 checks a rotate period. If the rotation is required, the log managing unit rotates the log file to create new log file for debugging information, malfunction information, and system operation information of the infra channel providing unit 300 to create the new log file, creates logs of each level based on the new log file, and stores the created logs and files at the system log file.

The configuration information modified by a manager is updated to control threads in the infra channel providing unit 300 in real time. In order to update, the configuration managing unit 308 of the infra channel providing unit 300 loads a configuration file of a currently setup system, determines whether the configuration information is modified or not, and applies the modified configuration to the infra channel providing unit 300 in real time if the modification is made. Furthermore, the configuration managing unit 308 determines whether a tread environment is modified or not, the configuration managing unit 308 performs thread control if the thread environment is modified.

When the on-line inquiry unit 303 receives an inquiry request message from the web service providing unit 600, the on-line inquiry unit 303 loads a configuration file managed by the configuration managing unit 308, parses inquiry lists, composes a result message, and the result message to the web service providing unit 600.

The OMS managing unit 60 of the infra channel providing unit 300 regularly loads a log file generated from the log managing unit 309, extracts access information, directly accesses the DB of the OMS 700, and transmits the monitoring statistical data to the OMS 700.

Figure 37:
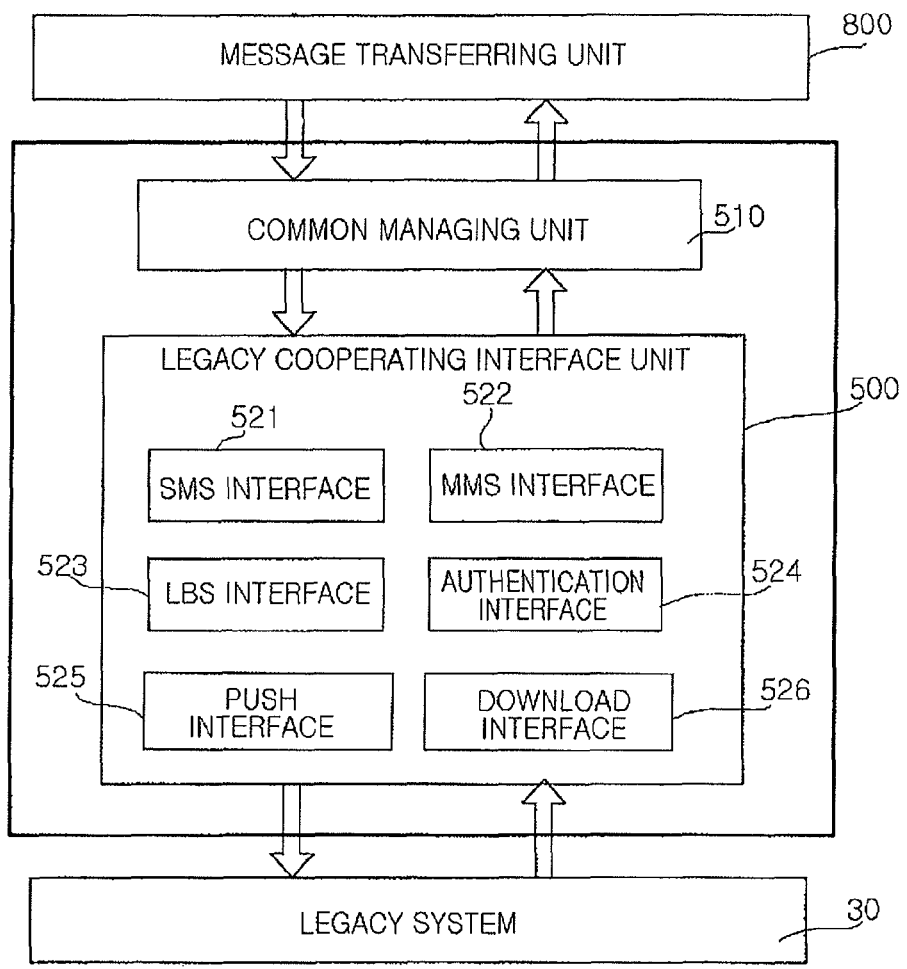
FIG. 37 is a block diagram illustrating a structure of a legacy cooperation processing unit in a mobile business supporting system according to an embodiment of the present invention.

FIG. 37 is a block diagram illustrating a structure of a legacy cooperation processing unit 500 in a mobile business supporting system according to an embodiment of the present invention. The legacy cooperation processing unit 500 includes a common managing unit 510 and a legacy cooperating interface unit 520.

The common managing unit 510 receives a cooperation request for performing the biz template from the business logic processing unit 200 and returns the result of processing the received request to the business logic processing unit 200. The common managing unit 510 also manages the system environment and the log thereof. The cooperation request of legacy system 30 is that the legacy cooperation processing unit 500 requests the legacy system 30 to perform a biz object so as to perform a biz template at the business logic processing unit 200. In response to the cooperation request, the legacy system 30 performs related services such as SMS transmission, MMS transmission, position data inquiry, and user data inquiry, and provides the result thereof such as message transmission completion, position data, or user data.

The legacy cooperation interface unit 520 includes, for example, an SMS interface 521, an MMS interface 522, an LBS interface 523, and an authentication interface 524. The legacy cooperation interface unit 520 further includes a push interface 525 and a download interface 526. According to the type, function and system environment of business log to be supported, various legacy cooperation interfaces can be added for cooperating with the legacy system 30. The legacy cooperation interface unit 520 relays the cooperation request for performing the biz template from the legacy system 30 and returns the result thereof to the legacy system 30.

The SMS interface 521 cooperates with an MASS that is located in the legacy system 30 and performs a wireless Internet SMS transmission service of a wireless communication system. The SMS interface 521 requests the MASS to transmit an SMS message, receives information about the result thereof such as message transmission completion or message read, and transforms the received information to a standard interface type.

The MMS interface 522 cooperates with an MMSC that is located in the legacy system 30 and performs an MMS service of a wireless communication system. The SMS interface 521 requests the MMSC to transmit an MMS message, receives information about the result thereof such as message transmission completion or message read, and transforms the received information to a standard interface type.

The LBS interface 523 cooperates with an LBSP that is located in the legacy system 30 and performs a position based service of a wireless communication system. The LBS interface 523 transfers a position related request such as position information inquiry to the corresponding LBSP, and transforms the result of processing the position related request to a standard interface type.

The authentication interface 524 cooperates with an authentication system that is located in the legacy system 30 and authenticates a wireless communication system. The authentication interface 524 requests a corresponding authentication system to perform an authentication process and transforms the result of performing the authentication process to a standard interface type.

The push interface 525 performs a push type message transmission service by cooperating with the MASS 32 and the CBCS 35 of a legacy system 30, and transforms the result thereof to a standard interface type.

The download interface 526 performs a download service of image, music, and text by cooperating with a download platform of the legacy system 30, and transforms the result thereof to the standard interface.

The legacy cooperation interface unit 520 is described to include these interfaces in the present embodiment. However, the interfaces of the legacy cooperation processing unit 500 can vary according to the legacy system 30 and the related biz objects.

Hereinafter, the operations of the legacy cooperation processing unit 500 will be described. At first, when the common managing unit 510 receives a request message of the legacy system 30, which is required for performing the biz template, from the business logic processing unit 200 through the message transferring unit 800 formed as a message queue, the common managing unit 510 transfers the request to the legacy cooperation interface unit 520. Then, the legacy cooperation interface unit 520 transforms the request to a format proper to the legacy system through protocol transformation and transmits the transformed request to a corresponding legacy system 30. Afterward, the legacy system 30 performs predetermined operations related to the received request such as SMS transmission, MMS transmission, position data inquiry, or user data inquiry, and transmits the result thereof such as message transmission completion, message read, position data, or user data to the legacy cooperation interface unit 520. The legacy cooperation interface unit 520 transforms the received results to a standard output message format of a legacy system cooperation result, and transfers the transformed output message to the common managing unit 510. The common managing unit 510 returns the processing result to the business logic processing unit 200 or to the infra channel providing unit 300 through the message transferring unit 800.

Figure 38:
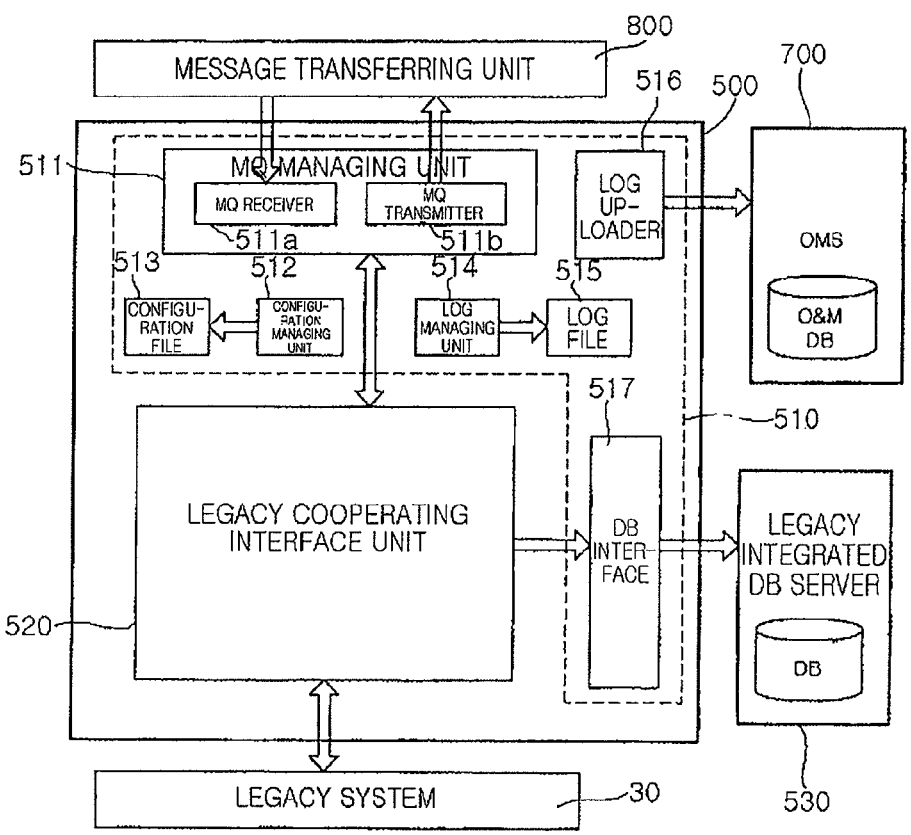
FIG. 38 is a block diagram illustrating the common managing unit in the legacy cooperation processing unit according to an embodiment of the present invention.
Figure 39:
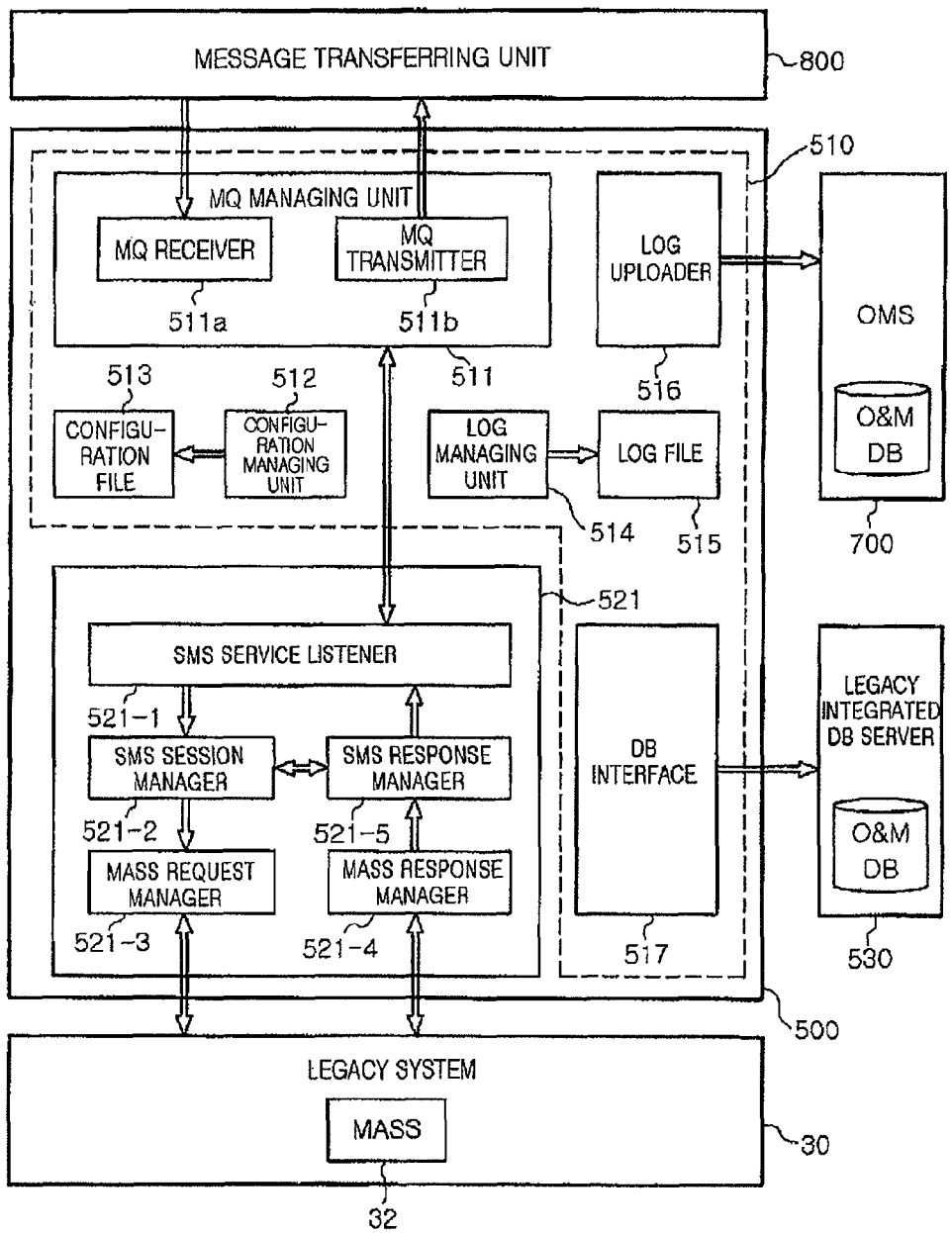
FIG. 39 is a block diagram illustrating an SMS interface in a legacy cooperation processing unit according to an embodiment of the present invention.

FIG. 38 is a block diagram illustrating the common managing unit 510 in the legacy cooperation processing unit 500. Referring to FIG. 39, the common managing unit 510 includes an MQ managing unit 511, a configuration managing unit 512, a log managing unit 514, a log uploader 516, and a DB interface 517.

The MQ managing unit 511 includes an MQ receiver 511a and an MQ transmitter 511b, and manages a transmission operation and a receiving operation of messages to/from the business logic processing unit 200 and the infra channel providing unit 300. In one embodiment, the MQ managing unit 511 has a function to check the data validity. The MQ receiver 511a is a module for processing messages received from the message transferring unit 800, that is, a message queue. The MQ receiver 511a stores request information from the business logic processing unit 200 or the infra channel providing unit 300 through the message transferring unit 800 into a database or transforms the received message to a legacy format. The MQ transmitter 511b transmits the processing result of the legacy system 30 to the business logic processing unit 200 or the infra channel providing unit 300 through the message transferring unit 800, and supports a protocol process for cooperating with a message queue.

The configuration managing unit 512 manages a system environment or environmental setups such as a log create cycle for each constitutional element of the legacy cooperation processing unit 500, and stores the state information of the system environment as a configuration file 513. The configuration managing unit 512 manages the configuration files to reflect the changes thereof into the configuration files through re-driving the legacy cooperation processing unit 500 when the configuration file is modified, or to instantly reflect in real time without re-driving. That is, the configuration managing unit 512 manages changes of each constitutional element for the legacy cooperation processing unit 500 using the configuration file 513 and sets up an execution environment by reading the configuration file 513 in real time when the system is driven. In the configuration information management, a configuration data value is inquired by receiving a KEY value from a program or a module requesting the configuration information. The configuration information is frequently modified, deleted, or inputted by directly accessing the configuration file 513. When the configuration information is modified, deleted, or inputted, the configuration managing unit 512 reflects the real-time modified configuration information to the current legacy cooperation processing unit 500, and provides the reflected configuration information to programs and modules.

The log managing unit 514 generalizes a log format of each log level in each constitutional module of the legacy cooperation processing unit 500, and creates a system log based on a log format and a log level assigned from each constitutional module. Such log information is stored in the log file 515. The log creation is to create logs for debugging information, malfunctioning information, and system operation information, which are generated from each module, and stores the created log into the system log file 515. The log level can be setup according to the system environment. For example, various log levels such as an error level, an information providing level, a warning level, or a debug level can be setup according to the related environment. When the log is requested, the log is created according to the related log levels set up according to the related environment.

The log managing unit 514 receive log data transmitted from each constitutional module of the legacy cooperation processing unit 500, transforms the received log data to a format suitable to output it to the log file 515, opens a log file 515 according to each constitutional module and conditions thereof, and records the log data to the opened log file 151.

The log uploader 516 regularly searches the system log of the legacy cooperation processing unit 500 and uploads the searched system log to the OMS 700 using FTP. The log uploader 516 regularly searches the log file 515 of the legacy cooperation processing unit 500, requests the OMS 700 to FTP access, and uploads the log file 515 if it successfully accesses.

The DB interface 517 provides an interface to the legacy cooperation interface unit 520 and the legacy integrated DB server 530. The legacy integrated DB server 530 stores and manages session information about message transmission state, transmission result for asynchronous messaging process when the legacy system 30 transmits or receives a message.

FIG. 39 is a block diagram illustrating an SMS interface 521 in a legacy cooperation processing unit 500.

Referring to FIG. 39, the SMS interface 521 includes an SMS service listener 521-1, a session manager 521-2, an MASS request manager 521-3, an MASS response manager 521-4, and an SMS response manager 521-5.

The SMS service listener 521-1 receives the legacy system cooperation request transferred from the MQ receiver 511a of the MQ managing unit 511, and registers the requests in the legacy integrated DB server 530. Herein, the legacy system cooperation request is a request of cooperating for the MASS 32 which is a wireless Internet SMS transmission system.

The SMS session manager 521-2 receives an SMS transmission request of the MQ receiver 511a from the legacy integrated DB server 530, and proves the received request to the MASS request manager 521-3. The SMS session manager 521-2 requests the session states such as service request or the result thereof to the legacy integrated DB server 530.

The MASS request manager 521-3 also requests the MASS 32 to perform an SMS messaging service.

The MASS response manager 521-4 receives a processing result such as message transmission completed or message read from the MASS 32 after the MASS 32 transmit the SMS message.

The SMS response message 521-5 receives an MASS cooperation result information from the MASS response manager 521-4 and registers the received information at the legacy integrated DB server 530. Then, the SMS service listener 521-1 obtains the results from the legacy integrated DB server 530, and transfers the obtained result to the MQ transmitter 511b of the MQ managing unit 511. The MQ transmitter 511b provides the request processing result of the business logic processing unit 200 and the infra channel providing unit 300 by recording the request processing result to an assigned message queue.

Figure 40:
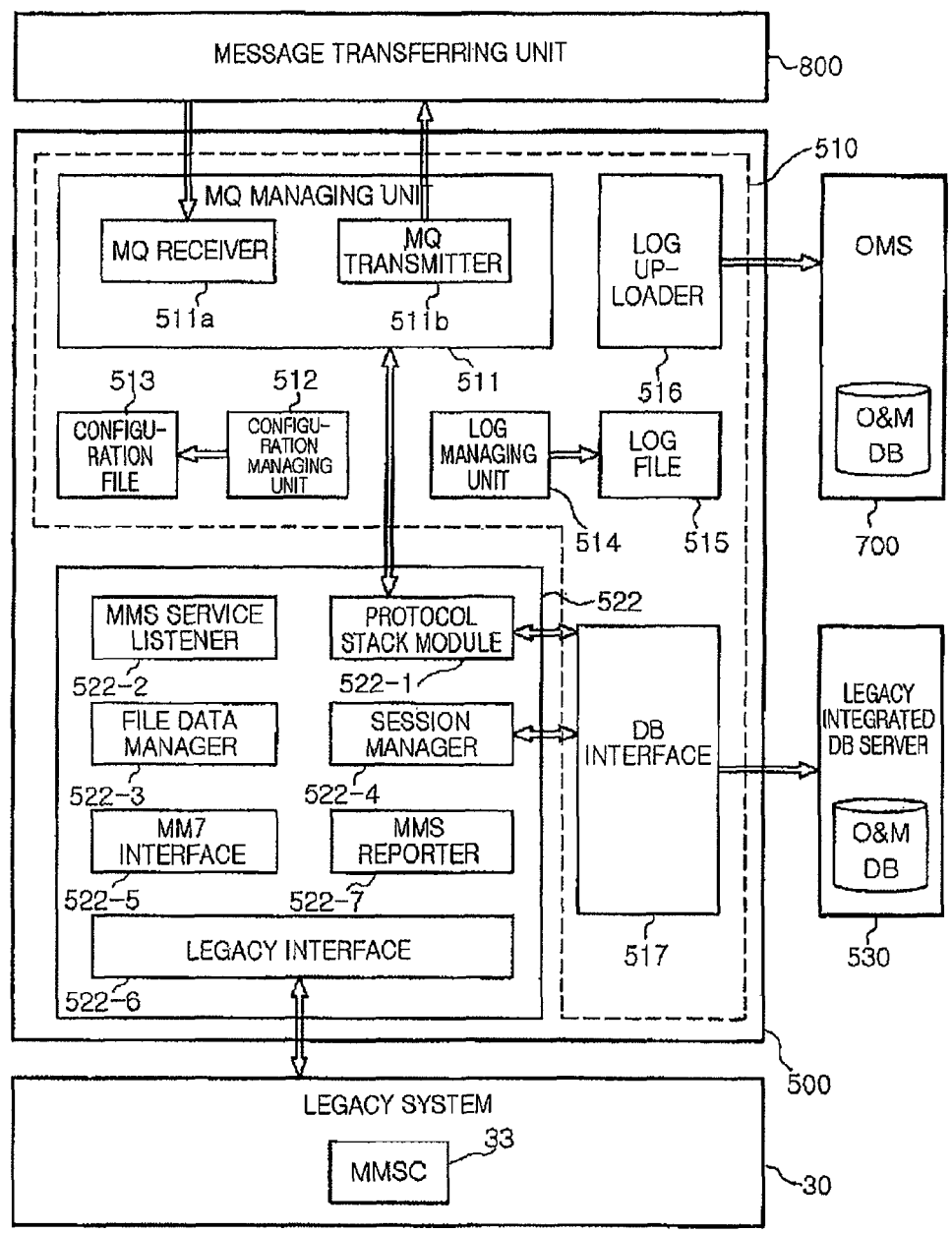
FIG. 40 is a block diagram illustrating an MMS interface in a legacy cooperation processing unit according to an embodiment of the present invention.

FIG. 40 is a block diagram illustrating an MMS interface 522 in a legacy cooperation processing unit 500 according to an embodiment of the present invention.

Referring to FIG. 40, the MMS interface 522 includes an MMS Service Listener 522-1, a protocol stack module 522-2, a file data manager 522-3, a session manager 522-4, an MM7 interface 522-5, an MMS reporter 522-7, and a legacy interface 522-6.

The MMS service listener 522-1 receives a legacy system cooperation request from the MQ receiver 511a of the MQ managing unit 511 and resisters the received request at the legacy integrated DB server 530. The cooperation request from the business logic processing unit 200 to process an MMS message is belonging to a cooperation request for an MMSC 33 that takes a charge of transmitting an MMS message.

The protocol stack module 522-2 processes protocols, such as HTTP, SMTP, MIME, DIME, and SOAP, for transforming a message to a predetermined format to cooperate with the MMSC.

The file data manager 522-3 receives reference data including the MMSC cooperation request message, and performs a function to receiving an MMS message by cooperating with a file server (not shown) having the real MMS message content.

The session manager 522-4 receives an MMSC cooperation request message, which is transferred from the MQ receiver 511a, from the legacy integrated DB server 530, and relays the received MMC cooperation request message to the MM7 interface 522-5.

The MM7 interface 522-5 transforms the MMSC cooperation request message transferred from the session manager 522-4 to a format suitable to MM7 that is an MMSC cooperation protocol, and transmits it the legacy interface 522-6.

The legacy interface 522-6 requests an MMS messaging service such as MMS message transmission by cooperating with the MMSC 33 according to the legacy system cooperation request, and receives the service processing result from the MMSC.

The MMS reporter 522-7 receives a cooperation processing result from the MMSC 33 through the legacy interface 522-6, and provides the received cooperation processing result to the legacy integrated DB server 530 through the DB interface 517. As described above. The MMS reporter 522-7 stores the cooperation processing result to the legacy integrated DB server 530, and the MMS service listener 147-1 provides the cooperation processing result to the business logic processing unit 200 or the infra channel providing unit 300 through the MQ managing unit 511. For example, when the business logic processing unit 200 requests the MMS message transmission, the MMS reporter 522-7 receives information about whether a real phone user receives the MMS message from the legacy system 30 or not, stores information in the legacy integrated DB server 530, and manages the stored information. By allowing such information to be transmitted to the business logic processing unit 200, the business logic processing unit 200 is enabled to charge a fee for transmitting a corresponding MMS message. That is, the MMS reporter 522-7 receives information about whether a MMS message is received or not from the MMSC through a SOAP type message, extracts required data from the SOAP type message by analyzing the SOAP type message, and determines whether the extracted data is valid or not, thereby finely analyzing the report information. Also, the MMS reporter 522-7 transfers the information whether the report information is received or not to the MMSC, and updates the report information to the database. Afterward, the MMS reporter 522-7 transforms the report result information to the MQ type message in order to transmit the report result information to the business logic processing unit 200 through the message relay unit 30. Furthermore, the MMS reporter 522-7 registers the received result received from the MMSC at the legacy integrated DB server 530. The MMS service listener 522-1 obtains the service result from the legacy integrated DB server 530, and transfers the obtained service result to the MQ transmitter 511b in the MQ managing unit 511, thereby allowing the MMSC cooperation result to be provided to the business logic processing unit 200.

Figure 41:
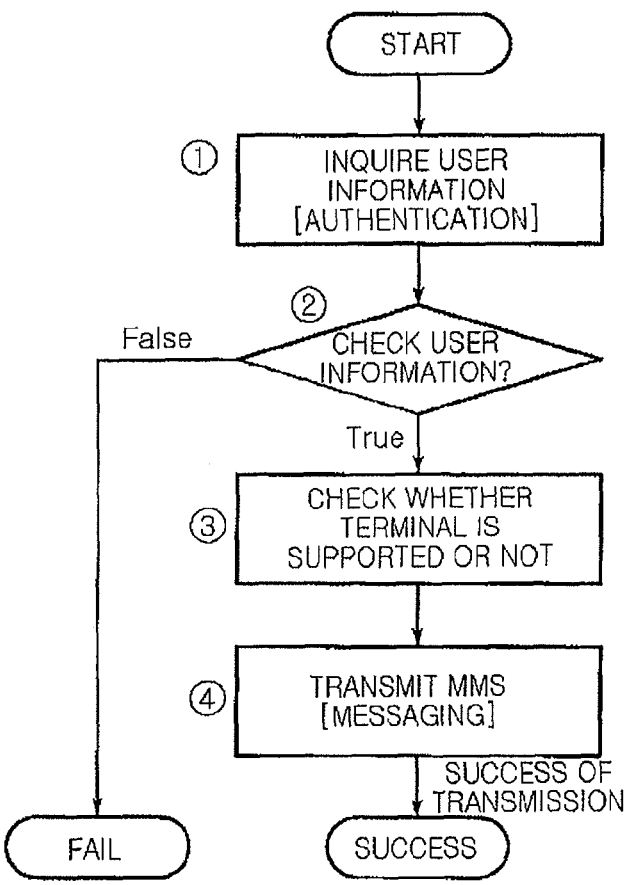
FIG. 41 is a diagram illustrating a biz template for a MMS messaging service according to an embodiment of the present invention.

As shown in FIG. 41, a biz template for the MMS messaging service includes a biz object ① for inquiring I-type user information, a biz object ② for checking P-type user information, a biz object ③ for checking whether a P-type terminal is supported or not, and a biz object ④ for transmitting an I-type MMS.

Therefore, when the business logic processing unit 200 receives a request of performing an MMS message transmission biz template, the business logic processing unit 200 inquires user information and authenticates the request by requesting authentication related legacy systems to be cooperated. The business logic processing unit 200 checks the user information included in the processing result thereof. If the user information is not proper, the business logic processing unit 200 returns authenticating failure as the processing result. If the user information is proper, the business logic processing unit 200 requests a legacy system for managing terminals to be cooperated to check the terminal information. Then, the business logic processing unit 200 transmits corresponding message by requesting the MMSC to cooperate.

Figure 42:
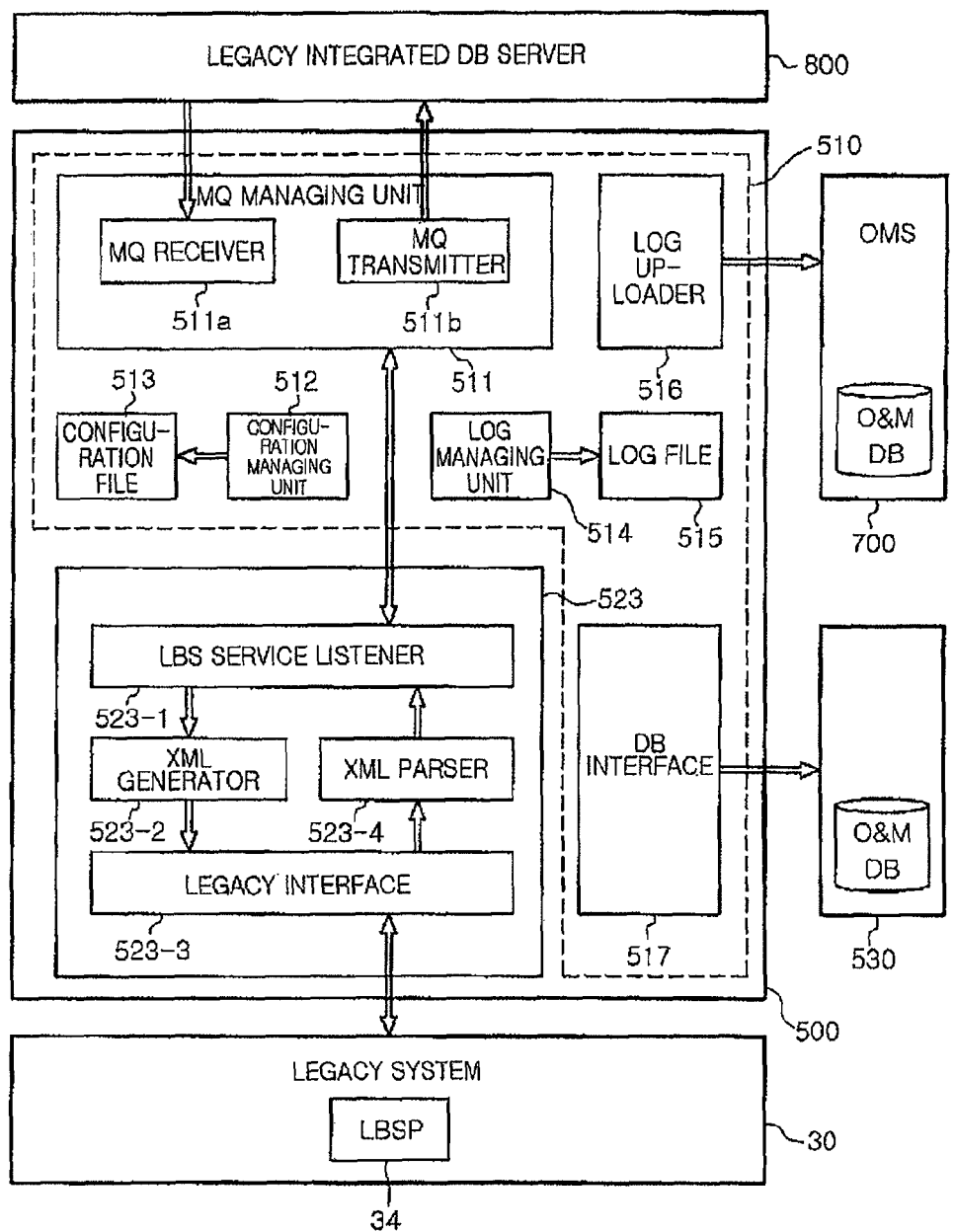
FIG. 42 is a block diagram illustrating an LBS interface of a legacy cooperation processing unit according to an embodiment of the present invention.

FIG. 42 is a block diagram illustrating an LBS interface of a legacy cooperation processing unit 500 according to an embodiment of the present invention. Referring to FIG. 42, the LBS interface 523 includes an LBS service listener 523-1, an extensible markup language (XML) generator 523-2, a legacy interface 523-3, and an XML parser 523-4.

When the business logic processing unit 200 requests an LBSP 34 to cooperate for performing a position information inquiry business template in order to perform a business logic related to a position based service, the LBS service listener 523-1 receives a legacy system cooperation request from the business logic processing unit 200 through the MQ receiver 511a of the MQ managing unit 511, and transmits the processing result of the cooperation request to the business logic processing unit 200 through the MQ transmitter 511b. The legacy system cooperation request transferred from the business logic processing unit 200 belongs to a cooperation request for an LBSP that processes the information of location-based services (LBS).

Figure 43:
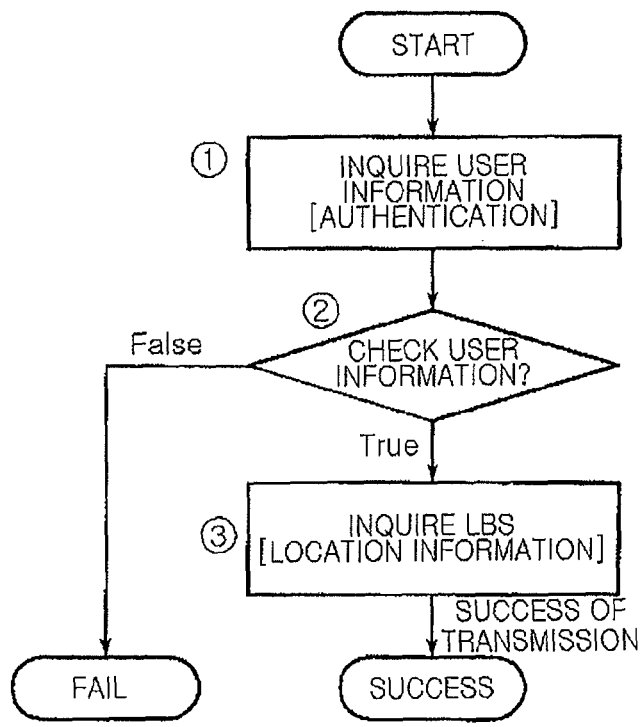
FIG. 43 is a diagram illustrating a biz template for inquiring position information, as an example of a location based service (LBS) related biz template.

FIG. 43 is a diagram illustrating a biz template for inquiring position information, as an example of a location based service (LBS) related biz template. Referring to FIG. 43, the biz template is for inquiring a position of a predetermined portable phone. The biz template includes a biz object ① for inquiring I-type user information, a biz object ② for checking P-type user information, and a biz object ③ for inquiring an I-type LBS position.

When an LBS biz template is performed, the business logic processing unit 200 inquires the user information by requesting a user related legacy system to cooperate. Then, the business logic processing unit 200 determines whether the service can be provided or not by checking the user information using the inquired information. If it is impossible to provide, the business logic processing unit 200 returns a failure message as the processing result. If it is possible, the business logic processing unit 200 requests the LBSP 34 to cooperate through the legacy cooperation processing unit 500, thereby inquiring the position information thereof.

Continuously, the XML generator 523-2 of FIG. 42 receives the legacy system cooperation request message from the business logic processing unit 200 through the MQ managing unit 511, and transforms the received message to an XML sentence to be suitable to the LBSP 34.

The legacy interface 523-3 requests position information inquiry by cooperating with the LBSP 34 that processing LBS information for tracking, and receives the result of the position inquiry.

The XML parser 523-4 analyzes the XML processing result from the legacy interface 523-3, and the interpreting result to the LBS service listener 523-1.

Then, the LBS service listener 523-1 transfers the result of inquiring the position thereof to the MQ transmitter 131-2 of the MQ manager 131 so as to transfer the position inquiry result to the business logic processing unit 200.

Figure 44:
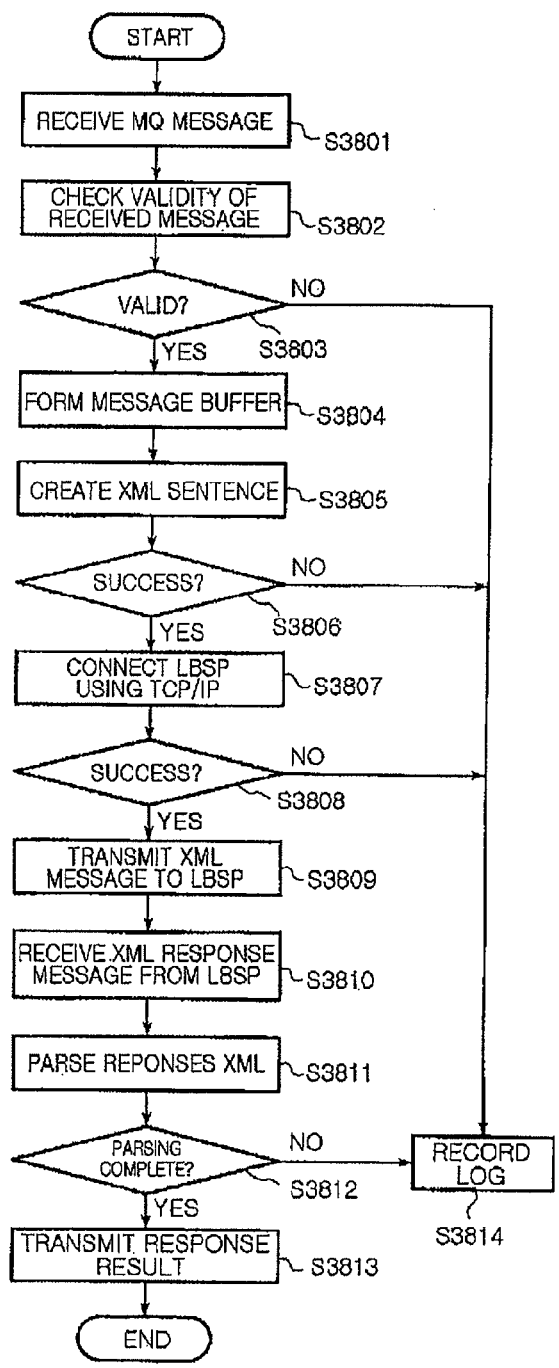
FIG. 44 is a flowchart illustrating a method of performing an LBS related service using a legacy cooperation processing unit having an LBS interface according to an embodiment of the present invention.

FIG. 44 is a flowchart illustrating a method of performing an LBS related service using a legacy cooperation processing unit 500 having an LBS interface 523 according to an embodiment of the present invention.

Referring to FIG. 44, the legacy cooperation processing unit 26 having the LBS interface 523 receives a request to cooperate with the LBSP 34 of the legacy system 30 from the business logic processing unit 200 for position inquiry and messages related to request of setting up environment through a message queue of the message transferring unit 800 in step S3801. Then, the legacy cooperation processing unit 26 inspects the validity of the received messages such as the received LBSP cooperation request and the environment setting up message in step S3802.

If the received messages are valid in the step S3803, the parameters of the LBS service requesting message are stored in assigned buffers according to corresponding request types in step S3804.

Then, using an XML generator 523-2, an XML file is created based on the content in the assigned buffer in step S3805.

Afterward, the generation of the XML file is determined in step S3806. If the XML file is normally created, the TCP/IP connection to the LBSP is established in step S3807.

The TCP/IP connected to the LBSP from the legacy system 800 is successfully established in step S3808, the created XML message to the LBSP in step S3809.

Afterward, the current session is sustained until a response for LBSP cooperating request, that is, a position inquiry result message having an XML format, from the LBSP. In step S3810, the XML type response message is received.

Then, the format of the received XML response message from the LBSP is checked. The checked XML message is parsed using the XML parser 523-4 in order to use the received XML response message in the business logic processing unit 200 in step S3811.

When the parsing ends in the step S3812, the parsed message is transformed to a message format to transmit it the business logic processing unit 200, and the transformed message is transmitted to the business logic processing unit 200 through message queues of the message transferring unit 800. That is, the position inquiry result is transmitted to the business logic processing unit 200 in step S1613, and a related result is recorded at the log file 515 in step S3814. In steps S3803, S3806, S3808, and S3812, log information according to the determination is recorded in the log file 515 in step S3814.

Figure 45:
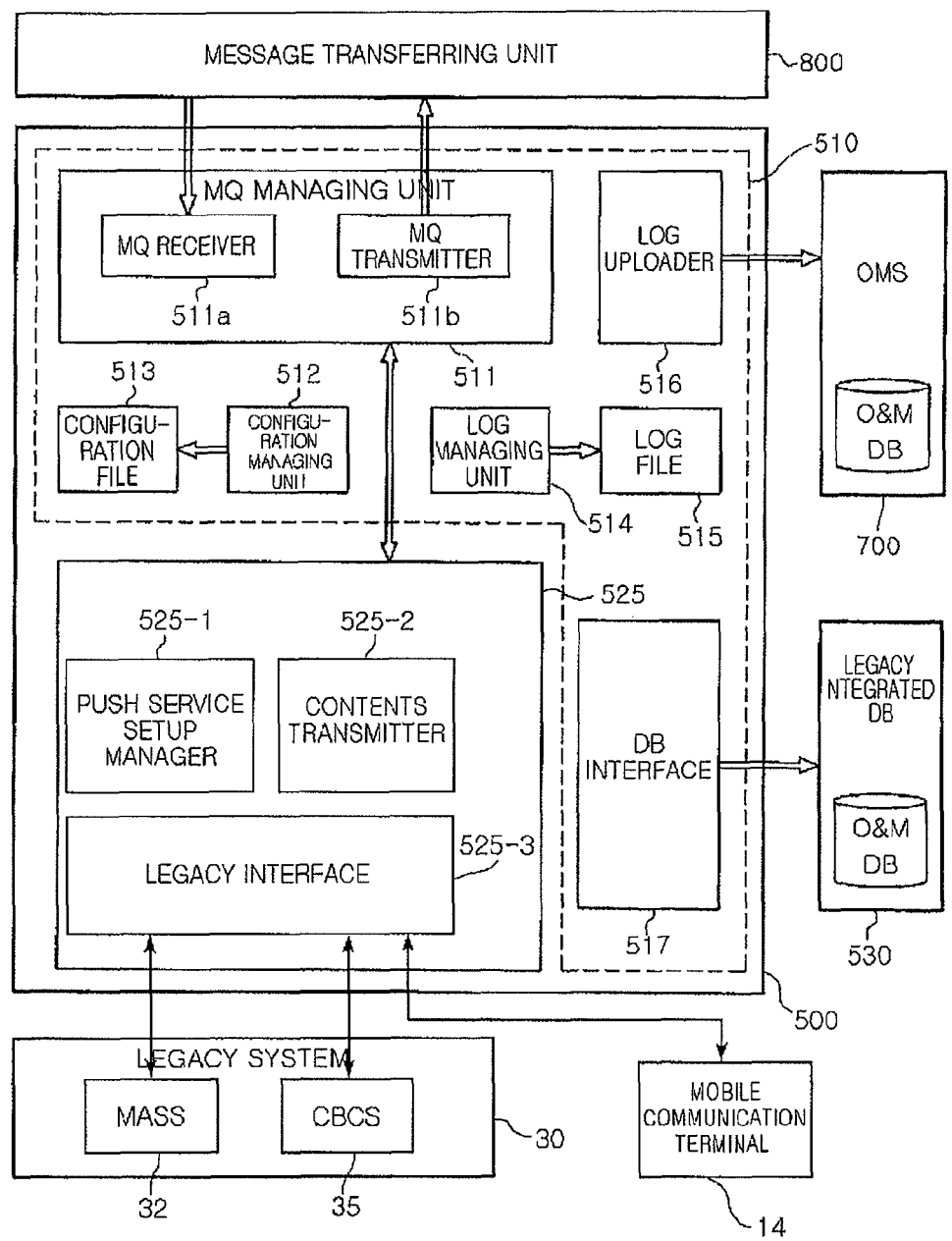
FIG. 45 is a block diagram illustrating a push interface according to an embodiment of the present invention.

FIG. 45 is a block diagram illustrating a push interface according to an embodiment of the present invention.

Referring to FIG. 45, the push interface 525 according to an embodiment of the present invention includes a push service setup manager 525-1, a content transmitter 525-2, and a legacy interface 525-3. The push service setup manager 525-1 manages connection information received from the CP/SP system 21 through the common managing unit 510 and service registration/release information form a mobile communication terminal 14. The content transmitter 525-2 manages content and messages received through the MQ managing unit 511 and controls a transmission scheme of the content and a transmission time. The legacy interface 525-3 transmits a message to a legacy system performing an SMS service, an MASS 32, a legacy system performing a cell broadcasting service, or the CBSC 35 through a push method, and receives the processing result thereof.

The push interface 525 cooperates with a legacy system. That is, the push interface 525 transmits a push type message to a plurality of mobile communication terminals by cooperating with a cell broadcasting service center (CBSC) that transmits a message to a mobile communication terminal within a predetermined cell or with a short message service center (SMSC) that transmits a short message.

In generally, a billing process for the push service is performed as a monthly flat rate. Therefore, billing data for the push service is created, and the billing processing unit 400 of the open mobile business supporting system processes the created billing data.

When a user access a wireless communication system using a mobile communication terminal 14 having a popup application program or a ticker program and requests registration or termination of popup services for stock information and weather information or ticker services, the push service setup manager 525-1 stores such information. Also, the content transmitter 525-2 receives data for a push service, that is, content or data, from the CP/SP system 11 through the open interface processing unit 100 and the business logic processing unit 200, and manages the received data for the push service.

At a transmission time requested from the CP/SP system 11, the content transmitter 525-2 transmits the stored content or data to the legacy system 30 with reference to the push service setup manager 525-1 so as to allow a user's mobile communication terminal 14 to receive the content. The message transmission can be performed through a legacy system performing a cell broadcasting service, the CBBC 35, a legacy system performing a SMS service, or the SMSC 32.

An application program interface (API) supported by the open mobile business system having the push interface 525 for performing the push service includes a push service connection and a user authentication API, an SMS based message transmission API, and a CBS based message transmission API.

The push service connection and user authentication API are provided by a function invoke_API that requests a push agent service device to perform the connection and user authentication process through parameters. If this API is requested, a connection process and a user authentication process are performed to use the push service of the CP/SP system 21 and the results thereof can be obtained.

The parameters of the push service connection and user authentication API includes a template ID for push service connection and user authentication, an authentication key assigned from the CP/SP system 21 requesting the push service connection and user authentication, input parameters used for push service connection and user authentication, and output parameters for transmitting the processing result.

The input parameter of the push service connection and user authentication API includes information denoting a request service type, and the output parameter is formed of result codes and result messages of the connection and user authentication.

As described above, when the CP/SP system 1 calls the push service connection and user authentication API, the open interface processing unit of the open mobile business supporting system receives the request and transfers the request to the business logic processing unit 200. The business logic processing unit 200 performs a biz template embodying logic for processing the push service connection and user authentication. At first, the authentication for CP/SP and the user authentication for a receiver of push information are performed. If the authentication is successful, the input parameter with the service connection and user authentication request is transmitted to the legacy cooperation processing unit 500. It is transferred to the push service setup manager 525-1 of the push interface 525 through the MQ manager 511 of the push agent service device, thereby registering it to the push service setup manager 525-1. The registration result is transferred to the corresponding CP/SP system 11 through the business logic processing unit 200 and the open interface processing unit 100.

The SMS based message transmission API is provided by a function invoke_API that requests an SMSC performing an SMS to transmit push information. If the API is requested, a process of transmitting a push message using SMS is performed. Then, the result of message transmission and message keys used to inquire transmitted message states are returned to the CP/SP system 11.

In more detail, the parameters of the SMS based message transmission API includes a template ID embodied for transmitting message through the SMA based pushing method, an authentication key assigned by the CP/SP system 11 requesting the message transmission using the SMS based push method, an input parameter including a request service type, application program information applying to the push message, push message receiver information, a message priory, push message content, and a transmission requesting time, a result code that is a returned value, a result message, and an output parameter formed of unique message keys generated in the push agent service device for a push message transmission request.

Hereinafter, the message transmission service using an SMS push method will be described in more detail. The CP/SP system 11 transmits an ID of a template that requests message transmission using the SMS push method, an authentication key, and an input parameter by calling the SMS based message transmission API. Then, the open interface processing unit 100 of the open mobile business supporting system receives the API call, and transfers the request of performing a template for transmitting a message using an SMS push method to the business logic processing unit 200. Then, the business logic processing unit 200 requests the SMS based push type message transmission to the push agent service device according to an embodiment of the present invention by transmitting the received input parameter to the push agent service device through the open interface-processing unit 100. Herein, the message-transferring unit 800 is used to transmit the request.

The push interface 525 receives the message push service request through the MQ managing unit 511, stores the received request at the content transmitter 525-2, and transmits the message and the receiver information to the SMSC through the legacy interface 525-3 at a transmission time requested by the CP/SP system 11, thereby requesting the message transmission. Then, the push interface 525 receives the response of the message transmission request from the SMSC, and composes a result message formed of a result code that denotes the success of the SMS based push service request, a result message transferred from the SMSC 32, and message keys generated in the push interface 505 for identification based on the response. The push interface 525 transmits the composed result message to the business logic-processing unit 200 through the message-transferring unit 800. Then, the business logic processing unit 200 returns the result thereof to the CP/SP system 11 through the open interface-processing unit 22. Therefore, the CP/SP system 11 can receive the result message that reports whether the request of SMS based push type message transmission successes or not and the result thereof from the open mobile business supporting system. Furthermore, the business logic processing unit 200 receives message keys to identify the requests, thereby managing the states thereof according to the SMS based push type message transmission requests.

The CBS based push type message service is an API for performing a push service that transmits push information through a cell broadcasting service (CBS) from a CP/SP system 11 to an assigned area. The CBS based push type message service is provided by a function invoke_API that requests the CMS based push type message service through parameters.

The parameter of the CBS based push type message transmission API includes an ID of a template that processes the CBS based push type message transmission, an authentication key of a CP/SP system 11 to use the interface, a requested service type such as a popup service providing information through a popup window or a ticker service providing information through additional window disposed on the bottom section of a displaying area, input parameter formed of application information of a mobile communication terminal to transmit a corresponding message, CBS channel information to transmit a message, information about a location where a message is transmitted to, a message priority, message content to push, and transmission request times, and an output parameter having a result code denoting whether message transmission successes or not as information for expressing the result of requesting the CBS push service, a result message, and a message key assigned according to the push service request.

When the CBS based push type message transmission API is called, the input parameter formed of necessary information for the CBS push service with the CBS based push type message transmission request are transferred to the legacy cooperation processing unit 500 through the open interface processing unit 100 and the business logic processing unit 200. The content transmitter 525-2 creates an unique message key for the request, stores a push message to transmit among the input parameter, transmits a message transmission command to the CBSC 35 to transmit a message at a message transmission request time included in the input parameter, and receives the result thereof. The generated message key, result code, and result message are returned to the business logic processing unit 200. Then, the business logic processing unit 200 returns the received message key, result code and result message to the CP/SP system 11 through the open interface processing unit 100.

Hereinafter, a download service of an open mobile business supporting system according to an embodiment of the present invention will be described.

Since the download service is a frequently used service, it is may be desirable to define one business logic by grouping an authentication process, a content transform and transfer process, a URL transfer process, and a billing process as one business logic, which are performing in a mobile communication system, and to embody a biz template for the defined businesses logic. In the download service, a download service providing procedure and infra resources of a mobile communication service can change according to whether a download service requester is matched with a download service subject, and whether a wireless communication system of the download service subject is identical to the wireless communication service of the download requester. Therefore, it may be desirable to embody a biz template according to a download service. For example, the download service according to the download service requester and the download service subject includes a service of "download to my phone" which downloads selected content to a user's mobile communication terminal that requests the download service, and a service of "present it to other" which download selected content to other user rather than a user requesting the download service. The service of "present it to other" can be divided into a service of "present content to the same mobile communication service provider" and a service of "present content to the other mobile communication service provider" according to whether the subject who receiving the download service and the download service requester use the same mobile communication service provider or not.

Since the download subject is different according to the download service type, a business logic totally differs for performing corresponding services because billing conditions, a time of performing a billing process, and a download scheme.

Figure 46:
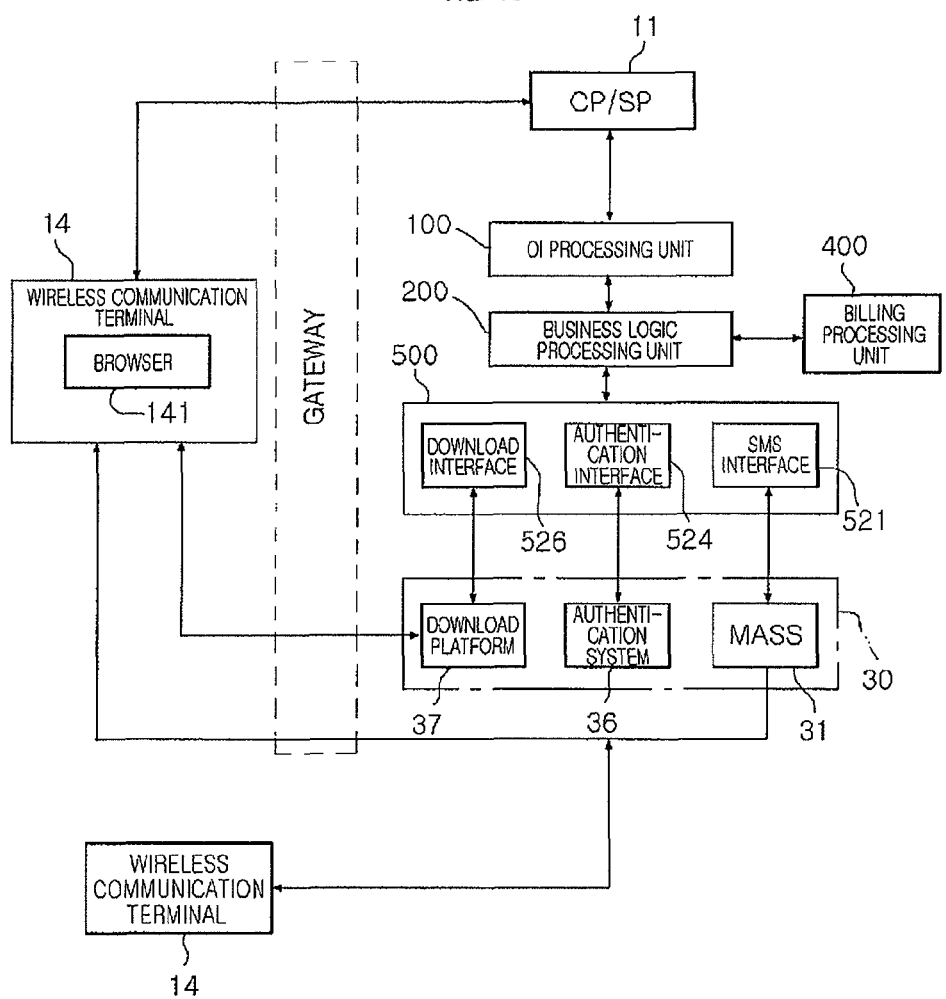
FIG. 46 is a block diagram illustrating a structure for providing a download service in an open mobile business supporting system according to an embodiment of the present invention.

FIG. 46 is a block diagram illustrating a structure for providing a download service in an open mobile business supporting system according to an embodiment of the present invention.

In order to provide a download service, a download platform 37 of performing a download service of a wireless communication system, an authentication system 36 for performing a user authentication process, and an MASS 31 for performing an SMS service. The legacy cooperation processing unit 500 includes an SMS interface 521 and an authentication interface 524, and a download interface 526 for cooperating with other legacy systems.

In FIG. 46, a gateway connects the wireless communication terminal 14, the CP/SP system 11, and the legacy system 30.

In the open mobile business supporting system, the OI processing unit 100 provides an API call specification defined according to the download service type to the CP/SP system 11. When the download service is called, the OI processing unit 100 defines a unique session key. The defined session key is used as an identification to provide consistency to operations of the asynchronous business logic processing unit 200 and the legacy cooperation processing unit 500. The OI processing unit 100 provides a call message for a biz template corresponding to the called download service to the business logic processing unit 200, receives the result thereof from the business logic processing unit 200, and provides the received result to the CP/SP system 11 through a standard API.

When the business logic processing unit 200 receives the call message of a biz template for download service from the OI processing unit 100, the business logic processing unit 200 performs the biz template. While performing the biz template, the business logic processing unit 200 requests the legacy cooperation processing unit 500 to perform a predetermined service if the predetermined resource of a legacy system 30, such as the operations of a download platform, an authentication system, and an MASS, are required, and receives the result thereof. Then, the business logic processing unit 200 collects the result of performing the biz template and the result transferred from the legacy cooperation processing unit 500, and returns the final result of the biz template for download service to the OI processing unit 100.

That is, if a download function is required, the download interface 526 of the legacy cooperation processing unit 50 is driven and requests the download of corresponding content while uploading related content to the download platform 37 of the legacy system 30. If the download interface 526 requests the download of corresponding content, the authentication interface 524 of the legacy cooperation processing unit 500 requests the authentication system 36 of the legacy system 30 to authenticate a download requester or a download subject. In case of requiring message transmission for download call-back address, the SMS interface 521 of the legacy cooperation processing unit 500 requests the MASS 31 to transmit a text message having a call-back address.

Figure 47:
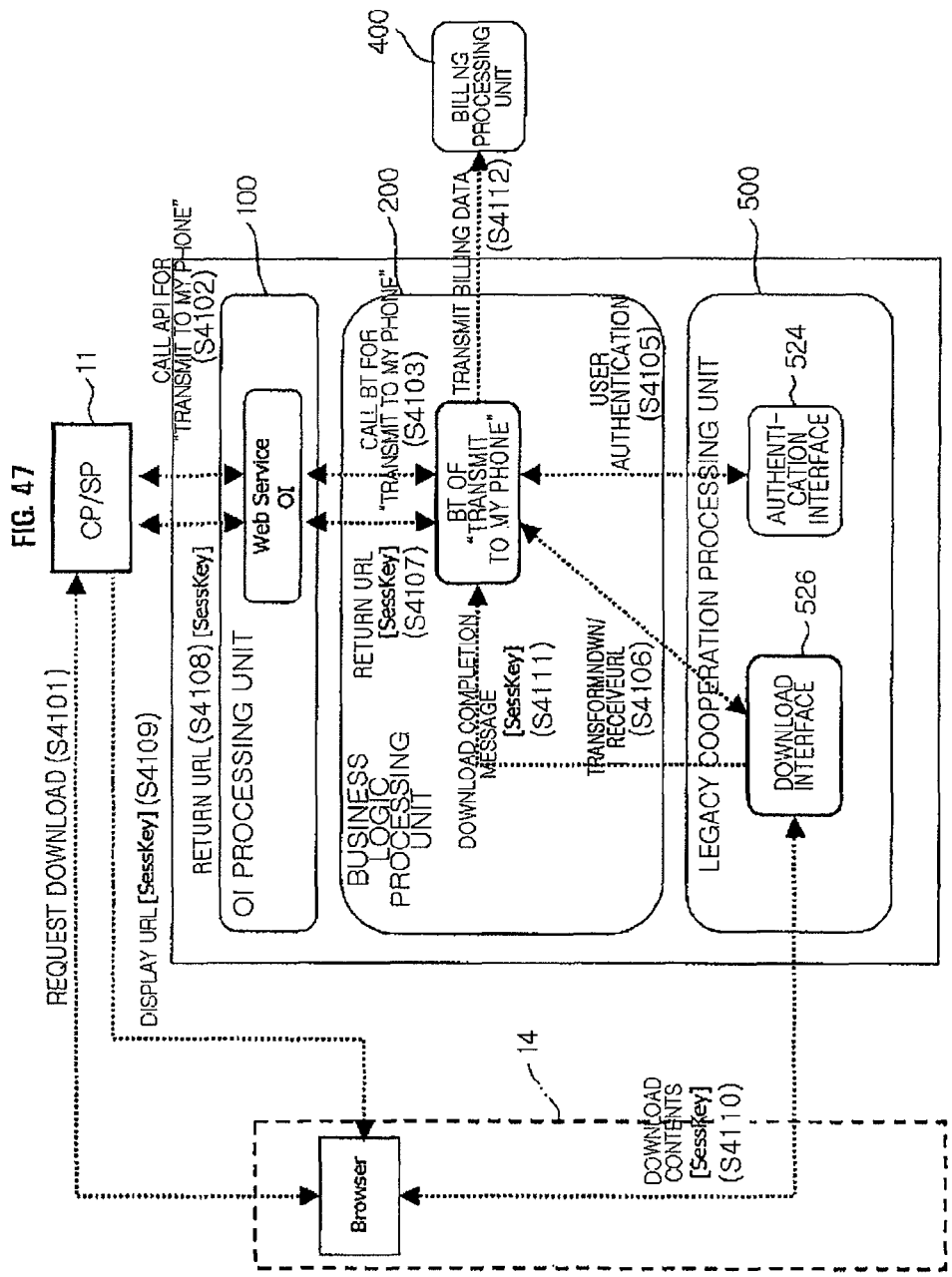
FIG. 47 is a flowchart illustrating a download service according to a first embodiment of the present invention.

A download service flow of the open mobile business supporting system according to an embodiment of the present invention will be described with reference to FIG. 47 to FIG. 49.

A case of downloading predetermined content to a download requesters mobile communication terminal will be described with reference to FIG. 47. When a predetermined mobile communication service user selects a service of downloading predetermined content from services provided form the CP/SP system 11, a download request message is transmitted to the CP/SP system 11 through a browser of a corresponding mobile communication terminal 14 in step S4101. Then, the CP/SP system 11 analyzes the download request message, calls an API related to a service of "download to my phone" because the download requester wants to download predetermined content to own mobile communication terminal, and transmits the selected content to the OI processing unit 100 in step S4102.

The OI processing unit 100 analyzes the received message, and calls a biz template related to the service of "download to my phone" in step S4103. The business logic processing unit 200 requests the authentication system 36 to authenticate a user through the authentication interface 524 and receives the authentication result according to the flow of the biz template S4105. Then, the business logic processing unit 200 requests the download platform 37 to transmit the predetermined content through the download interface 526, and the download platform 37 transforms the format of content and transmits a URL value of the transformed content in step S4106.

The business logic processing unit 200 returns the received URL value to the CP/SP system 11 through the OI processing unit 100 in steps S4107 and S4108. Herein, the returned URL includes a session key (Sesskey) to identify a corresponding API call.

The CP/SP system 11 transfers the URL having the session key to the browser of the download requester's mobile communication terminal 14 in step S4109.

As described above, the download requestor confirms the download page URL through the browser of the own mobile communication terminal 14 and selects a request to transmit the download page. Then, the request is transferred to the download platform 37 of the mobile communication system by the displayed URL. The download platform 37 transmits the corresponding content to the mobile communication terminal 14 at S4110.

The download completion of the download platform 37 is reported to the business logic processing unit 200 through the download interface 526 in step S4111. Then, the business logic processing unit 200 transfers the billing information for a corresponding download service to the billing processing unit 400 when the download completion is reported, in step S4112.

In the steps of S4110 and S4111, a download service and a billing subject are identified by the session key included in the URL.

Figure 48:
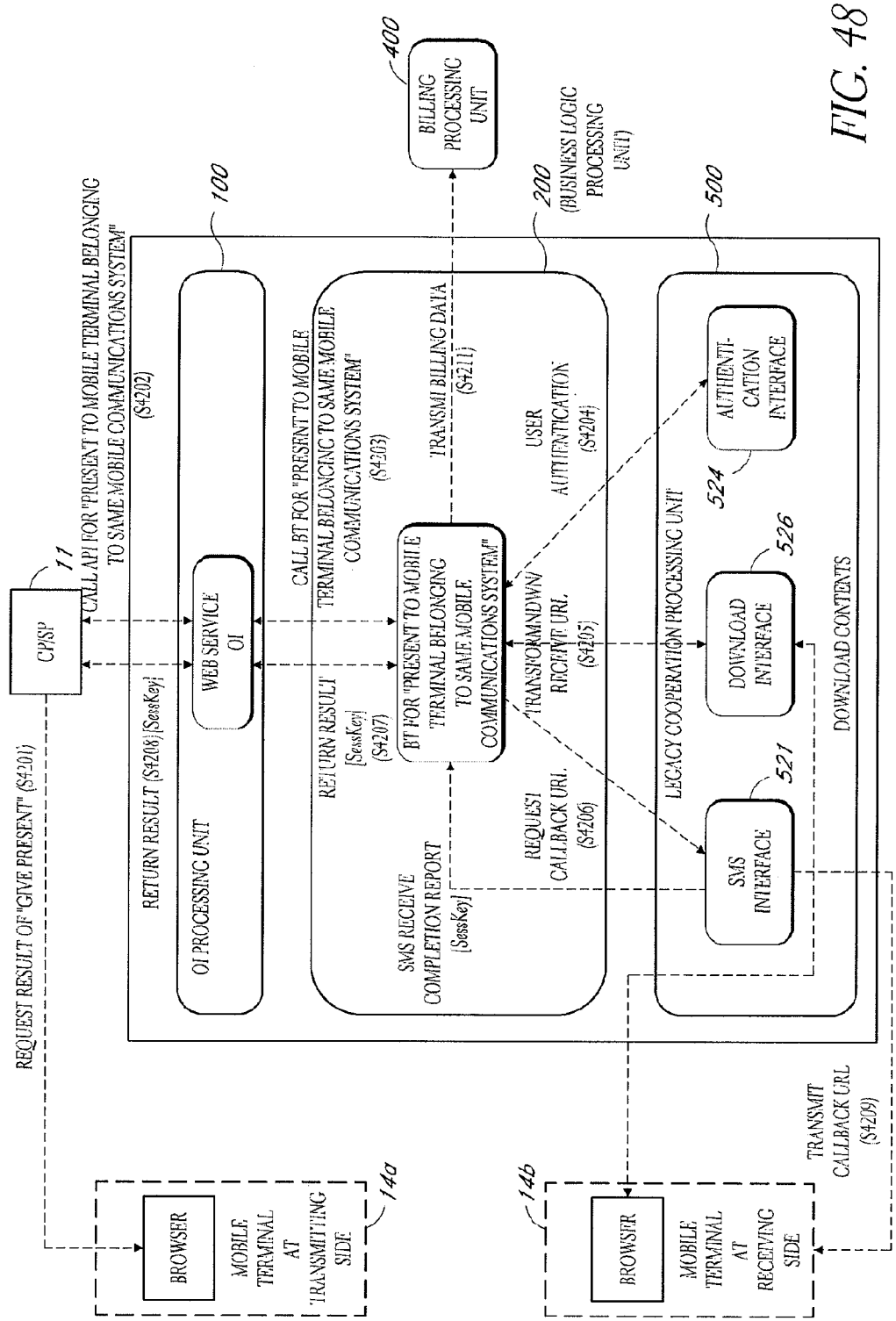
FIG. 48 is a flowchart illustrating a download service according to a second embodiment of the present invention.

Referring to FIG. 48, in case of transferring a request message of a service of "present content to the other mobile terminal belonging to the same mobile communication system" from the mobile communication terminal 14a to the CP/SP system 111 in step S4201, the CP/SP system 11 calls an API related to the service of "present content to the other mobile terminal belonging to the same mobile communication system" thereby transmitting the selected content in step S4202. Then, the OI processing unit 100 analyzes the API call, and calls a biz template (BT) related to the service of "present content to the other mobile terminal belonging to the same mobile communication system" from the business logic processing unit 200 in step S4203.

According to the called biz template related to the service of "present content to the other mobile terminal belonging to the same mobile communication system" the business logic processing unit 200 requests the authentication system 36 through the authentication interface 524 to authenticate a download requestor and a download subject, and receives the result thereof in step S4204. Then, the business logic processing unit 200 performs format transformation and URL creation by uploading the selected content to the download platform 37 through the download interface 526, and receives the URL as the response message in step S4205. Then, a message notifying that content are arrived from a download requester as a present and a call back URL are transmitted to the mobile communication terminal 14 of the download subject through the SMS interface 521 in steps S4206 and S4209.

Then, the completion of the service of "present content to the other mobile terminal belonging to the same mobile communication system" is notified to the CP/SP system 11 through the OI processing unit 100.

Furthermore, the business logic processing unit 200 confirms the report message from the SMS interface 521, and transfers the call back URL message from the MASS 31 to the mobile communication terminal 14. If the SMS receipt completion report is transferred in step S4210, it determines that the billing condition is satisfied, thereby transmitting the related billing data to the billing processing unit 400 in step S4211.

Figure 49:
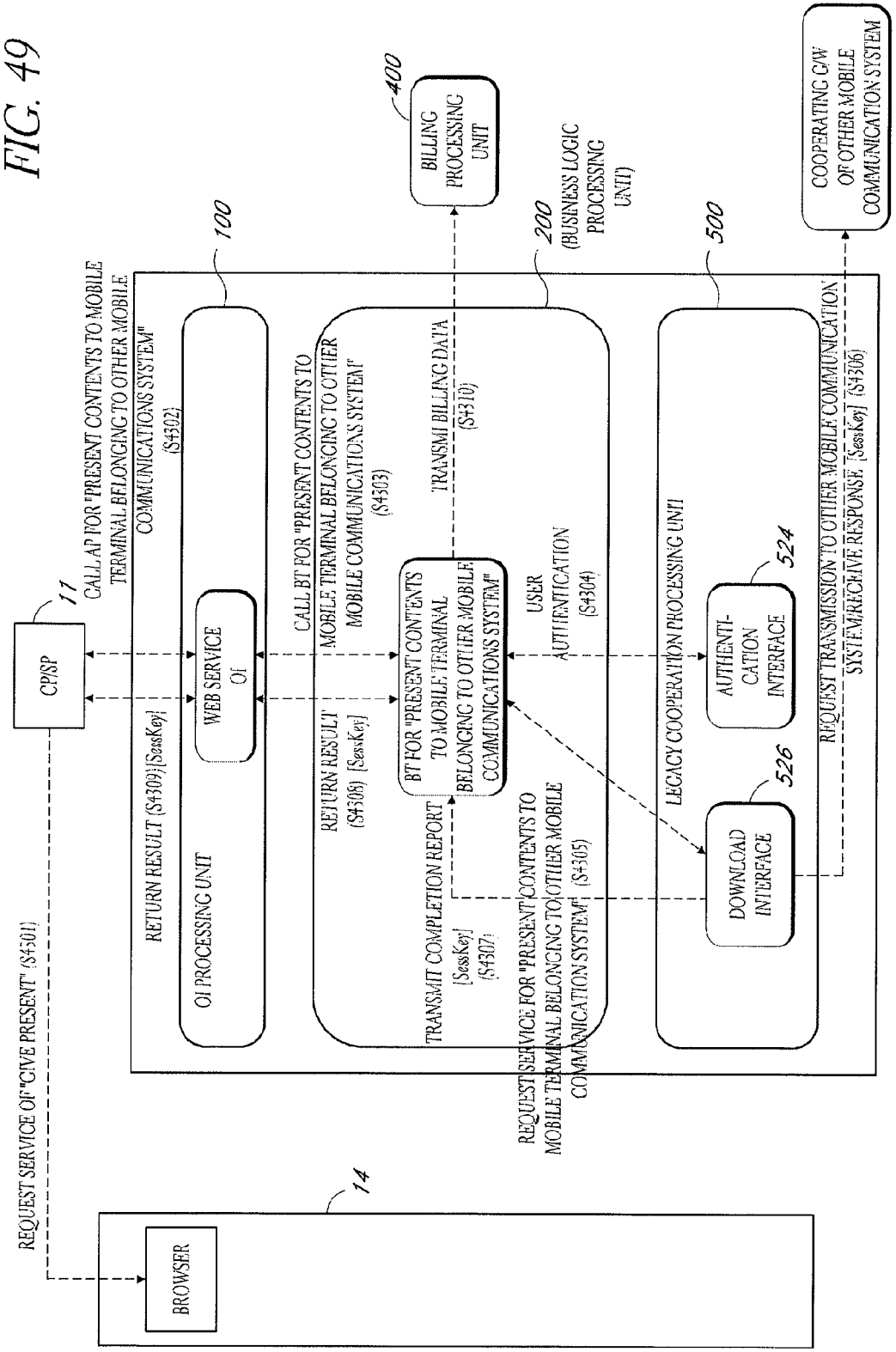
FIG. 49 is a flowchart illustrating a download service according to a third embodiment of the present invention.

Referring to FIG. 49, in case of transferring a request message of a service of "present content to the other mobile terminal belonging to the other mobile communication system" from the mobile communication terminal 14 to the CP/SP system 11 in step S4301, the CP/SP system 11 calls an API related to the service of "present content to the other mobile terminal belonging to the other mobile communication system" from the OI processing unit 100, and transmits the selected content in step S4302. The OI processing unit 100 analyzes the API call, and calls a biz template relate to the service of "present content to the other mobile terminal belonging to the other mobile communication system" to the business logic processing unit 200 in step S4303.

According to the called biz template, the business logic processing unit 200 requests the authentication system 36 through the authentication interface 524 to authenticate a download requester, and receives the result thereof in step S4304, and uploads the selected content to the download platform 37 through the download interface 526, thereby requesting the service of "present content to the other mobile terminal belonging to the other mobile communication system" in step S4305.

Then, the download platform 37 transmits the uploaded content to the other mobile communication system through the cooperation gateway of the other mobile communication system without transforming a format, transfers the download request message, and receives the response thereof from the other company's wireless communication system in step S4306.

After receiving the response from the other company's wireless communication system, the download interface 526 transmits a transmission completion report to the business logic processing unit 200 in step S4307. The business logic processing unit 200 returns a result message of transmission completion to the CP/SP system 11 through the OI processing unit 100 in steps S4308 and S4309.

After determining that the service of "present content to the other mobile terminal belonging to the other mobile communication system" is completed, billing data of corresponding download requestor is transmitted to the billing processing unit 400 in step S4310.

As described above, the open mobile business supporting system according to an embodiment of the present invention supports the download service of the CP/SP system.

Figure 50:
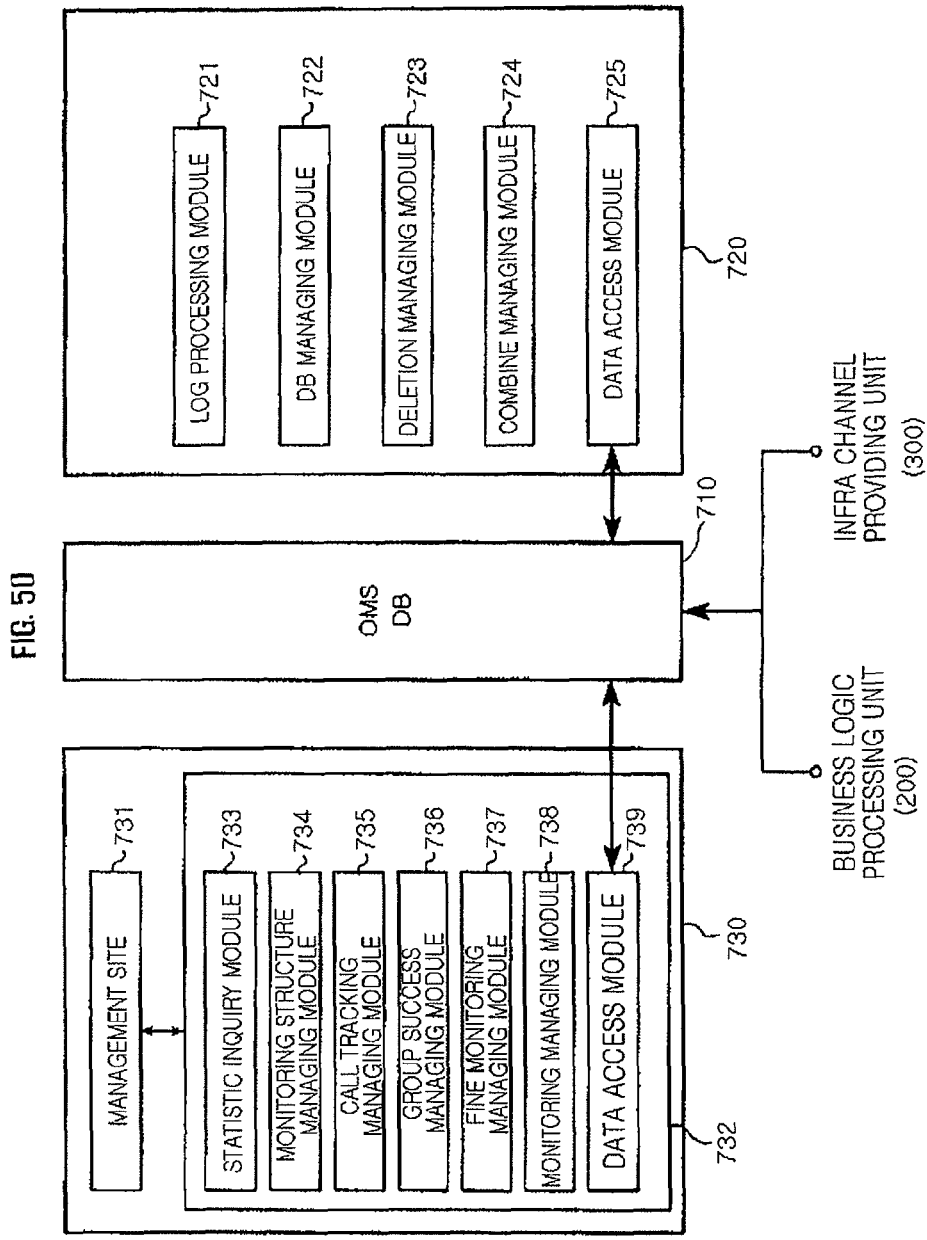
FIG. 50 is a block diagram illustrating an operating and management system (OMS) in an open mobile business supporting system according to an embodiment of the present invention.

FIG. 50 is a block diagram illustrating an operating and management system (OMS) 700 in an open mobile business supporting system according to an embodiment of the present invention.

Referring to FIG. 50, the OMS 700 includes a database 710 for storing traffic related data collected by the open mobile business supporting system, and statistical data generated based on the collected traffic related data, a DB manager 720 for managing the database 710 by creating statistical data and service call tracking data based on the stored traffic related data stored in the database 710, storing the created data in the database 710 or deleting the data from the database 710, and a presentation unit 730 for providing an operator interface, receiving requests such as a request of monitoring performance from an operator through the operator interface, reading data corresponding to the received request from the database 710, and providing the read data to the operator.

In more detail, the database 710 is a device to store information about the performance and the states of low-level systems in the open mobile business supporting system. The database 710 manages various tables including a biz template state information table for recording state information of biz templates, an API parameter information table for recording information about parameters of API defined according to each template in an open interface provided to a CP or an SP, a first session state information table for managing state information per each session performed in an infra channel providing unit, a second session state information table for managing state information per each session of the legacy cooperation processing unit and the billing processing unit, a threshold setup table for recording thresholds for determining performance or malfunction of each low-level system in the open mobile business supporting system, a first response time threshold setup table for setting up response time thresholds per each biz template performed in the open mobile business supporting system, a second response time threshold setup table for setting up response time thresholds per each biz template performed in the open mobile business supporting system, a data collecting time threshold setup table for setting up a threshold for a time for collecting traffic related data per each low-level system, a last data transmission time table for recording the last time of transmitting traffic related data to the OMS of each low-level system, a used amount statistical table for recording used amount per each low-level system.

The DB manager 720 includes a log processing module 721 for transforming call tracking data to a predetermined file format, storing the transformed data in the database 710, and deleting the system log, a DB managing module 721 for deleting a transaction log for managing the database 710, a deletion managing module 723 for deleting data with a valid data expired, for example, three months, among statistic data stored in the database 710, a combine managing module 724 for creating statistic data with reference to traffic related data recorded in the database 710 at a predetermined cycle, for example, a day, and a data access module 725 for performing an access function of the database 710 for the modules 721 to 724.

The presentation unit 730 includes a management site providing unit 731 for providing a web service based managing graphic user interface to a manager to monitor the open mobile business supporting system and malfunctioning details thereof, to setup thresholds, to track a call and a traffic, and to calculate statistics of used amount, and to manage logs, and a monitoring logic processing unit 732 for reading data corresponding to selected items from a manager through the management site providing unit 731 and proving the read data to the management site providing unit 731

The monitoring logic processing unit 732 includes a statistic inquiry module 733 for extracting used amount statistic data based on entire structure of the open mobile business supporting system, a monitoring structure managing module 734 for setting a threshold for monitoring, a call tracking managing module 735 for providing a call tracking function for a predetermined service call requested through the management site providing unit 731, a group success managing module 736 for providing succession times-traffic graph from the current time to a predetermined past time for example, three hours, six hours, twelve hours, and twenty four hours, a fine monitoring managing module 737 for showing malfunctioning details of each low-level system in the open mobile business supporting system, a monitoring managing module 738 for showing the number of tries, the number of success, a succession rate, and an average response time per each low-level system of the open mobile business supporting system and showing states of each system with reference a predetermined threshold, and a data access module 739 for allowing the modules to fetch necessary data from the database 710 by providing an access function.

In the OMS 700 according to an embodiment of the present invention, the OI processing unit 100, the billing processing unit 400, and the legacy cooperation processing unit 500 are cooperated using FTP, and the business logic processing unit 200 and the infra channel providing unit 300 are cooperated and commonly use data through the ODBC open database connectivity.

Each of low-level systems in the open mobile business supporting system, such as the OI processing unit 100, the business logic processing unit 200, the infra channel providing unit 300, the legacy cooperation processing unit 500, and the web service providing unit 600, transmits the generated system logs to the OMS 700 through the above described cooperation structure.

In order to monitor performance malfunctioning, the OMS 700 reads the session information of the OI processing unit 100 and the business logic processing unit 200, the session information of the billing processing unit 400, and the session information of the legacy cooperation processing unit 500 from the MMDB 900 at a predetermined period, for example, every five minutes, and stores the read session information into the database 710.

The OMS 700 regularly receives the state information of biz template and biz object from the OI processing unit 100 and the business logic processing unit 200, and stores the received state information into the database 710.

The OMS 700 regularly receives the session state information from the infra channel providing unit 300, the state information of biz object/template, and parameter information, and stores the received session state information, state information and the parameter information into the database 710.

The OMS according to an embodiment of the present invention stores only traffic related data in the database 710, and reads basic information related to configuration, performance, and malfunctioning of the open mobile business supporting system from the database of the open mobile business supporting system, the registry DB 1000 in FIG. 15.

The system log generated from the low-level device in the open mobile business supporting system is transmitted to a predetermined area of the database 710 through FTP at a predetermined period, thereby allowing the system log to be inquired by sits provided from the presentation unit 730 according to need.

The OMS 700 provides a monitoring function for a service call process. That is, the OMS 700 compares performance and malfunctioning data, which is monitoring data collected according to the hardware configuration of the open mobile business supporting system and stored in the database 710, with a threshold value for detecting load increment or operation malfunctioning. When the OMS 700 successfully access the database 710 by an authenticated manager, the OMS 700 inquires the configuration information of the open mobile business supporting system. Then, the OMS 700 inquires monitoring data corresponding to a setup period for example, five minutes. After inquiry, the OMS 700 compares the threshold value with the inquired monitoring data, and displays the comparison results through a predetermined display unit.

The OMS 700 provides a function of inquiring a malfunction state of the open mobile business supporting system. The malfunction state inquiring function provides malfunctioning details of the low-level systems of the open mobile business supporting system to a manager. When a manager selects the malfunction state inquiring function, the OMS 700 determines whether the manager has a right of using the function or not. If the manager has the right, the OMS 700 loads data that composes a malfunction detail inquiring page by accessing a DB that stores web site information, accesses the database 710 through the data access module 739, reads the configuration information of the open mobile business supporting system and recent monitoring data, for example, monitoring data collected within five minutes, composes a related web page by combining the read data with the malfunction detail inquiring page, and outputs the composed web page through a predetermined display unit.

The OMS 700 provides a function of managing thresholds. That is, the OMS 700 provides a threshold managing menu through the managing site providing unit 731. When a manager selects the provided menu, the OMS 700 determines whether the manager has a right to use the provided menu or not. If the manager has the right, the OMS 700 access the database 710 through the data access module 739, reads the threshold values such as threshold values of biz objects, and threshold values of biz templates, and displays the read threshold values through a predetermined display unit. The manager is allowed to change the threshold values outputted through the display. The change threshold values are transferred to the monitoring configuration managing module 734 through the managing sit providing unit 731. The monitoring configuration managing module 734 transfers the changed threshold value to the database 710, and the database 710 stores the changed threshold value.

The OMS 700 provides a function of tracking a predetermined service call. The OMS 700 provides the service call tracking function through the managing site providing unit 731. If the menu of the service call tracking function is selected by a manager, the OMS 700 authenticates the manager whether the manager has the right of using the selected function or not. If the manager has the right, the OMS 700 connected to the database 710 through the data access module 739 and provides a call tracking search graphic user interface to the manager through a site. When the manger selects a search condition, the OMS 700 read call tracking data from the database 710 according to the search condition and displays the read call tracking data through a predetermined display unit.

The OMS 700 provides a function of providing a traffic graph. When a manager selects a traffic inquiring menu among performance and malfunction managing menus, the OMS 700 authenticates the manager to have the right of using. If the manager has the right, the OMS 700 access the database 710 through the data access module 739, reads traffic data satisfying the conditions set by the manager, modifies the read traffic data as a graph, and outputs the graph through a predetermine display unit.

The OMS 700 provides a function of inquiring used amount statistic data. When a manager inquires the used amount through the managing side providing unit 731, the OMS 700 authenticates the manager to have the right of using. If the manager has the right, the OMS 700 access the database 710 through the data access module 739, reads statistic data satisfying search conditions set by the manager, and displays the read statistic data.

The OMS 700 performs a call tracking function through the log processing module 721. The log processing module 721 regularly connects to the database 710 through data access module 725 at a predetermined period, for example, one day. The log processing module 721 read the system log of each service call stored for a predetermined period, for example, for one day, creates a call tracking data file, and stores the created call tracking data file. The created system log is deleted.

As described above, the OMS 700 of the open mobile business supporting system according to an embodiment of the present invention stably manages traffic related data for the open mobile business supporting system including the OI processing unit 100, the business logic processing unit 200, the infra channel providing unit 300, and the legacy cooperation processing unit 500, processes the traffic related data, and effectively displays the information about the performance and the malfunction state of the open mobile business supporting system based on the processed traffic related data, thereby improving efficiency of supporting open mobile business.

Figure 51:
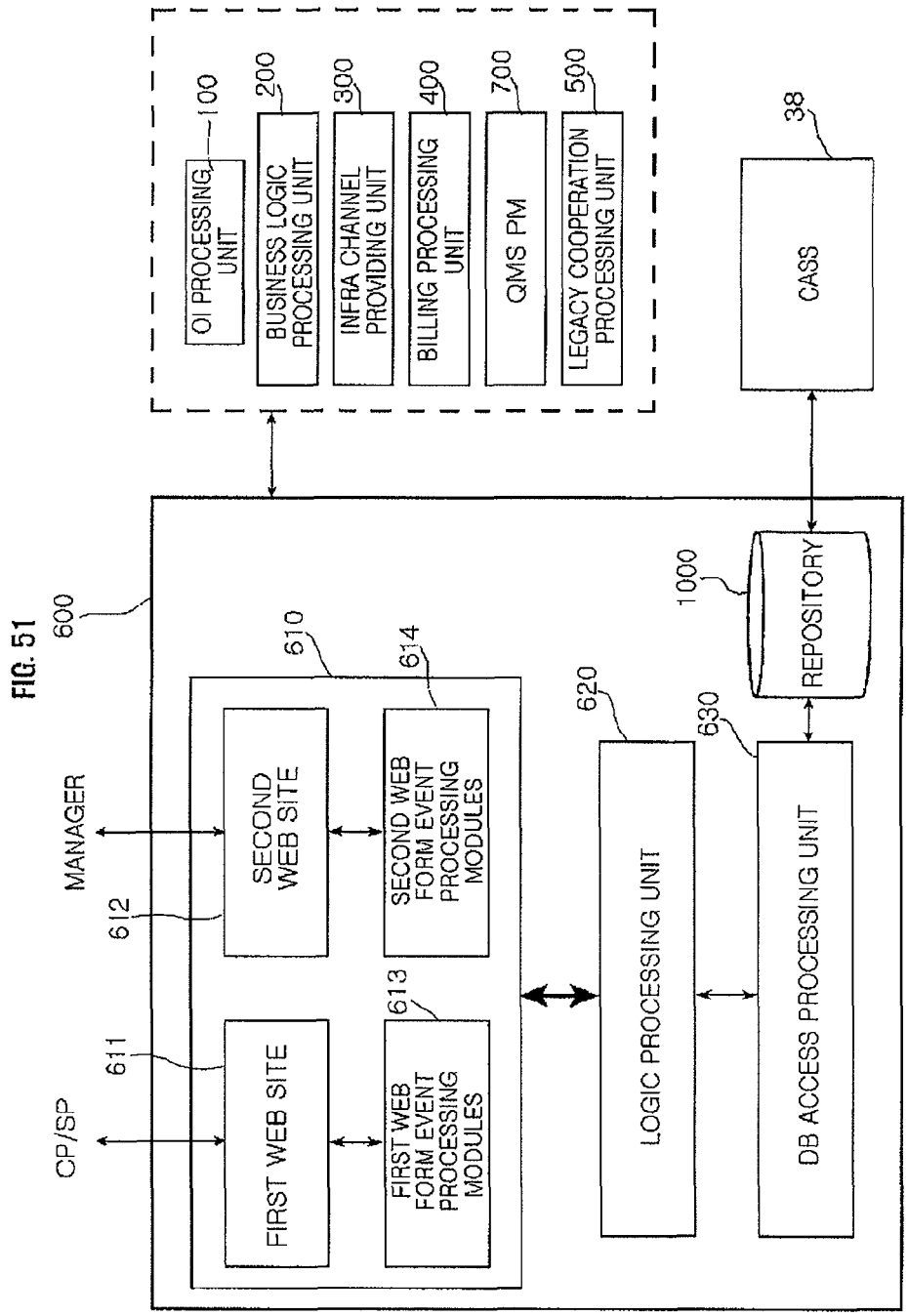
FIG. 51 is a block diagram illustrating a web service providing unit in an open mobile business supporting system according to an embodiment of the present invention.

FIG. 51 is a block diagram illustrating a web service providing unit in an open mobile business supporting system according to an embodiment of the present invention.

Referring to FIG. 51, in the open mobile business supporting system according to an embodiment of the present invention, the web service providing unit 600 includes a web service unit 610 for providing a web based user interface to a user of the open mobile business supporting system, a logic processing unit 620 for performing a registration operation and an inquiry operation according to the user's request through the web service unit 610, and a DB access processing unit 630 for accessing a repository DB 1000, reading or writing data from/to the repository DB 1000 by the request of the logic processing unit 620.

The web service unit 610 includes a first web site 611 for providing a web based user interface to a CP or a SP using a biz template in the open mobile business supporting system, a second web site 612 for providing a web based user interface for developing and managing the open mobile business supporting system, and first and second web form event processing modules 613 and 614 for processing and responding events generated from pages of the first and second web sides 611 and 612, checking validity of user inputs, and processing events when a page is loaded.

The first and second web sits 611 and 612 share the logic processing unit 620 and the DB access processing unit 630.

The repository DB 1000 functions as a common storage space for sharing data commonly managed in the open mobile business supporting system. The repository DB 1000 stores a user right table, a real time cooperation result table of a content aggregation & syndication system (CASS) 38, a biz template information table, a new biz template analysis/design result table, an announcement table, a resource table, a service examine request/examine/request state/information table, a user authentication table, a biz object information table, a biz object change information table, a biz object using list table, a biz template and biz object relation table, a distribution information of a biz template table, a user information table, a service information table, a biz template modification/request/approval change information table, a biz template use IP information table, a CP information table, an error code table, a service information/IP address/authentication key table, a server information table of open mobile business supporting system, a web server information table, an access managing history information table of a CP and/or an SP, and common information for supporting development and use of the open mobile business supporting system.

The web service providing unit 600 cooperates and commonly uses data with the CASS 38 managing content in a mobile communication system through the repository DB 1000, and supports reliable data cooperation with internal devices of the open mobile business supporting system.

Furthermore, the repository DB 1000 stores data managed by the web service providing unit 600, and synchronizes information of a CP, a service, a web server, and a user through cooperating with the CASS 38.

The web service providing unit 600 cooperates with the open interface processing unit 100, the business logic processing unit 200, the infra channel providing unit 300, the billing processing unit 400 and the OMS 700 in the open mobile business supporting system for providing a function of setting environmental setups and a function of monitoring statistic data or malfunction states. The web server providing unit 600 cooperates with the business logic processing unit 400 through the MQ server for distributing the biz template and/or the biz object. The web server providing unit 600 cooperates with the CASS 38 that manages common information about a CP, a service, and a user through HTTP in real time. The web server providing unit 600 cooperates with the OI processing unit 100 and the OMS 700 through communication in order to allow a manager to inquire content of environmental setup per a server. Furthermore, the web server providing unit 600 communicated with the infra channel providing unit 300 through TCP.

Moreover, the web service providing unit 600 separates a user view, a logic process, and a data access process in order to effectively expand, maintain, and repair according to need.

The web service providing unit 600 manages the repository DR 1000 storing the common data of each low-level apparatus of the open mobile business supporting system. The repository DB 1000 commonly uses common data through the CASS 38 of the wireless communication system, and shares the data. The CP/SP information, service information and user information, which are managed through the CASS 38, are commonly used for inquiring purpose. Such an information is not additionally managed in the web service providing unit 600.

The first web site 611 is provided to a CP or an SP that accesses the first web site 611 to use the open mobile business supporting system. The first web site 611 supports the use of the open mobile business supporting system. Therefore, the first we site 611 provides a function for providing log-in to confirm a registered user, a function for inquiring a standard API information for a biz template provided from the open mobile business supporting system, a function for managing requests of using a biz template that allows a CP/SP or a user to request a biz template or to cancel/modify the previous requests, a function for providing technical materials and managing inquires and responses, a function for providing announcement or inquires and response for a user, a function for inquiring a service result list, a function for requesting an authentication key, and a function for inquiring the current condition of using API by receiving the authentication key.

The second web site 612 is provided for managing and developing the open mobile business supporting system. The second web site 612 includes a function for processing log-in for allowing a registered manage to access, a function for inquiring the details of requests to use a biz template, a function for registering a service checking result for approval/cancel/deletion, a function for processing a service check request for issuing an authentication key to use a biz template or change authentication information state, a function for inquiring announcement, a function for designing a new biz template, registering a analysis result of the new biz template, and inquiring, a function for managing a standard API for a CP and/or an SP and managing general documents, a function for managing bulletin board/announcement of the first web site 611, a function for inquiring a repository DB and cooperation detail, a function for managing server information of the open mobile business supporting system, a function for managing biz template information, a function for managing biz object information, a function for managing common code and error codes, a function for managing an operator/manager right/access, a function for approving the use of a biz template, a function for issuing an authentication key, a function for inquiring information of a service using a biz template, and a function for inquiring and managing information of a system using an API of the infra channel providing unit 300 and managing a current condition thereof.

The logic processing unit 620 performs an inquiry operation and a registration process for major data provided through the first and second web sites 611 and 612.

Figure 52:
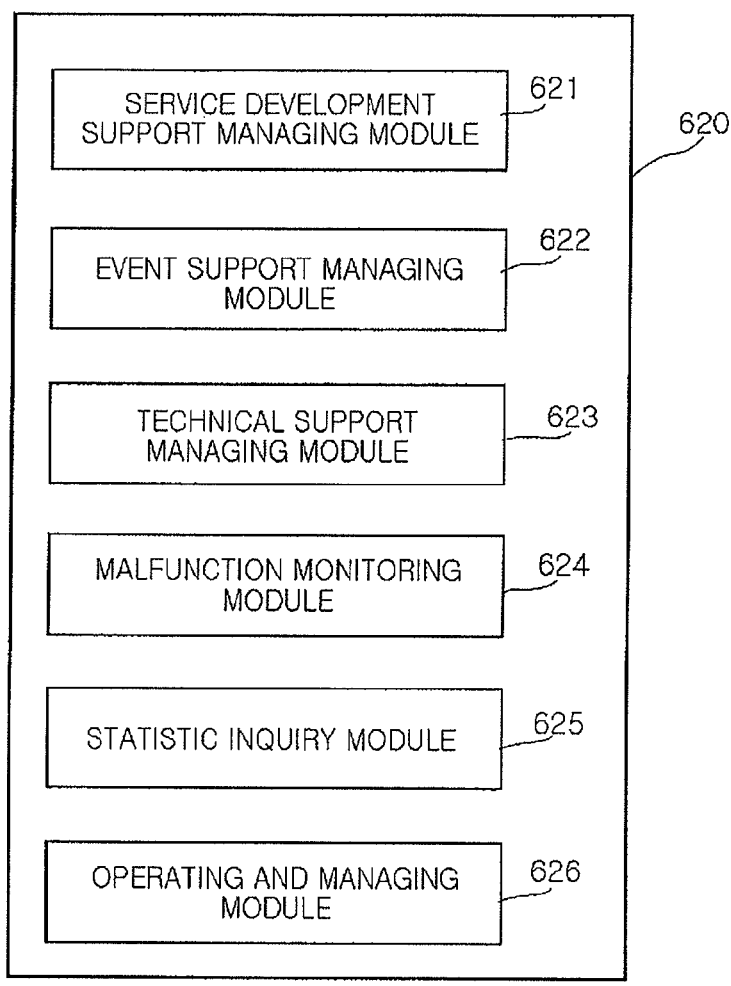
FIG. 52 is a block diagram illustrating a logic processing unit according to an embodiment of the present invention.

FIG. 52 is a block diagram illustrating a logic processing unit 620 according to an embodiment of the present invention. Referring to FIG. 52, the logic processing unit 620 according to an embodiment of the present invention includes a service development support managing module 621, an event support managing module 622, a technical support managing module 623, a malfunction monitoring module 624, a statistic inquiry module 625, and an operating and managing module 626. The service development support managing module 621 provides a function for managing resources for the open mobile service supporting system, a function for managing data of a biz template and biz object, and a function for requesting and approving a predetermined process related thereto. The event support managing module 622 provides a function for requesting and approving events, and a function for registering, modifying, and inquiring information. The technical support managing module 623 provides a guide for developing the open mobile business supporting system and a function for registering, modifying, deleting, and inquiring technical materials and bulletin board. The malfunction monitoring module 624 performs a function for monitoring the open mobile business supporting system in real time, a function for managing thresholds for monitoring, a function for inquiring traffic, a function for monitoring session information in real time, a function for tracking a call through a phone number, and a function for inquiring malfunction information. The statistic inquiry module 625 performs a function for inquiring billing statistic according to an event, a CP, a service, a biz template, an error, and a term, and a function for used amount statistic according to an event, a CP, a service, a biz template, a biz object, an infra, and a term. The operating and managing module 626 manages an integrated supporting apparatus. The operating managing module 626 registers, modifies, deletes, and inquires the announcement in a bulletin board, manages the right of a site user, manages registration per a server of the open mobile business supporting system, inquires environmental setup, manages common codes and error codes, inquires a result of cooperating with a legacy system managing content and cooperation information thereof, and managing access of a site operator.

In more detail, the service development support managing module 621 includes: a biz object manager for registering, modifying, and inquiring a biz object; a biz template manager for registering, modifying, and inquiring a biz template; a biz object information manager for creating information about a biz object, and distributing the biz object information; a biz template information manager for creating information about a biz template, and distributing the biz template information; a BT manager for requesting service check, requesting an API, inquiring a request list, a manager, and a user, and issuing an authentication key; a ST information manager for inquiring information and current condition for authentication key through the BT manager; and a manager for inquiring, registering, deleting, and modifying the API of the infra channel providing unit 300. The event support managing module 622 includes an even list manager for managing a function of inquiring event current condition. The operation managing module 626 includes: a code information manager for registering, deleting, and inquiring common codes; a community manager for managing registration, modification, deletion, and inquiry of bulletin board, announcement, and FAQ; an error code manager for managing registration, modification, deletion, and inquiry of error code; and a file information manager for managing a function of inquiring a file related to a biz object and a biz template, and a download function.

The logic processing unit 620 includes a log-in manager for processing log-in to the first and second web sites 611 and 612, and an access IP manager for registering, editing, deleting, and inquiring an IP of the second web site 612.

In FIG. 51, the DB access processing unit 630 manages the access of the repository DB 1000, and defines a common data access class that defines a method for inserting, deleting and updating data.

The web service providing unit 600 provides a real time interface and a non-real time interface. The web service providing unit 600 cooperates and shares data with the repository DB 1000, the CASS 38, the open interface processing unit 100, and the business logic processing unit 200 through HTTP in real time. If data is modified in the CASS 38, the CASS 38 transmits the modified data to the repository DB 1000 using HTTP. Herein, the sharing data is CP information, service basic information, service IP information, and web server information.

For example, if a CP or an SP is authenticated and the information of a biz template is modified through a second web site 612 provided from the web service providing unit 600, the related information and the modified data are transferred to the open interface processing unit 100 using a function Selvlet through an HTTP web service, and the open interface processing unit 100 provides the results to other devices through the web service providing unit 600.

The repository DB 1000 shares data with a cooperating system requiring a one-off data using an FTP scheme or a database view scheme in non-real time. The sharing data includes billing information or web server information. If the data is provided to the cooperating system through the database view scheme, following advantages are provided. That is, additional cooperation modules are not required. Security and stability are guaranteed because the data are selected and provided through controlling security information and fields by a manager. It is possible to provide related information by properly processing complicated related tables or the formats thereof. Furthermore, it is possible to update new table through simple modification of a view.

Figure 53:
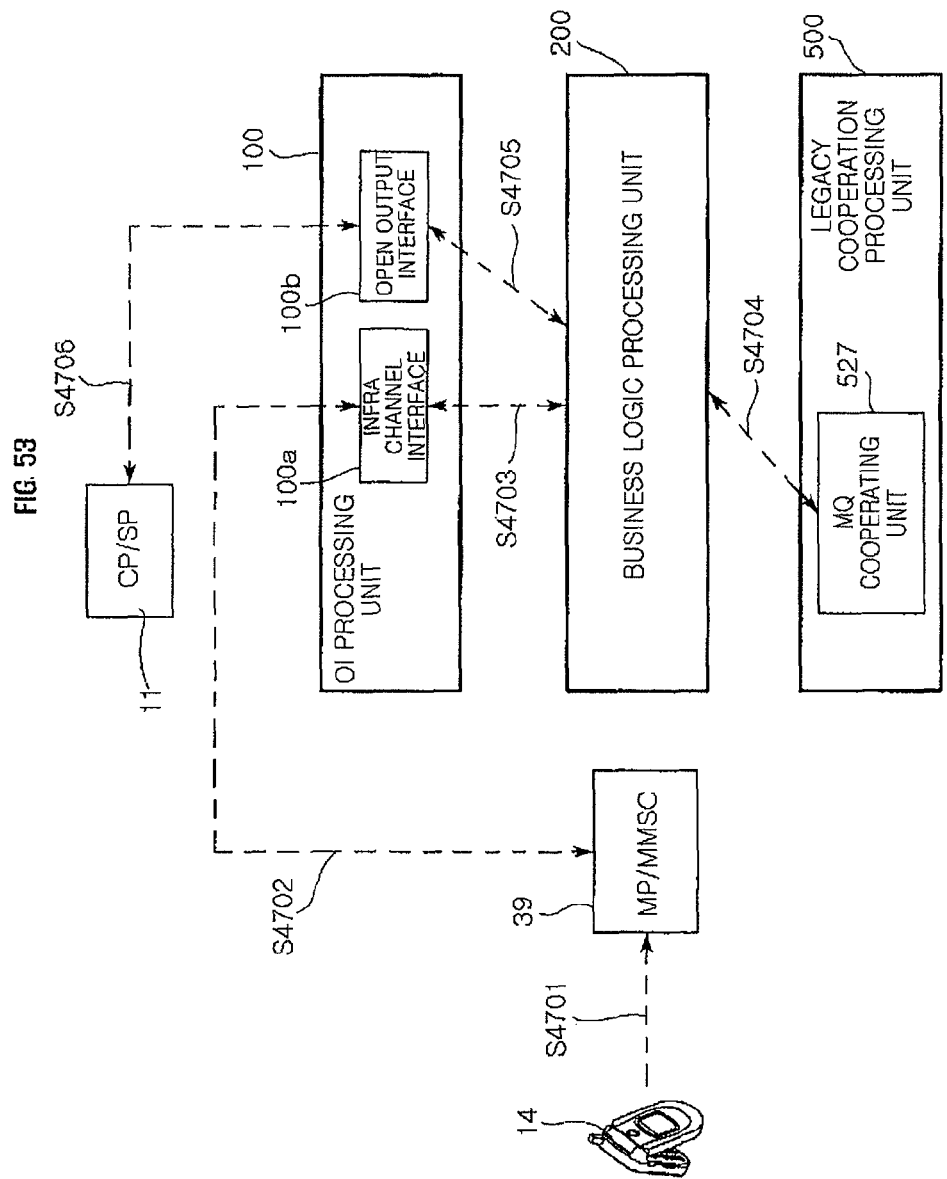
FIG. 53 is a flowchart illustrating a method of processing a mobile oriented (MO) message using an open mobile business supporting system according to an embodiment of the present invention.

FIG. 53 is a flowchart illustrating a method for processing a mobile oriented (MO) message using an open mobile business supporting system according to an embodiment of the present invention.

A short message service (SMS) or a multimedia message service (MMS) between a CP/SP system 11 and a mobile communication terminal 14 includes a mobile oriented (MO) message service and a mobile terminated (MT) message service.

The MO message service is a service to transfer a message to a corresponding CP/SP system 11 when a short message or a multimedia message is transmitted to a predetermined assigned number, for example, ##6650, from a users mobile communication terminal 14 after a terminal number of a receiving side CP/SP system 11 is assigned to the predetermined number, for example, ##6650.

Referring to FIG. 53, the user MO message service is performed by the OI processing unit 100, the business logic processing unit 200, and the legacy cooperation processing unit 500 in the open mobile business supporting system according to an embodiment of the present invention. In order to provide the user MO message service, the OI processing unit 100 includes an infra channel interface 100*a* and an open output interface 100*b*. Also, the legacy cooperation processing unit 500 includes a MO cooperating unit 527.

The infra channel interface 100*a* is disposed in the OI processing unit 100, and receives an MO SMS message or MO MMS message from the user terminal 14 through an MP/MMSC 39. The MP denotes an SMS dispatching System, and the MMSC denotes a device transmitting an MMS message. The infra channel interface 100*a* receives the MO message from the user terminal 14, and calls a business logic related to the MO message form the business logic processing unit 200.

Figure 54:
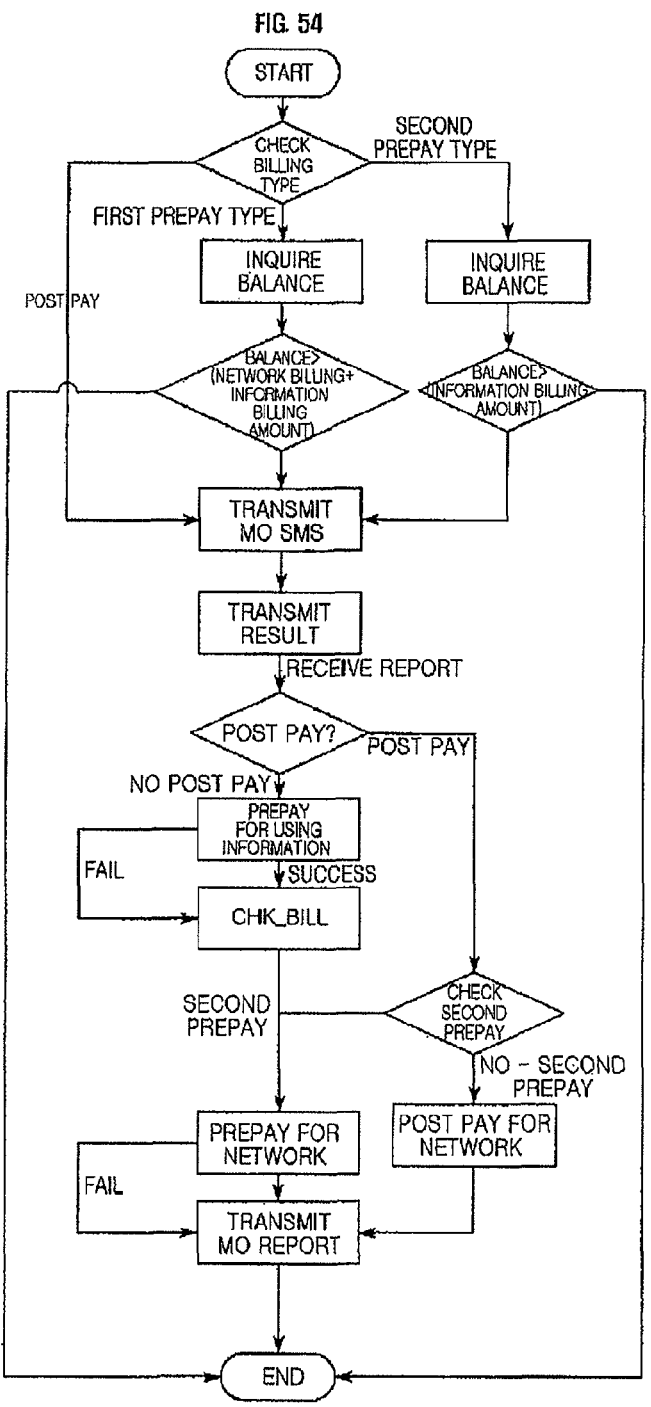
FIG. 54 to FIG. 55 are diagrams illustrating an MT message processing unit using an open mobile business supporting system according to a first embodiment of the present invention.
Figure 55:
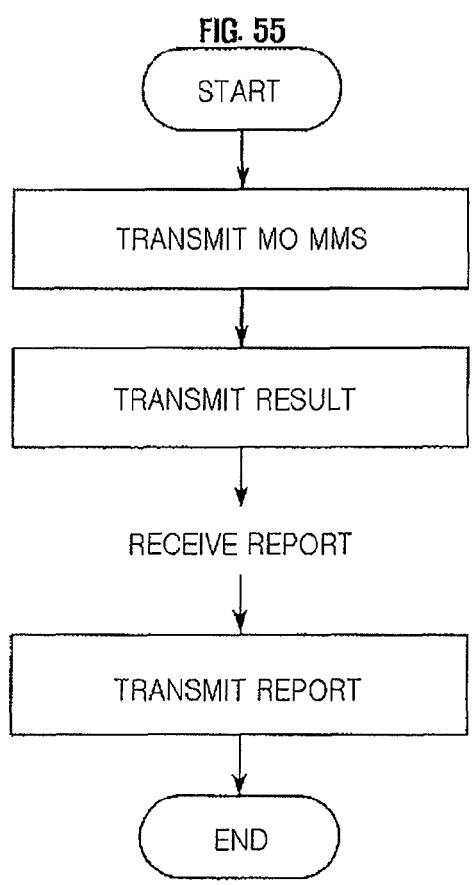

The business logic processing unit 200 performs a biz template assigned for the MO message through cooperating with the MO cooperating unit 527 of the legacy cooperation processing unit 500. As described above, the biz template is formed of properties of biz objects, an order of performing the biz objects, the expression of a conditional branch, input parameter information for performing the biz objects, a method of processing data, information about output parameters exposed after performing a biz template, and time-output setup information. FIG. 54 and FIG. 55 show examples of a business template previously set for processing an MO message. Referring to FIG. 54 and FIG. 55, a biz template for processing an MO message can group unit functions among service logics of the CP/SP system II for processing the user MO message. Such a biz template embodied to perform a biz logic that is a low-level function performed by a wireless communication system. The biz template includes at least one or a plurality of biz objects. FIG. 54 shows a biz template processed in the business logic processing unit 200 for processing an MO SMS message, and FIG. 55 shows a biz template processed in the business logic processing unit 200 for processing an MO MMS message. The biz template can be formed in various types and forms according to a service type provided from the CP/SP system 11.

The business logic processing unit 100 performs a biz template that is previously defined according to an MO message as shown in FIG. 54 and FIG. 55, and provides the result of performing the biz template to the CP/SP system 11 that is the destination of a corresponding MO message through the open output interface 100*b*.

The MO cooperating unit 527 is disposed in the legacy cooperation processing unit 500. The MO cooperating unit 527 provides the information of a destination of the MO message and option information to the business logic processing unit 200 in response to the business logic processing unit 200. Herein, the option information includes information about a billing type and a call type. Herein, the billing type information is information about whether a user applies for a prepayment plan or a post payment plan. The post payment plan can include various types of post payment plans or pre/post integrated payment plans according to the policy of a mobile communication service provider. The call type information is information related to whether a message transmitted from the user terminal 14 is an MO message, or an MT message, or whether an MT message is processed continuously after processing an MO message. The destination information includes an IP address and port information for the CP/SP system 11. Therefore, the business logic processing unit 200 composes a business template in various forms using the destination information and the option information received from the MO cooperating unit 527.

The open output interface 100*b* is disposed in the open interface processing unit 100. The open output interface 100*b* receives the result of performing business logic by the business logic processing unit 200, and transmits the received result to the CP/SP system 11. The open output interface 100*b* uses an integrated specification for SMS and MMS when transmitting an MO message to the CP/SP system 11.

Referring to FIG. 53, a procedure of processing an MO message in the open mobile business supporting system according to an embodiment of the present invention will be described.

In step S4701, a user transmits an SMS or MMS message using his own terminal 14 to a pre-assigned terminal number of a receiving side CP/SP system 14, for example, #6650. The MP/MMSC 39 transfers the SMS or MMS message, which is transmitted to the pre-assigned terminal number, to the infra channel interface 100*a* in the OI processing unit 110 of the open mobile business supporting system in step S4702.

Then, the infra channel interface 100*a* calls a predetermined biz logic corresponding to the SMS or MMS message to the business logic processing unit 200, and requests the business logic processing unit 200 to perform the biz template for the business logic in step S4703.

In order to perform the biz template, the business logic processing unit 200 requests the destination information and the option information of the MO message from the MO cooperating unit 527. The MO cooperating unit 527 provides the destination information and the option information for the MO message to the business logic processing unit 200 in step S4704. Therefore, the business logic processing unit 200 can compose business templates in various forms using the destination information and the option information from the MO cooperating unit 527.

The business logic processing unit 200 performs a biz template defined from predetermined business logic for the MO SMS or MMS message, and transmits the result of performing the biz template to the open output interface 100*b* of the OI processing unit 100 in step S4705.

Then, the open output interface 100*b* transfers the received result of performing the biz template from the business logic processing unit 200 to the CP/SP system 11, thereby ending the procedure of processing the MO message using the open mobile business supporting system according to an embodiment of the present invention in step S4706.

Figure 56:
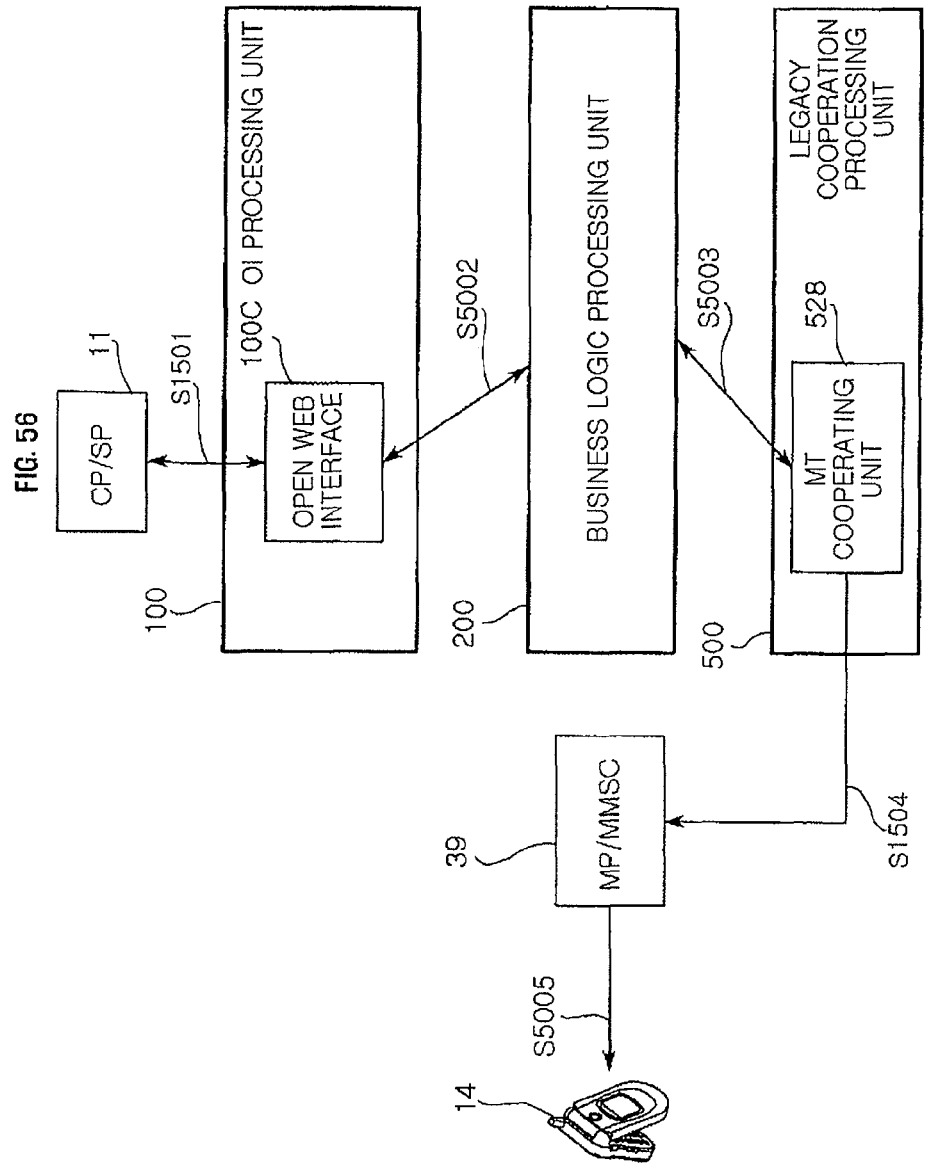
FIG. 56 is a block diagram and a flowchart illustrating an MT message processing apparatus using an open mobile business supporting system according to an embodiment of the present invention.

FIG. 56 is a block diagram and a flowchart illustrating an MT message processing apparatus using the open mobile business supporting system according to an embodiment of the present invention.

The MT message service is a service to provide an SMS or MMS message such as a text, a picture, and a multimedia file from a CP/SP system 11 to a user's mobile communication terminal 14. In order to process the MT message, the legacy cooperation processing unit 500 further includes an MT cooperating unit 528.

Referring to FIG. 56, the OI processing unit 100 receives a user MT message provided from the CP/SP system 11, and calls a biz template related to the MT message for the business logic processing unit 200. The OI processing unit 100 creates a unique session key according to a request of performing each biz template constituting an MT message service provided from the CP/SP system 11 and manages the created session key. Therefore, the created session key can be used to identify business logics processed in the open mobile business model supporting system. The OI processing unit 100 provides a web service based standard API type business logic call mechanism in order to allow access without being limited by a client type.

Figure 57:
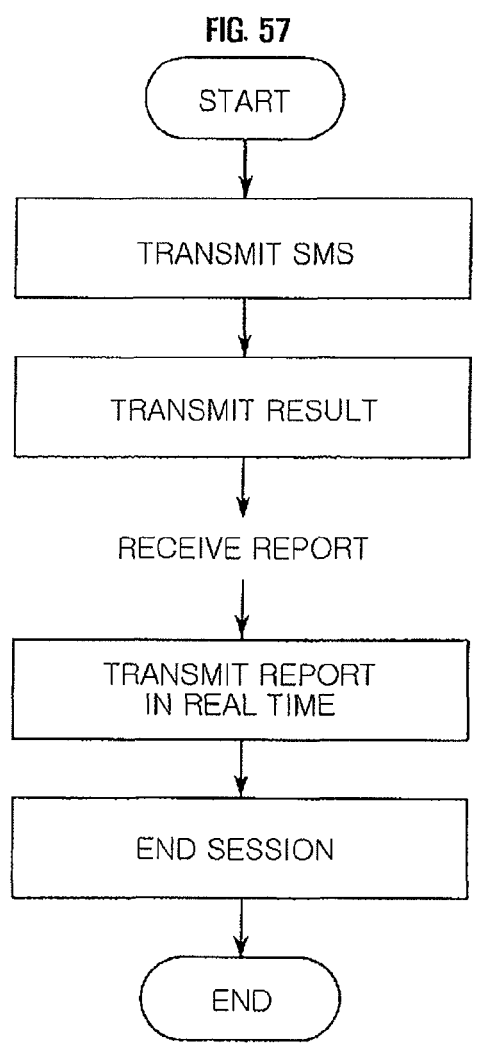
FIG. 57 and FIG. 58 are diagrams illustrating biz template for providing an MT message in an open mobile business supporting system according to an embodiment of the present invention.
Figure 58:
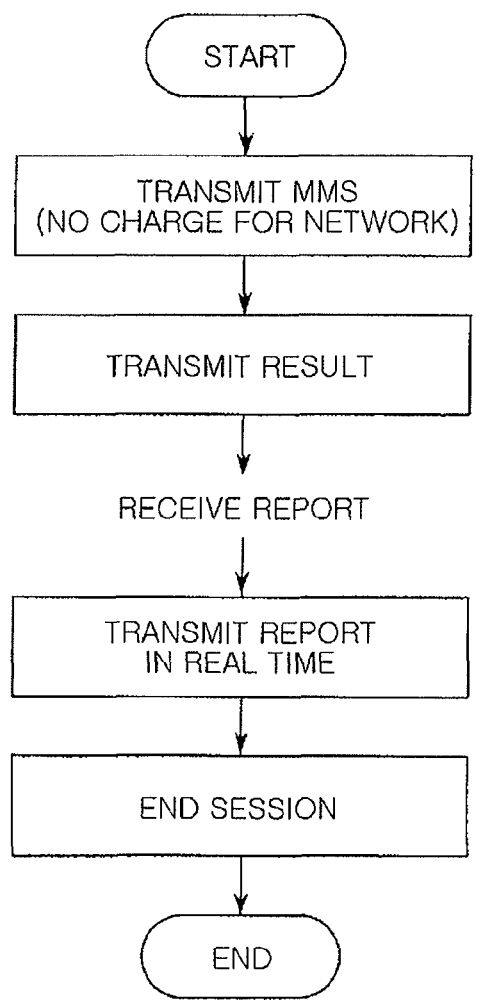

The business logic processing unit 200 performs a predetermined biz template for the MT message through cooperating with the MT cooperating unit 528. As described above, the biz template is formed of the properties of biz objects, an order of performing the biz objects, the expression of a conditional branch, input parameter information for performing the biz objects, a method of processing data, output parameter information exposed after performing the biz template, and time-out setup information. FIG. 57 and FIG. 58 show biz templates previously setup for processing an MT message. As shown in FIG. 57 and FIG. 58, in the open mobile business supporting system, the biz template is embodied by grouping unit functions among service logics of the CP/SP system 11 for processing an MT message. That is, the biz template is embodies by grouping at least one or a plurality of biz objects for processing an MT message. FIG. 57 shows a biz template processed in the business logic processing unit 200 for processing an MT SMS message according to an embodiment of the present invention. FIG. 58 shows a biz template for processing an MT MMS message according to an embodiment of the present invention. Such a biz template for processing an MT message can vary in various forms according to a service type provided from the CP/SP system 11.

The business logic processing unit 200 performs a biz template defining predetermined business logic for the MT message. In performing the biz template, the SMS MT message or the MMS MT message is transmitted to the user terminal 14 through the MP/MMSC 39 in a legacy system through cooperating with the MT cooperating unit 528 in the legacy cooperation procession unit 500 in case of receiving an instruction for performing the biz objects forming the biz template.

The MT cooperating unit 528 relays the cooperation between the business logic processing unit 200 and the mobile communication legacy system 30 to transmit the MT message to the user terminal through the MP/MMSC 39 so that the business logic processing unit 200 performs the biz template.

With reference to FIG. 56, a procedure of processing an MT message in the open mobile business supporting system according to an embodiment of the present invention will be described.

The CP/SP system 11 transmits a predetermined SMS or MMS message to the OI processing unit 100 in step S5301.

Then, the OI processing unit 100 calls a biz template related to the MT SMS message for the business logic processing unit 200 in step S5302.

The business logic processing unit 200 performs a biz template shown in FIG. 57 and/or FIG. 58, which is defined based on a business logic called corresponding to the MT SMS or MMS message. As described above, while the business logic processing unit 200 performs a biz template related to the MT message, the business logic processing unit 200 requests the MT cooperating unit 528 in the legacy cooperation processing unit 500 to cooperate with the MP/MMSC 130 in a mobile communication legacy system in order to perform the biz template in step S5303.

Then, the MT cooperating unit 528 requests the MP or MMSC 39 to transmit the MT message in step S5304. The MP or MMSC 39 receives the MT message and transfers the received MT message to the user terminal 14, thereby processing the MT message through the open mobile business system according to an embodiment of the present invention.

Figure 59A:
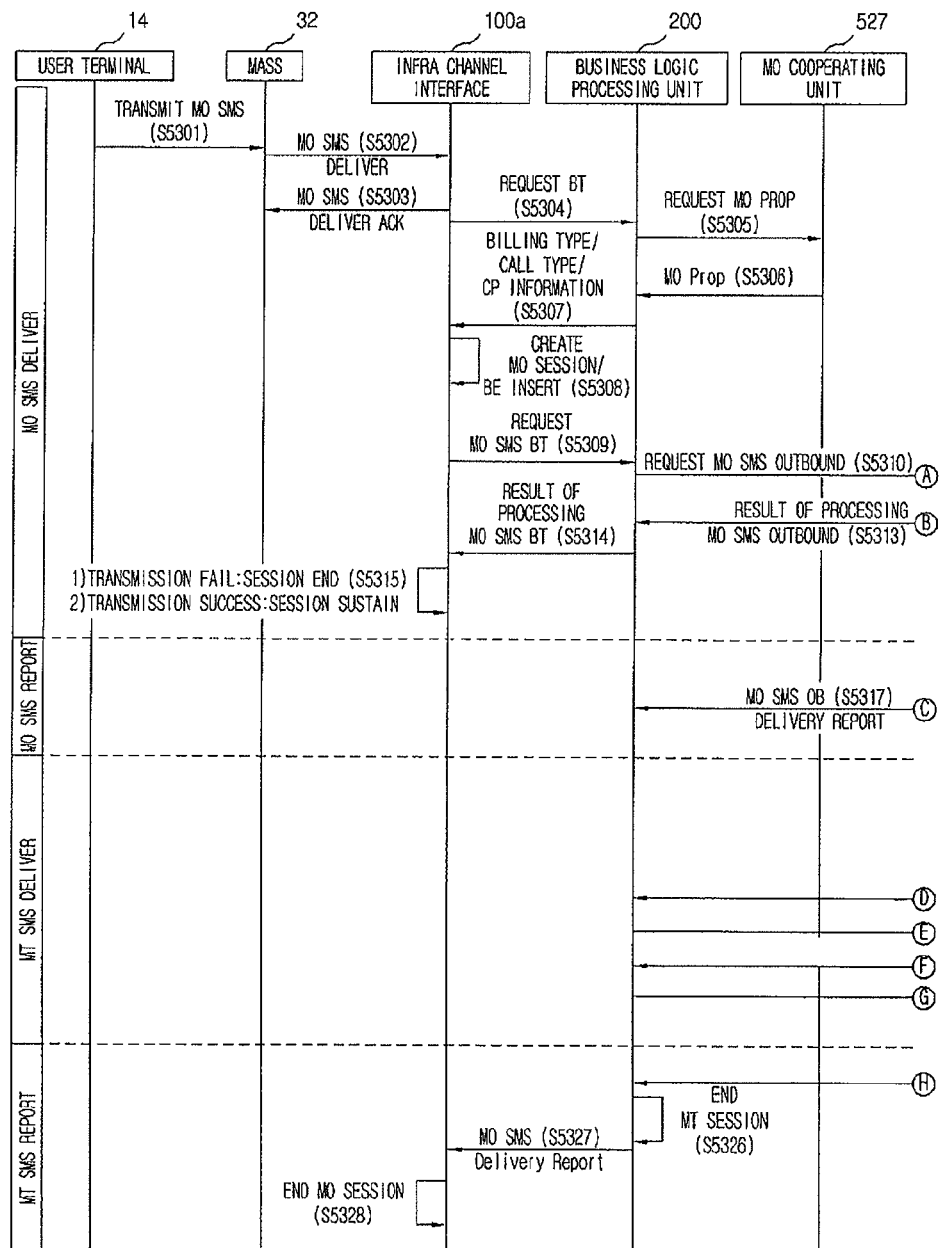
FIG. 59 is a flowchart illustrating a procedure for processing an MT MSM message after processing an MO SMS message using an open mobile business supporting system according to an embodiment of the present invention.

FIG. 59 is a flowchart illustrating a procedure for processing an MT MSM message after processing an MO SMS message using an open mobile business supporting system according to an embodiment of the present invention.

Typically, a billing process for an MO message processing service and a billing process for an MT message processing service are independently performed. If an error is generated in the MT message processing procedure after transmitting a predetermined SMS message or MMS message to a CP/SP system 11 using a user terminal 14 based on the typical MO message processing scheme, the SMS or MMS message can not reach a receiver. Although the user did not receive the SMS or MMS message due to such an error, a service fee is charged to a user according to the typical service scheme.

In the present embodiment, however, the sessions for MO message and for the MT message are managed in single procedure using the open mobile business supporting system. Therefore, a related service fee is charged only if the MO message and the MT message service are normally and completely finished without generating error.

Referring to FIG. 59, in an MO SMS delivering procedure, a user transmits an SMS message to the MASS 32, an SMS dispatching system, using own user terminal 14 in step S5301. The SMS message is a phone to CP/SP message provided from the user terminal 14 to the CP/SP system 11.

Then, the MASS 32 transmits the SMS message to the infra channel interface 100a in step S5302, and receives the response in step S5303.

The infra channel interface 100a requests the characteristics information of the MO message such as the destination information and the option information from the MO cooperating unit 527 through the business logic processing unit 200 in steps S5304 and S5305. There destination information includes an IP address and port information of the CP/SP system 11, and the option information includes information related to a billing type and a call type.

As a respond of the request, the MO cooperating unit 527 transfers the characteristics information of the MO message such as the destination information and the option information to the infra channel interface 100a through the business logic processing unit 200 in steps S5306 and S5307.

The infra channel interface 100a creates a session for transmitting the MO message using the destination information and the option information of the received MO message, and inputs the information of the session to the MMDB 900 in step S5308. When creating the session for transmitting the MO message in the present embodiment, billing information inputs for later billing process for the MO message transmission, and the billing information is managed through entire session for the MO message.

Then, the infra channel interface 100a requests a corresponding business logic from the business logic processing unit 200 using the created session for the MO message by calling a business logic for the MO SMS in step S5309.

Then, the business logic processing unit 200 performs a biz template for the called business logic, and transfers the result thereof to the CP/SP through the open output interface 100b in steps S5310 and S5311. Then, the business logic processing unit 200 receives the result of MO SMS transmission as a response in steps S5312 and S5313.

Then, the business logic processing unit 200 transmits the result of performing the biz template for the MO message to the infra channel interface 100a in step S5314.

The infra channel interface 100a determines whether the transmitted MO message is normally transmitted to the CP/SP system 11 based on the result of performing the biz template. If the MO message is successfully transmitted to the CP/SP system 11, the infra channel interface 100a continuously sustains the session for the MO message for continuously processing the MO message. The infra channel interface 100a, however, terminates the session in step S5315, if the MO message transmission is failed.

In an MO SMS delivery report procedure, the CP/SP system 11 transmits a report message to the business logic processing unit 200 through the open output interface 100b in order to inform that the MO message is successfully transferred in steps S5316 and S5317. Since a step of transmitting the MT message with the session sustained is performed after processing the MO message in the present embodiment, the steps S5316 and S5317 can be cancelled.

Then, a procedure of MT SMS deliver is performed. If the MO message is successfully transferred to the SP/SP system 11 in step S5315, the CP/SP system 11 requests the open web interface 100c to transmit a CP/SP to Phone direct MT SMS message from the CP/SP system to the User terminal 14 in step S5318.

Then, the open web interface 100c creates a session for an MT message based on the received MT SMS message transmission request and stores the information of the created session to the MMDB 900 in step S5319. In the present embodiment, the session key for the MO message is required to be sustained in case of continuously processing the MT message after performing an MO message. In the present embodiment, billing information inputs for a billing process for the MT message transmission when the session for the MT message is created, and the billing information is managed through the entire session for the MT message.

In the step S5319, if a session for the MT message is created, the open web interface 100c calls business logic for the MT SMS for the business logic processing unit 200 using the created session information, thereby requesting a corresponding biz logic to be processed in step S5320.

Then, the business logic processing unit 200 performs a biz template that defines the previously defined business logic for the MT message. When the biz template is performed, if the business logic processing unit 200 requires cooperating with a legacy system, the business logic processing unit 200 requests the MT cooperating unit 528 to transmit the MT message through the MASS 32 in the legacy system in step S5321.

Then, the MT cooperating unit 528 transmits the MT SMS message to the user terminal by cooperating with the MASS 32, and transmits the result of transmitting to the business logic processing unit 200 in step S5322.

Afterward, the business logic processing unit 200 provides a result of transmitting the MT SMS message to the user terminal by performing the biz template for the MT message as described above to the open web interface 100c in step S5323. The open web interface 100c provides the result of transmitting the MT SMS message to the CP/SP system 111 in step S5324.

In a procedure of MT SMS delivery report, the MT cooperating unit 528 transmits an MT SMS deliver report message to the business logic processing unit 200 to inform that the MT SMS message is successfully transmitted in step S5325.

Then, the business logic processing unit 200 confirms the MT SMS message process successfully end by analyzing the received MT SMS delivery report message and terminates the session for the MT message in step S5327.

Then, the business logic processing unit 200 transmits an MO SMS deliver report message to the infra channel interface 100a to inform that the MO SMS message is successfully transmitted in step S5327.

Then, the infra channel interface 100a confirms that the MO message and the MT message are successfully transmitted based on the received MO SMS delivery report message, and terminates the sessions for the MO message and the MT message in step S5328. Finally, the MO MT cooperation message processing procedure according to an embodiment of the present invention ends.

As described above, if the MO message and the MT message are successfully transmitted, billing operation for the MO and MT message transmission is processed as a batch job based on the billing information inputted in steps S5307 and S5319.

Therefore, various business logics including the MO-MT message process can be developed and applied using the open mobile business supporting system according to an embodiment of the present invention. Although an error is generated in processing an MT message after transmitting an SMS message to the CP/SP system 11 through the MO message processing scheme, a service fee for processing the MO message is not charged to a user if the SMS message is not successfully reached to a user. Therefore, a service fee for transmitting an SMS or MMS message is reasonably charged to a user according to an embodiment of the present invention.

FIG. 60 is a diagram illustrating a procedure of processing an MT MMS message after processing an MO MMS message using an open mobile business supporting system according to an embodiment of the present invention.

As shown in FIG. 60, after processing an MO MMS message using the open mobile business supporting system according to an embodiment of the present invention, MT MMS message processing steps S5401 to S5428 are similar to the MO-MT message processing steps S5301 to S5328. Therefore, overlapped descriptions thereof are omitted. The MO-MT MMS message processing steps in FIG. 60 are identical to the MO-MT message processing steps in FIG. 59 except following steps. The business logic processing unit 200 cooperates with the MMSC 33 of a legacy system to transmit the message so as to process an MMS message. A report message is transmitted to a long message service center (LMSC, not shown) and receives a response thereof in steps S5430 to S5436 in order to enable the LMSC to independently perform a billing process, which is connected to the MMSC 33 to confirm the transmission of the MMSC.

Figure 62A:
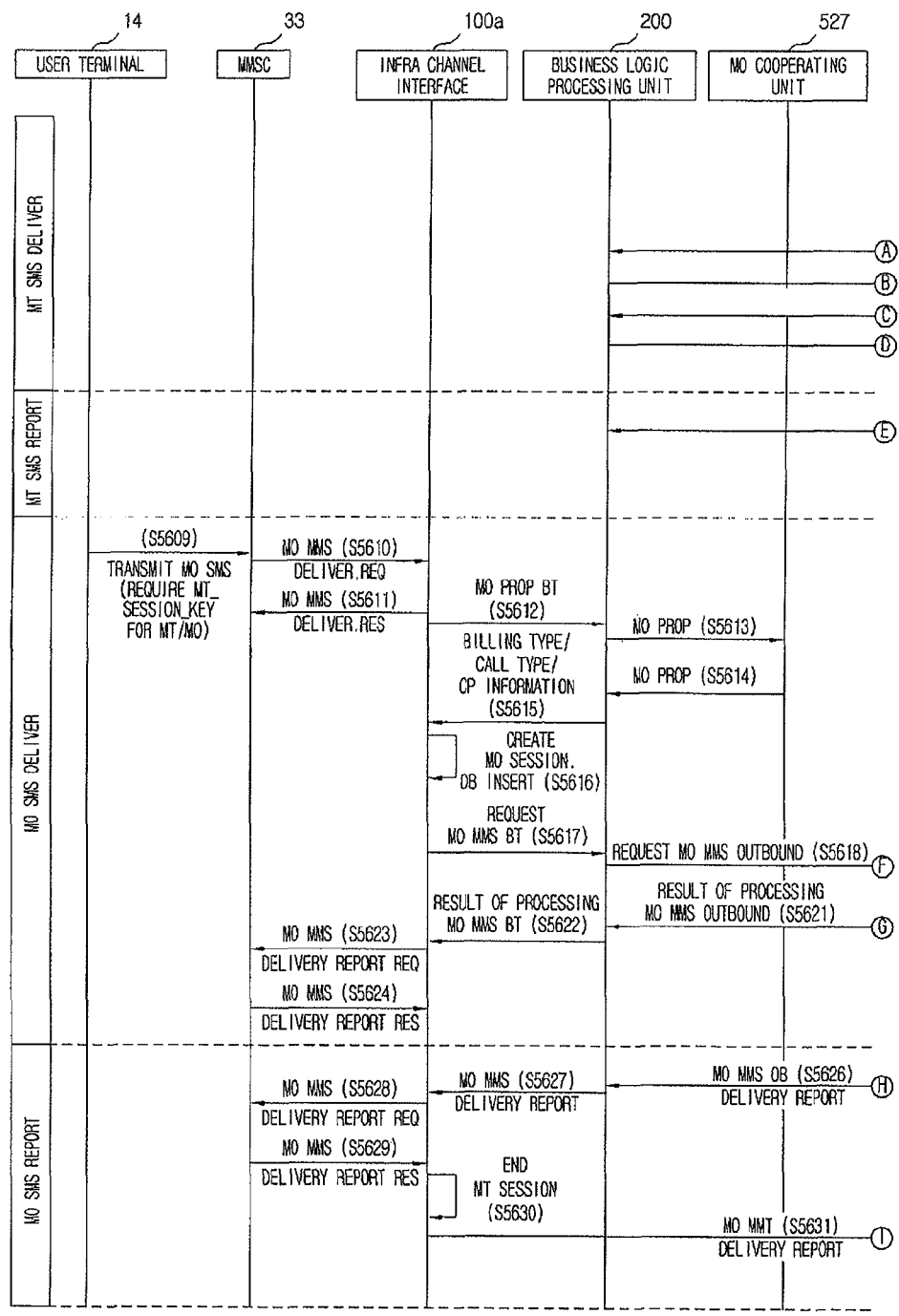
FIG. 62 is a diagram illustrating a procedure of processing an MO MMS message after processing an MT MMS message.

FIG. 61 is a diagram illustrating a procedure of processing an MO SMS message after processing an MT SMS message using an open mobile business supporting system according to an embodiment of the present invention, and FIG. 62 is a diagram illustrating a procedure of processing an MO MMS message after processing an MT MMS message.

A method of processing an MO message after processing an MT message in FIG. 61 and FIG. 62 is different from that of processing an MT message after transmitting an MO message shown in FIG. 59 and FIG. 60 in a view of an order performing processes. That is, in FIG. 61 and FIG. 62, MT message processing steps S5501 to S5508, and S5601 to S5608, are performed before performing MO message processing steps S5509 to S5527, and S5609 to S5632. However, steps for processing an MO message, and steps of processing an MT message in FIG. 61 and FIG. 62 are identical to those in FIG. 59 and FIG. 60, respectively.

As described above, various MT message processing services and MO message processing services can be developed and supported using the open mobile business supporting system according to an embodiment of the present invention. Also, as the MO-MT message processes are processed collectively, a reasonable billing process can be performed.

Figure 63:
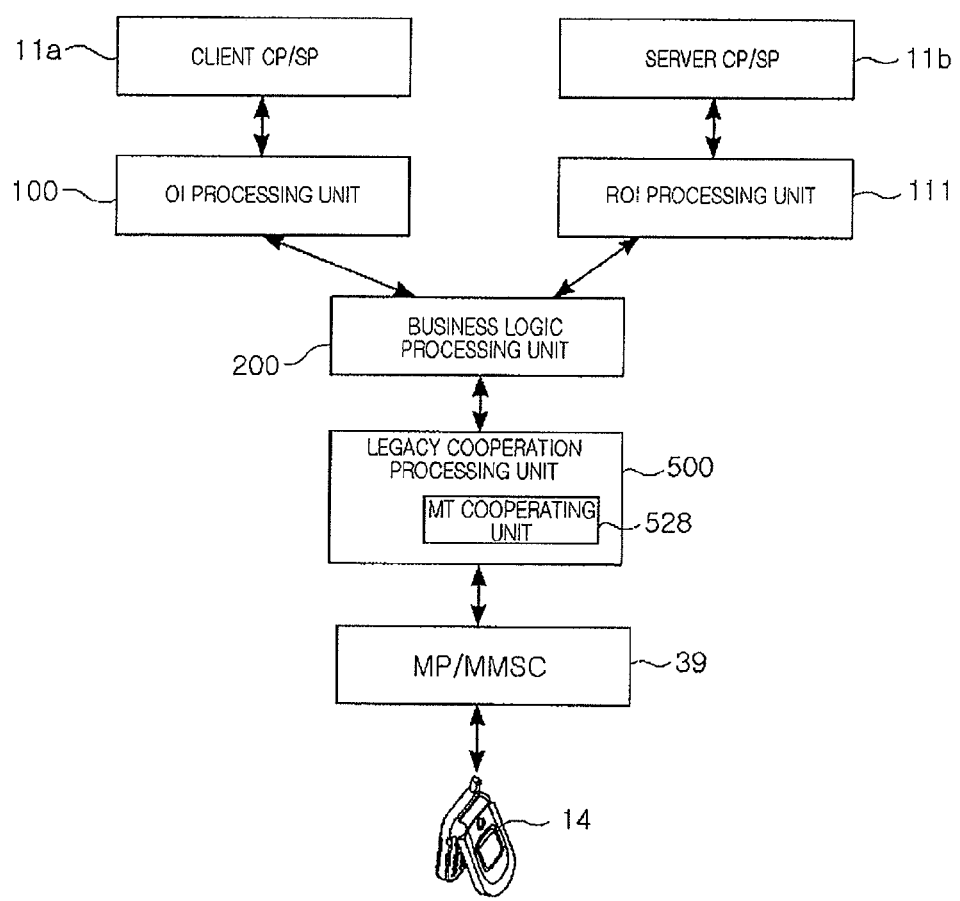
FIG. 63 is a block diagram illustrating a configuration for providing a report after transmitting a message in an open mobile business supporting system according to an embodiment of the present invention.

FIG. 63 is a block diagram illustrating a configuration for providing a report after transmitting a message in an open mobile business supporting system according to an embodiment of the present invention.

Referring to FIG. 63, the open mobile business supporting system according to an embodiment of the present invention includes an open interface OI processing unit 100 connected to a client content/service providing system CP/SP 11a, and a report open interface (ROI) processing unit 111 connected to the business logic processing unit 200 and a server content/service providing system CP/SP 11b.

The client CP/SP 11a is a system that performs a CP/SP to Phone direct MT messaging service for providing an SMS or an MMS message such as texts, pictures, and multimedia files to a user's mobile terminal.

The server CP/SP 11b is a system that wants to receive a report message in real time as an SMS or MMS message transmission result from the client CP/SP 11a for a request of transmitting an SMS or MMS message from the client CP/SP 11a. In FIG. 63, the client CP/SP 11a and the server CP/SP 11b are described as an independent system. However, they can be embodied as single system according to a service type and a service provider type. The described configuration can provide a report in real time based on the identical integrated specification not only for an SMS or MMS message but also for various other legacy systems.

The business logic processing unit 200 defines and standardizes the business logic and manages it as a biz template. The business logic processing unit 200 transmits an SMS or an MMS message to a user terminal 14 by performing a biz template according to a result of performing the biz template through cooperating with an MP/MMSC 130 in a legacy system, and receives a report message as the result of transmitting the SMS or MMS message. The report message includes information about the result of message transmission such as whether the SMS or MMS message is successfully transmitted or not.

The ROI processing unit 111 receives the report message from the business logic processing unit 200 and provides the received report message to the server CP/SP 11b.

Figure 64:
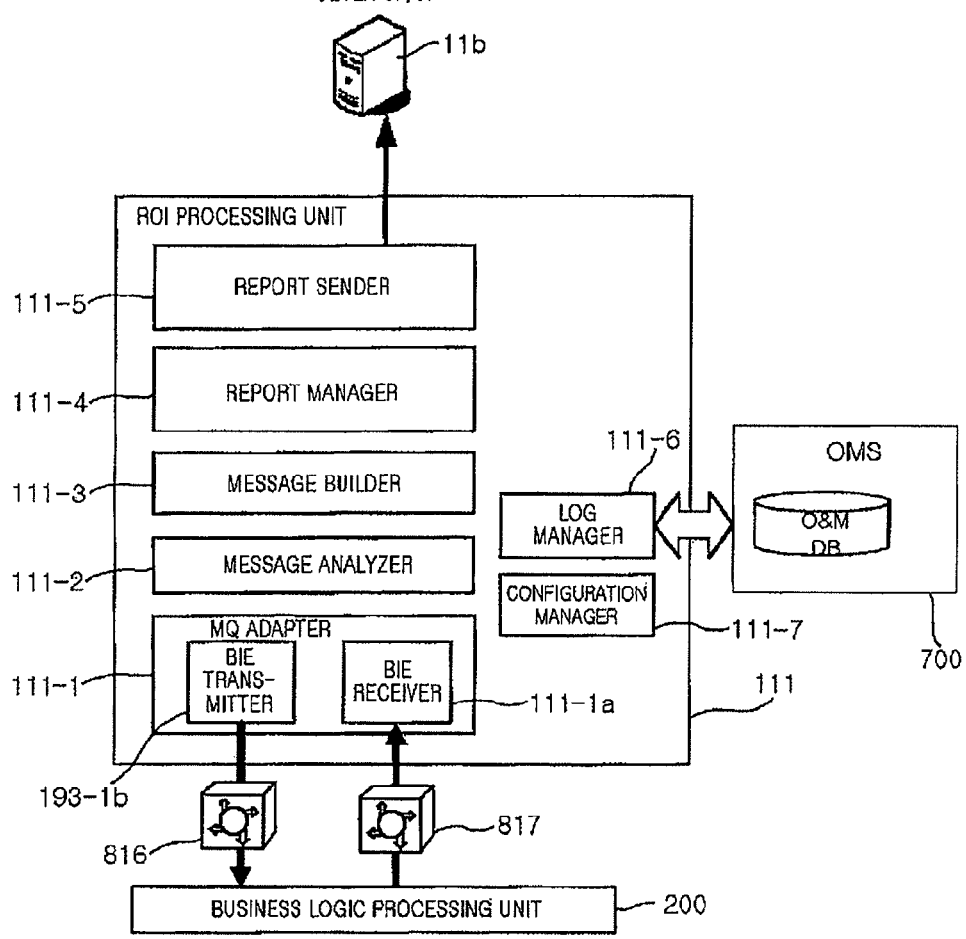
FIG. 64 is a detailed block diagram illustrating a report open interface (ROI) processing unit according to an embodiment of the present invention.

FIG. 64 is a block diagram illustrating a report open interface (ROI) processing unit 111 shown in FIG. 63.

Referring to FIG. 64, the ROI processing unit 11 includes an MQ adapter 111-1, a message analyzer 111-2, a message builder 111-3, a report manager 111-4, a report sender 111-5, a Log manager 111-6, and a configuration manager 111-7.

The MQ adapter 111-1 transmits and receives a report message to/from the business logic processing unit 200 through a message queue 816. The MQ adapter 111-1 includes a BIE receiver 111-1a and a BIE transmitter 111-1b. The BIE receiver 111-1a receives a report message from the business logic processing unit 200 through a message queue 816. The BIE transmitter 111-1b transmits a report message to the business logic processing unit 200 through message queue 816.

The message analyzer 111-2 receives the report message from the MQ adaptor 111-1 and transforms the received report message to have a class structure that can be recognized in the ROI processing unit 111.

The message builder 111-3 receives the report message from the message analyzer 111-2, and transforms the received report message to be usable in the server CP/SP 11b.

The report manager 111-4 receives the report message from the message builder 111-3 and relays the report message to the server CP/SP 11b to be transmitted.

The report sender 111-5 receives the report message from the report manager 111-4 and transmits the received report message to the server CP/SP 11b.

The Log manager 111-6 standardizes a log format per a log level of constitutional modules 111-1 to 111-7 of the ROI processing unit 111. That is, the log manager 111-6 creates a system log for a log level and a log form assigned from each constitutional module 111-1 to 111-7, and transmits the created system log to OMS 700 using FTP to manage the created system logs. The log information can be created based on debugging information, malfunction information, and system operating information, which are generated from the constitutional modules 111-1 to 111-7 of the ROI processing unit 111. Also, the log level can be setup according to a system environment. For example, various log levels can be defined as an error level, an information providing level, a warning lever, and a debug level for leaving the lowest detail. The log is generated according to the log level defined according to the environment.

The configuration manager 111-7 stores and manages environment settings such as a system environment or a log generation period for the constitutional modules 111-1 to 111-7 of the ROI processing unit 111 to an internal configuration file (not shown). The configuration manager 111-7 can be embodied to reflect the modification of the configuration file by re-driving the ROI processing unit 111 or to instantly reflect the modification of the configuration file in real time without re-driving the ROI processing unit 111. That is, the configuration manager 111-7 manages modifications using the internal configuration file when the execution environment of each constitutional module of the ROI processing unit 111 is changed. The configuration manager 111-7 can set up the execution environment by reading the configuration file in real time when the system is driven. In order to manage the configuration information, KEY values of predetermined program or configuration information are received from a desired module, and a configuration information value is inquired. Also, configuration information can be inquired, modified, and deleted by directly access the configuration file. When the configuration information is modified, deleted, or inputted, the configuration manager 11-7 reflects the configuration information to the current ROI processing unit 111 in real time in order to allow a program or a module to use the reflected configuration information.

Figure 65:
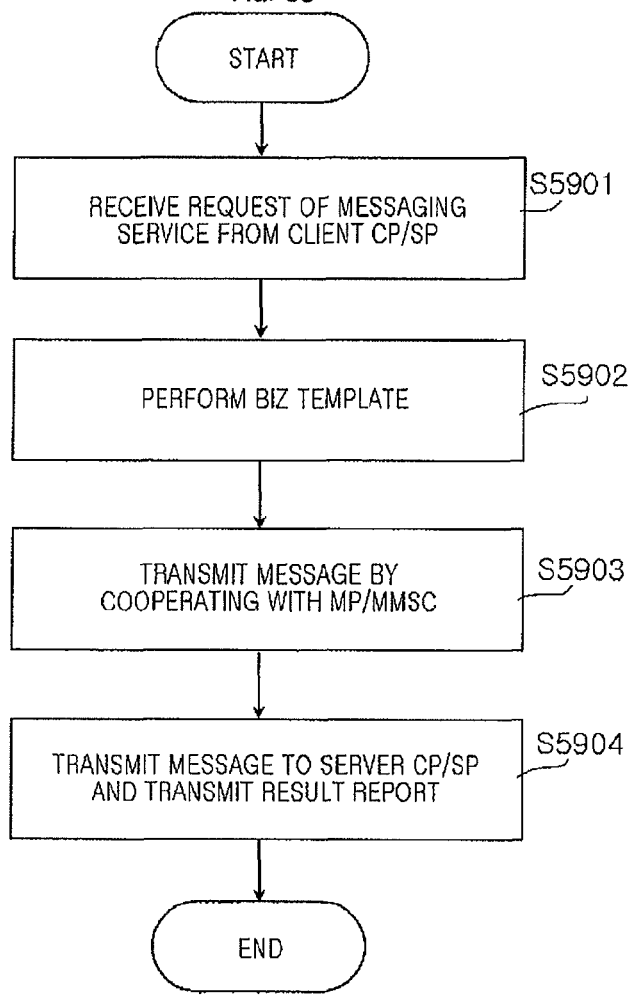
FIG. 65 is a flowchart illustrating a procedure of providing a report through an open mobile business supporting system according to an embodiment of the present invention.

FIG. 65 is a flowchart illustrating a procedure of providing a report through an open mobile business supporting system of FIG. 63 after transmitting a message according to an embodiment of the present invention.

Referring FIG. 65, when performing a CP/SP to Phone direct MT messaging service that transmits an SMS or MMS message including a text, a picture, and a multimedia file to a user terminal 14 from the client CP/SP 11a using the open mobile business supporting system, the OI processing unit 100 requests to process a business logic that performs a single function among logics constituting an MT message service in step S5901. When the client CP/SP 11a requests the business logic process in the step S5901, it may be desirable to include a server IP address or port information of the server CP/SP 11b in the business logic processing request message in order to transmit a report message for the result of performing the biz template of the business logic to a pre-assigned server CP/SP 11b.

Then, the OI processing unit 100 request the business logic processing unit 200 to perform the biz template, and the business logic processing unit 200 performs the biz template in step S5902.

Then, the business logic processing unit 200 cooperates with the MP/MMSC 39 through the MT cooperating unit 528 of the legacy cooperation processing unit 500, thereby transmitting an SMS or MMS message to the user terminal 14 in step S5903.

The business logic processing unit 200 receives a report message from the MT cooperating unit 528, which informs whether the SMS or MMS message is successfully transmitted to the user terminal 14 or not and transmits the received report message to the server CP/SP 11b in step S5904, thereby providing a real time report of the MT message transmission according to an embodiment of the present invention.

Figure 66:
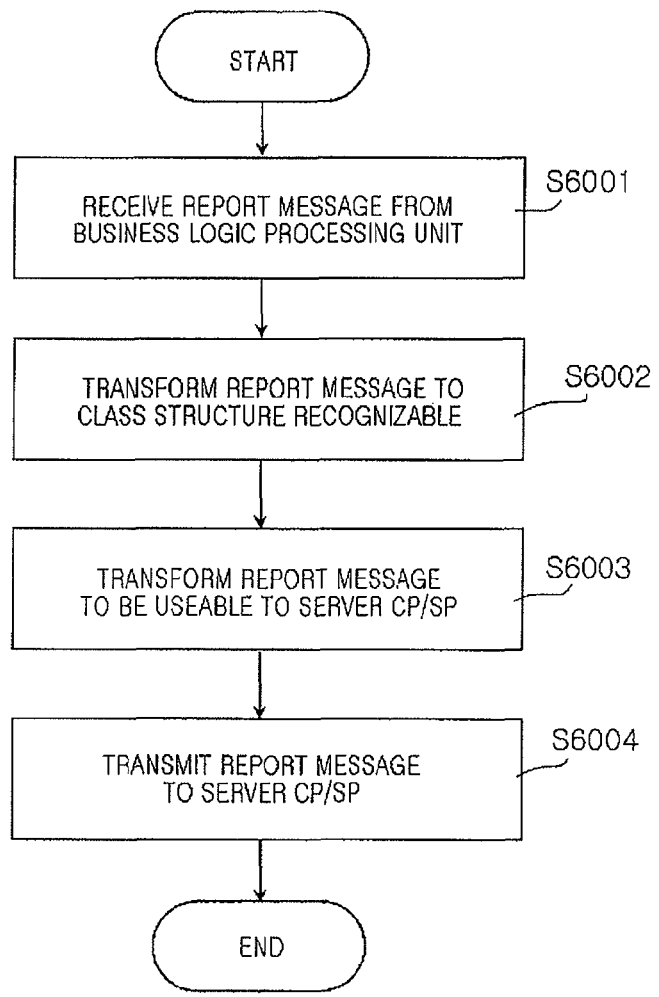
FIG. 66 is a flowchart illustrating the detailed operation of an ROI processing unit in a real time report procedure, shown in FIG. 65, according to an embodiment of the present invention.

FIG. 66 is a flowchart illustrating the detailed operation of an ROT processing unit 11 in a real time report procedure according to an embodiment of the present invention.

Referring to FIG. 66, the ROT processing unit 111 according to an embodiment of the present invention receives a report message from the business logic processing unit 200 and transmits the received report message to the server CP/SP 11b.

At first, the MQ adapter 111-1 receives the report message from the business logic processing unit 200 through the message queue 817 in step S6001.

Then, the message analyzer 111-2 receives the report message from the MQ adaptor 111-1 and transforms the received report message a class structure to be recognized in the ROI processing unit 111 in step S6002.

The message builder 111-3 receives the report message from the message analyzer 111-2, and transforms the report message to be usable in the server CP/SP 11b in step S6003.

Then, the report manager 111-4 receives the report message from the message builder 111-3 and relays the received report message to be transmitted to the server CP/SP 11b. The report sensor 111-5 receives the report message from the report manager 111-4 and transmits the received report message to the server CP/SP 11b in step S6004.

In the present embodiment, the log manager 111-6 is used to create a system log for a log level and a log form a assigned from each of constitutional modules 111-1 to 111-7 of the ROI processing unit 111, and the created log information is transmitted to the OMS 700 using FTP, thereby managing the log information of the ROI process 111.

In the ROI processing unit 111, the configuration manager 111-7 is used to store and manage the environment settings such as system environment or the log generation period for each of the constitutional modules 111-1 to 111-7 of the ROI processing unit 111, thereby managing the system environment and the log generation period.

Figure 67:
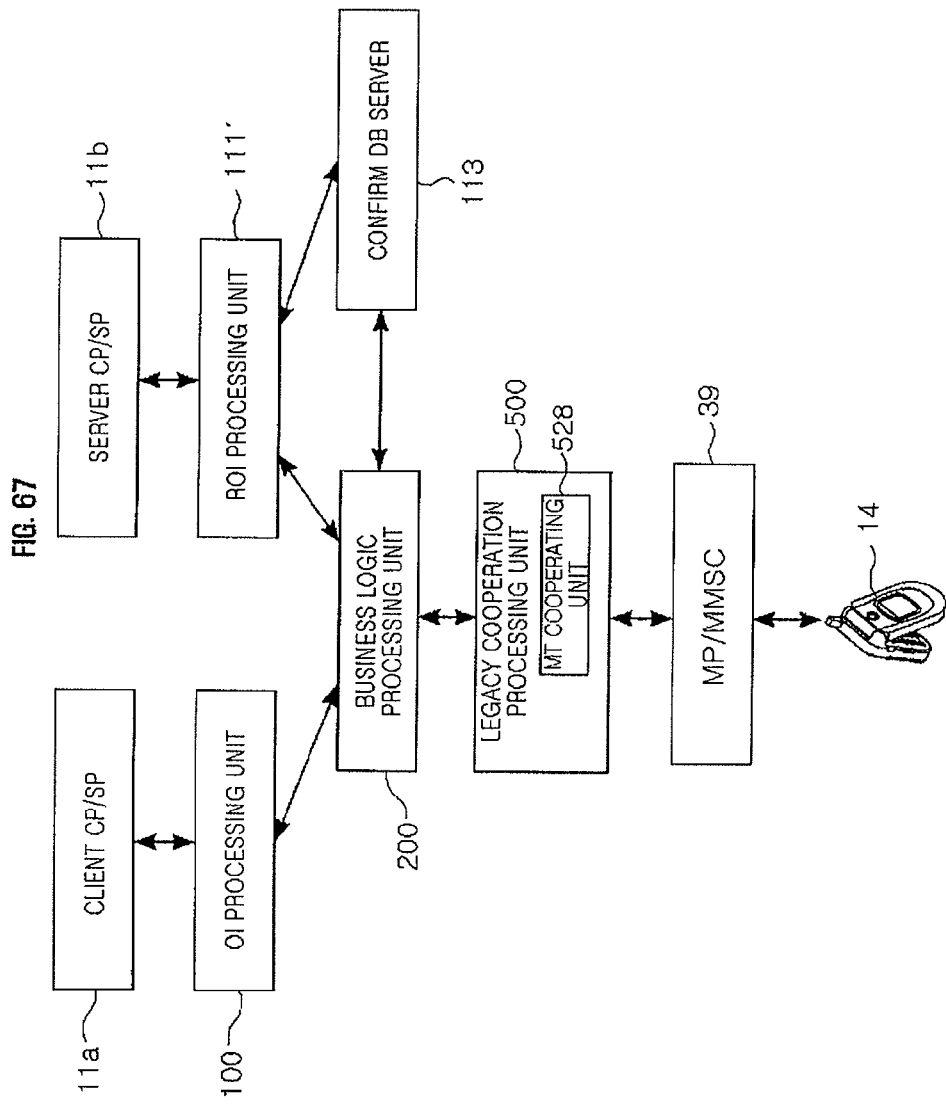
FIG. 67 is a block diagram illustrating an open mobile business supporting system for confirming a message transmission result after transmitting a message according to an embodiment of the present invention.
Figure 68:
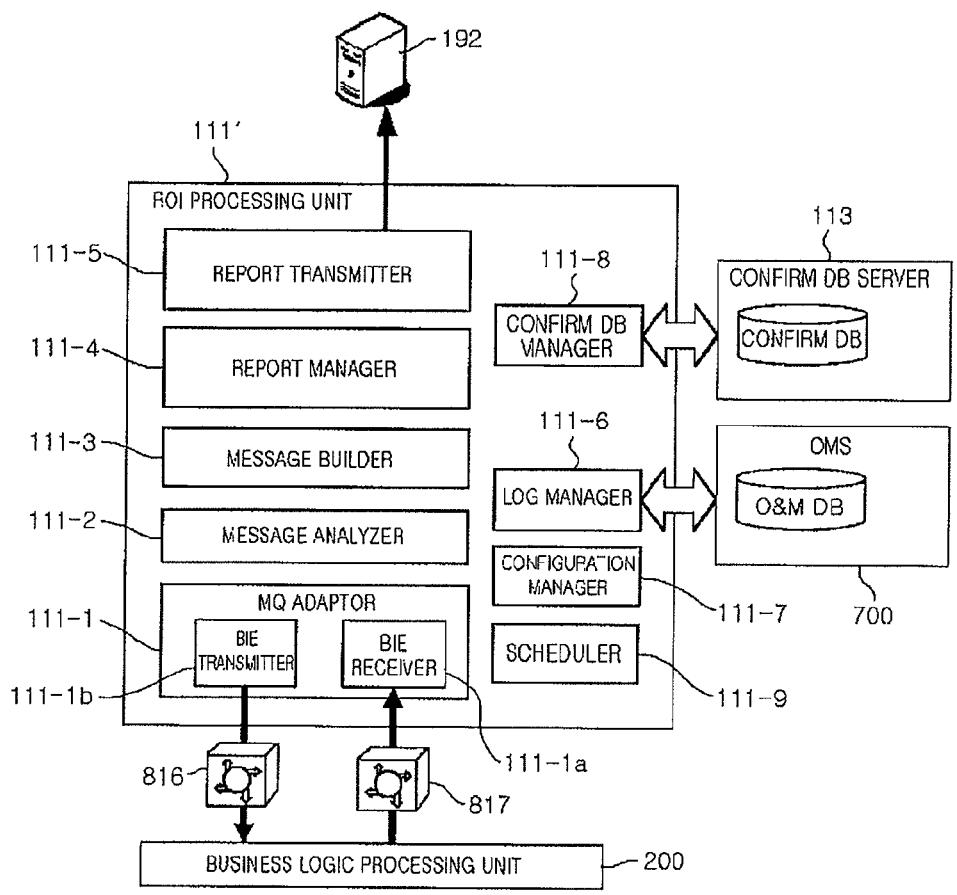
FIG. 68 is a block diagram illustrating an ROI processing unit, shown in FIG. 67, according to an embodiment of the present invention.

FIG. 67 is a block diagram illustrating an open mobile business supporting system for confirming a message transmission result after transmitting a message.

Referring to FIG. 67, the open mobile business supporting system according to an embodiment of the present invention further includes a confirm database server 113.

The confirm DB Server 113 stores information about the report message transmitted from the server CP/SP 11b, and provides the stored report message when the client CP/SP 11a request the report message. By driving the confirm DB server 113, it is possible to confirm whether a report message is transmitted from the client CP/SP 11a to the server CP/SP 11b although the report message is lost according to the network condition. In one embodiment, the confirm DB server 113 stores and manages session information such as response messages exchanged to perform the biz template in the business logic processing unit 200. The report message and the session information stored in the confirm DB server 194 can be directly provided from the business logic processing unit 200, or can be provided from the business logic processing unit 200 through the ROI processing unit 111'. In the present embodiment, a message can be confirmed based on an integrated specification according to needs. In the present embodiment, it is possible to confirm the message transmission result based on an integrated specification not only for the SMS or MMS message but also for various other messages for legacy system.

The ROI processing unit 111' further includes a confirm DB manager 111-8 and a scheduler 111-9 as well as a MQ adapter 111-1, a message analyzer 111-2, a message builder 111-3, a report manager 111-4, a report sender 111-5, a Log manager 111-6, and a configuration manager 111-7.

The confirm DB manager 111-8 stores and manages report messages and session information provided from the business logic processing unit 200 at the confirm DB server 113.

The report message stored in the confirm DB manager 111-8 is received through the BIE receiver 111-1a of the MQ adaptor 111-1 when the client CP/SP 11a requests the report message. The report manager 111-4 obtains the report message from the confirm DB manager 111-8, and provides the obtained report message to the business logic processing unit 200 through the MQ adaptor 111-1.

The request of the report message transmitted from the client CP/SP 11a is performed based on a session key generated to identify each business logic of the client CP/SP 11a from the OI processing unit 100. The confirm DB manager 111-8 stores and manages the report message with referent to session keys of corresponding business logic. Therefore, when the client CP/SP 11a requests a report message of a predetermined session key to transmit, the confirm DB manager 111-8 transmits the report message related to the corresponding session key to the client CP/SP 11a.

The scheduler 111-9 manages report information stored in the confirm DB server 1113 according to a predetermined execution period and managing period. For example, the scheduler 111-3 can be configured to delete stored report messages at every one day period in order to prevent a memory from being overflowed due to the unnecessary messages.

FIG. 69 is a flowchart illustrating a procedure for confirming a message transmission result after transmitting a message in an open mobile business supporting system according to an embodiment of the present invention.

Referring to FIG. 69, when performing a CP/SP to Phone direct MT messaging service that provides an SMS or MMS message including a text, a picture, and a multimedia file to a user terminal 14 from a client CP/SP 11a using an open mobile business supporting system according to an embodiment of the present invention, the OI processing unit 100 receives a request of processing a business logic that performs a single function among logics constituting the MT messaging service from the client CP/SP 191 in step S6301. It may be desirable to include a server IP address and port information of the server CP/SP 11b into the business logic processing request message in order to transmit a report message for the result of performing the biz template to a pre-assigned server CP/SP 11b when the client CP/SP 11a requests the business logic processing in the step S6301.

Then, the OI processing unit 100 requests the business logic processing unit 200 to perform the biz template, and the business logic processing unit 200 performs the biz template in step S6302.

Therefore, the business logic processing unit 200 transmits an SMS or MMS message to a user terminal 14 by cooperating with the MP/MMSC 39 through the MT cooperating unit 1528 of the legacy cooperation processing unit 500 in step S6303.

The business logic processing unit 200 manages the received report messages by storing the received report messages into the confirm DB server 113 directly or indirectly through the ROI processing unit 111 in step S6304.

Then, the business logic processing unit 200 receives a report message from the MT cooperating unit 528, which informs the result of message transmission such as whether the SMS or MMS message is successfully transmitted to the user terminal 14. Then, the business logic processing unit 200 transmits the received report message to the server CP/SP 11b in step S6305, thereby providing a real-time report of the MT message transmission to the server CP/SP 11b.

Afterward, when the client CP/SP 191 requests the report message, the business logic processing unit 200 obtains the report message from the confirm DB server 113 and provides the obtained report message to the client CP/SP 11a. The business logic processing unit 200 can be configured to directly obtain the report message from the confirm DB server 113 or to indirectly obtain the report message through the ROI processing unit 111'.

FIG. 70 is a diagram illustrating the operations of an ROT processing unit 111' according to an embodiment of the present invention.

Referring to FIG. 70, the ROI processing unit 111' receives the report message from the business logic processing unit 200 and transmits the received report message to the server CP/SP 11b as follows.

At first, the MQ adapter 111-1 receives a report message from the business logic processing unit 200 through a message queue 817a in step S6401.

The confirm DB manager 111-8 stores the received report message in the confirm DB server 113 and manages the stored report message in step S6402.

The message analyzer 111-2 receives the report message from the MQ adaptor 111-1 and transforms the received report message to a class structure to be recognized in the ROI processing unit 111' in step S6403.

The message builder 111-3 receives the report message from the message analyzer 111-2 and transforms the report message to be usable in the server CP/SP 11b in step S6404.

The report manager 111-4 receives the report message from the message builder 111-3 and relays the report message to transmit it to the server CP/SP 11b, and the report sender 111-5 receives the report message from the report manager 111-4 and transmits the received report message to the server CP/SP 11b in step S6405.

Then, when the business logic processing unit 200 requests the report message stored in the confirm DB server 113, the report manger 111-4 determines whether the business logic processing unit 200 request the report message or not in step S6306. In case of the report message request, the report manager 111-4 transmits a report message, which is stored in the confirm DB server 113 and have relation to a unique session key of a corresponding request, to the business logic processing unit 200 in step S6407.

The scheduler 111-9 determines whether a period for storing the repot message in the confirm DB server 113 based on a predetermined execution period and managing period is expired or not in step S6408. In case of expiration, the report message with the storing period expired is removed from the confirm DB server 113, thereby preventing the confirm DB server 113 from being overflowed.

Although some embodiments of the present invention have been disclosed for illustrative purpose, those skilled in the art will appreciate that various modifications, additions and/or substitutions can be made without departing from the scope and spirit of the invention as defined in the accompanying claims.

According to certain embodiments of the present invention, the open mobile business supporting system supports various infra resources in a wireless communication system to be independently operated and integrally driven, thereby allowing various infra resources to be conveniently and effectively cooperated with one another. Furthermore, the open mobile business supporting system provides an integrated interface for the infra resources in the wireless communication system. Therefore, a service and an application layer can easily use the infra resources of the wireless communication system.

Moreover, the open mobile business supporting system according to certain embodiments of the present invention classifies biz logic management, service management, and service execution, thereby effectively supporting various business models.

What is claimed is:

1. A legacy cooperation device for a mobile communication system to be cooperated in an open mobile business supporting system, the device comprising:
    a business logic processor configured to store, manage, and perform a biz template formed of a plurality of biz objects arranged in a predetermined order, wherein the biz template is a standardized biz logic that is defined by selecting low-level functions which can be grouped as a unit function and performed in a mobile communication system among service logics provided from a content provider/service provider (CP/SP), and wherein the biz object is configured to cooperate with each legacy system of a mobile communication system and perform a comparison and determination operation on the result of cooperating;
    an open interface processor configured to receive a request of performing a predetermined biz logic from a CP/SP, request the business logic processor to perform a biz template corresponding to the requested biz logic, receive the result of the request, and transfer the received result to the CP/SP;
    a legacy cooperation processor configured to relay a request from a predetermined legacy system and return the result to the predetermined legacy system while performing a biz template by relaying interworking between the business logic processor and a legacy system of a mobile communication system;
    an infra channel providing device configured to receive a request of performing a biz object from a legacy system of a mobile communication system, perform the biz object by cooperating with another legacy system through the legacy cooperation processor, and transfer the result to a corresponding legacy system; and
    a message transferring device, comprising a plurality of message queues, configured to store a request message, a result returning message, and a report message exchanged among the open interface processor, the business logic processor, and the legacy cooperation processor,
    wherein the open interface processor, the business logic processor, and the legacy cooperation processor are configured to transfer signals by writing and reading a request message, a result returning message, and a report message to/from a predetermined message queue in the message transferring device and
    wherein the message transferring device comprises:
        at least one of first message queues for the open interface processor to record a request message and for the business logic processor to read the response message;
        at least one of second message queues setup per a legacy cooperation processor for the business logic processor to record a request message and for a corresponding legacy cooperation processor to read the request message,
        at least one of third message queues for the legacy cooperation processor to record a response message, and for the business logic processor to the response message;
        at least one of fourth message queues for the legacy cooperation processor to record a report message from a legacy system, and for the business logic processor to read the recorded report message; and
        at least one of fifth message queues for the business logic processor to record a result message, and for the open interface processor to read the result message.

2. The legacy cooperation device according to claim 1, wherein the legacy cooperation processor comprises:
    a common manager configured to receive a request of performing a biz object from the business logic processor or the infra channel providing device, return a result of performing the requested biz object, and manage system environment and log information; and
    a legacy cooperation interface unit configured to relay a request from a legacy system related to the biz object and the result thereof by cooperating with the legacy system.

3. The legacy cooperation device according to claim 2, wherein the common manager comprises:
    a message queue (MQ) manager configured to transmit and receive a message communicated with the business logic processor through the message queue;
    a shape manager configured to manage system environment or a log generation period;
    a log manger configured to generate a log according to a log level; and
    a log uploader configured to search a log of each constitutional element of the legacy cooperation processor, and transmit the searched log to the operating and managing unit.

4. The legacy cooperation device according to claim 2, wherein the legacy cooperating interface unit comprises at least one of:

a short message service (SMS) interface configured to request a short message service system (MASS) to transmit a text message by cooperating with the MASS that performs an SMS service of a mobile communication system, receive a result thereof, and transform the received result to a standard interface type;

a multimedia message service (MMS) interface configured to request a multimedia message service center (MMSC) to transmit a multimedia message by cooperating with the MMSC that performs an MMS service of a mobile communication system, receive a result thereof, and transform the received result to a standard interface type;

an authentication interface configured to request an authentication process to a corresponding authentication system by cooperating with an authentication system that is in charge of authentication process of a mobile communication system, and transform a result of performing the requested authentication process to a standard interface type;

a location based service (LBS) interface configured to cooperate with a location based service platform (LBSP) that performs a location based service of a mobile communication system, transfer a request of a location based service to a corresponding LBSP, and transform a result of performing the location based service to a standard interface type;

a push interface configured to cooperate with a push service legacy system of a mobile communication system, transfer a request of data push service to a corresponding legacy system, receive a result of performing the data push service, and transform the received result to a standard interface type; and a download interface configured to cooperate with a download platform of a mobile communication system, transfer a download request to a corresponding download platform, receive a result of performing the download request, and transform the received result to a standard interface type.

5. The legacy cooperation device according to claim 4, wherein the legacy cooperation interface unit further comprises a mobile oriented (MO) cooperating unit configured to provide destination information including information about an IP address or port for a CP/SP system for an MO message, and option information including information about a billing type and a call type.

6. The legacy cooperation device according to claim 4, wherein the legacy cooperation interface unit further comprises a mobile terminated (MT) cooperating unit configured to relay interworking between the business logic processor and a legacy system to transmit an MT message to a corresponding mobile communication terminal for performing a biz template for processing an MT message.

* * * * *